(12) United States Patent
Sampat et al.

(10) Patent No.: US 12,387,226 B2
(45) Date of Patent: Aug. 12, 2025

(54) OBJECT STORY TO TRACK ASPECTS OF OBJECT LIFECYCLE

(71) Applicant: The Provenance Chain Network, Inc., Portland, OR (US)

(72) Inventors: Ketan Sampat, Portland, OR (US); Jeffrey W. Gaus, Portland, OR (US); Daniel McMorris, Portland, OR (US); Lindsay Nelson, Portland, OR (US); Gunner Danneels, Portland, OR (US)

(73) Assignee: The Provenance Chain Network, Inc., Portland, OR (US)

( * ) Notice: Subject to any disclaimer, the term of this patent is extended or adjusted under 35 U.S.C. 154(b) by 0 days.

(21) Appl. No.: 18/685,885

(22) PCT Filed: Aug. 24, 2021

(86) PCT No.: PCT/US2021/047420
§ 371 (c)(1),
(2) Date: Feb. 22, 2024

(87) PCT Pub. No.: WO2023/027697
PCT Pub. Date: Mar. 2, 2023

(65) Prior Publication Data
US 2024/0394392 A1    Nov. 28, 2024

(51) Int. Cl.
*G06F 21/62*    (2013.01)
*G06Q 10/087*   (2023.01)
(Continued)

(52) U.S. Cl.
CPC ....... *G06Q 30/018* (2013.01); *G06F 21/6218* (2013.01); *G06Q 10/087* (2013.01); *G06Q 10/20* (2013.01); *G06Q 10/30* (2013.01); *G06Q 30/0278* (2013.01); *G06Q 30/0282* (2013.01); *G06Q 40/08* (2013.01); *G06Q 50/04* (2013.01); *H04L 63/083* (2013.01);
(Continued)

(58) Field of Classification Search
CPC .... G06F 21/6218; G06Q 10/30; G06Q 50/04; G06Q 10/06395; G06Q 30/018; H04L 63/083; H04L 63/102
See application file for complete search history.

(56) References Cited

U.S. PATENT DOCUMENTS

| 1,775,562 A | 9/1930 | Kerns |
| 5,771,172 A | 6/1998 | Yamamoto et al. |

(Continued)

FOREIGN PATENT DOCUMENTS

| WO | 2016112099 A1 | 7/2016 |
| WO | 2020092426 A2 | 5/2020 |

(Continued)

OTHER PUBLICATIONS

"From Oracles to Trustworthy Data on-Chaining Systems"—Heiss et al., Information System Engineering, TU Berlin, 2019 https://ieeexplore.ieee.org/document/8946220 (Year: 2019).*

(Continued)

*Primary Examiner* — Randy A Scott
(74) *Attorney, Agent, or Firm* — Kilpatrick Townsend & Stockton LLP

(57) ABSTRACT

The present application relates to devices and components including apparatus, systems, and methods to provide object story data structures.

20 Claims, 38 Drawing Sheets

(51) Int. Cl.
*G06Q 10/20* (2023.01)
*G06Q 10/30* (2023.01)
*G06Q 30/018* (2023.01)
*G06Q 30/02* (2023.01)
*G06Q 30/0282* (2023.01)
*G06Q 40/08* (2012.01)
*G06Q 50/04* (2012.01)
*H04L 9/40* (2022.01)
*G06Q 10/0639* (2023.01)

(52) U.S. Cl.
CPC ..... *H04L 63/102* (2013.01); *G06Q 10/06395* (2013.01); *G06Q 2220/00* (2013.01)

(56) References Cited

U.S. PATENT DOCUMENTS

| | | | |
|---|---|---|---|
| 11,176,519 | B2* | 11/2021 | Batra ................ H04L 67/104 |
| 11,775,562 | B2 | 10/2023 | Khan |
| 11,941,625 | B2 | 3/2024 | Akers et al. |
| 2002/0032626 | A1 | 3/2002 | DeWolf et al. |
| 2003/0139940 | A1 | 7/2003 | Takemoto et al. |
| 2004/0093255 | A1 | 5/2004 | Kelman et al. |
| 2005/0065971 | A1 | 3/2005 | Honda |
| 2008/0133294 | A1 | 6/2008 | Kataria et al. |
| 2010/0023506 | A1 | 1/2010 | Sahni et al. |
| 2010/0274629 | A1 | 10/2010 | Walker et al. |
| 2013/0198027 | A1 | 8/2013 | Anthonyson et al. |
| 2014/0244773 | A1 | 8/2014 | De Kezel et al. |
| 2015/0278487 | A1* | 10/2015 | Scott ................ H04L 9/3239 726/28 |
| 2015/0363175 | A1 | 12/2015 | Klausner |
| 2016/0253710 | A1 | 9/2016 | Publicover et al. |
| 2016/0342922 | A1 | 11/2016 | Mccarthy et al. |
| 2017/0046799 | A1 | 2/2017 | Chan et al. |
| 2017/0206532 | A1 | 7/2017 | Choi |
| 2018/0012311 | A1 | 1/2018 | Small et al. |
| 2018/0083771 | A1 | 3/2018 | Bonnell |
| 2018/0137465 | A1 | 5/2018 | Batra et al. |
| 2018/0315026 | A1 | 11/2018 | Kraemer et al. |
| 2019/0019183 | A1 | 1/2019 | Karame et al. |
| 2019/0340269 | A1* | 11/2019 | Biernat ................ H04L 63/12 |
| 2020/0117690 | A1* | 4/2020 | Tran ................ G06Q 50/14 |
| 2020/0162268 | A1* | 5/2020 | Wentz ................ H04L 9/3239 |
| 2020/0184416 | A1 | 6/2020 | Javaheri |
| 2020/0234242 | A1 | 7/2020 | Parks et al. |
| 2020/0265446 | A1 | 8/2020 | Vargas |
| 2020/0273099 | A1 | 8/2020 | Cella |
| 2020/0364817 | A1 | 11/2020 | Liu et al. |
| 2021/0126791 | A1 | 4/2021 | Lu et al. |
| 2021/0216233 | A1 | 7/2021 | Bolen et al. |
| 2022/0051261 | A1 | 2/2022 | Vetas |
| 2023/0305538 | A1 | 9/2023 | Gaus et al. |
| 2023/0306442 | A1 | 9/2023 | Nelson et al. |
| 2023/0325753 | A1 | 10/2023 | Sampat et al. |
| 2024/0013232 | A1 | 1/2024 | McMorris et al. |
| 2024/0354778 | A1 | 10/2024 | Gaus et al. |
| 2024/0354862 | A1 | 10/2024 | McMorris et al. |

FOREIGN PATENT DOCUMENTS

| | | |
|---|---|---|
| WO | 2020252013 A1 | 12/2020 |
| WO | 2023027698 A1 | 3/2023 |
| WO | 2023107482 A1 | 6/2023 |

OTHER PUBLICATIONS

"Blockchain: Blueprint for a New Economy"—Melanie Swan, O'Reilly, Feb. 2015 https://www.oreilly.com/library/view/blockchain/9781491920480/ (Year: 2015).*
European Patent Application No. 21862604.2, Extended European Search Report, Jan. 19, 2024, 17 pages.
European Patent Application No. 21862605.9, Extended European Search Report, Jan. 19, 2024, 13 pages.
European Patent Application No. 21862606.7, Extended European Search Report, Jan. 19, 2024, 15 pages.
European Patent Application No. 21862607.5, Extended European Search Report, Jan. 19, 2024, 13 pages.
International Patent Application No. PCT/US2021/047415, International Preliminary Report on Patentability, Mar. 9, 2023, 8 pages.
International Patent Application No. PCT/US2021/047415, International Search Report and Written Opinion, Nov. 30, 2021, 9 pages.
International Patent Application No. PCT/US2021/047416, International Preliminary Report on Patentability, Mar. 9, 2023, 7 pages.
International Patent Application No. PCT/US2021/047416, International Search Report and Written Opinion, Nov. 30, 2021, 8 pages.
International Patent Application No. PCT/US2021/047418, International Preliminary Report on Patentability, Mar. 9, 2023, 10 pages.
International Patent Application No. PCT/US2021/047418, International Search Report and Written Opinion, Dec. 6, 2021, 11 pages.
International Patent Application No. PCT/US2021/047419, International Preliminary Report on Patentability, Mar. 9, 2023, 7 pages.
International Patent Application No. PCT/US2021/047419, International Search Report and Written Opinion, Dec. 1, 2021, 8 pages.
International Patent Application No. PCT/US2021/047420, International Preliminary Report on Patentability, Mar. 7, 2024, 10 pages.
International Patent Application No. PCT/US2021/047420, International Search Report and Written Opinion, Dec. 6, 2021, 11 pages.
International Patent Application No. PCT/US2021/047421, International Preliminary Report on Patentability, Mar. 7, 2024, 8 pages.
International Patent Application No. PCT/US2021/047421, International Search Report and Written Opinion, Nov. 30, 2021, 9 pages.
International Patent Application No. PCT/US2021/054807, International Preliminary Report on Patentability, Mar. 7, 2024, 7 pages.
International Patent Application No. PCT/US2021/054807, International Search Report and Written Opinion, Jan. 25, 2022, 8 pages.
International Patent Application No. PCT/US2021/054821, International Preliminary Report on Patentability, Mar. 7, 2024, 8 pages.
International Patent Application No. PCT/US2021/054821, International Search Report and Written Opinion, Mar. 25, 2022, 9 pages.
U.S. Appl. No. 18/040,776, Non-Final Office Action, Oct. 24, 2024, 55 pages.
U.S. Appl. No. 18/685,887, Non-Final Office Action, Sep. 11, 2024, 39 pages.
U.S. Appl. No. 18/685,888, Non-Final Office Action, Sep. 20, 2024, 74 pages.
European Patent Application No. 21862604.2, Office Action, Dec. 16, 2024, 9 pages.
European Patent Application No. 21862605.9, Office Action, Dec. 17, 2024, 8 pages.
European Patent Application No. 21862606.7, Office Action, Jan. 23, 2025, 9 pages.
European Patent Application No. 21862607.5, Office Action, Feb. 3, 2025, 7 pages.
European Patent Application No. 21955221.3, Extended European Search Report, Feb. 20, 2025, 11 pages.
U.S. Appl. No. 18/040,776, Final Office Action, Mailed on Mar. 12, 2025, 24 pages.
U.S. Appl. No. 18/040,787, Non-Final Office Action, Mailed on Apr. 18, 2025, 9 pages.
U.S. Appl. No. 18/040,790, Non-Final Office Action, Mailed on Apr. 17, 2025, 25 pages.
U.S. Appl. No. 18/685,887, Final Office Action, Mailed on Feb. 13, 2025, 93 pages.
U.S. Appl. No. 18/685,888, Final Office Action, Mailed on Feb. 27, 2025, 121 pages.
Bashir, Mastering Blockchain, Packt Publishing, XP055393678, Mar. 17, 2017, pp. 1-504.
European Patent Application No. 21955222.1, Extended European Search Report, Mailed on Mar. 18, 2025, 9 pages.

(56) References Cited

OTHER PUBLICATIONS

European Patent Application No. 21955252.8, Extended European Search Report, Mailed on May 20, 2025, 10 pages.
Heiss et al., From Oracles to Trustworthy Data on-Chaining Systems, IEEE International Conference on Blockchain (Blockchain), IEEE, XP033682703, 2019, pp. 496-503.
Swan, Blockchain: Blueprint for a New Economy, O'Reilly, XP055279098, ISBN: 978-1-4919-2049-7, Feb. 8, 2015, 149 pages.

* cited by examiner

Lifecycle information elements

OBJECT STORY TO TRACK ASPECTS OF OBJECT LIFECYCLE

CROSS REFERENCE TO RELATED APPLICATION

This application is a 371 U.S. National Phase of PCT International Patent Application No. PCT/US2021/047420, filed Aug. 24, 2021, which is herein incorporated by reference in its entirety for all purposes.

BACKGROUND

In today's business environment, information about various entities is stored within a variety of database systems and structures. Inefficiencies and insecurities related to generating, storing, accessing, and maintaining information related to the various entities may cause confusion and mistrust.

DETAILED DESCRIPTION

Figure 1:
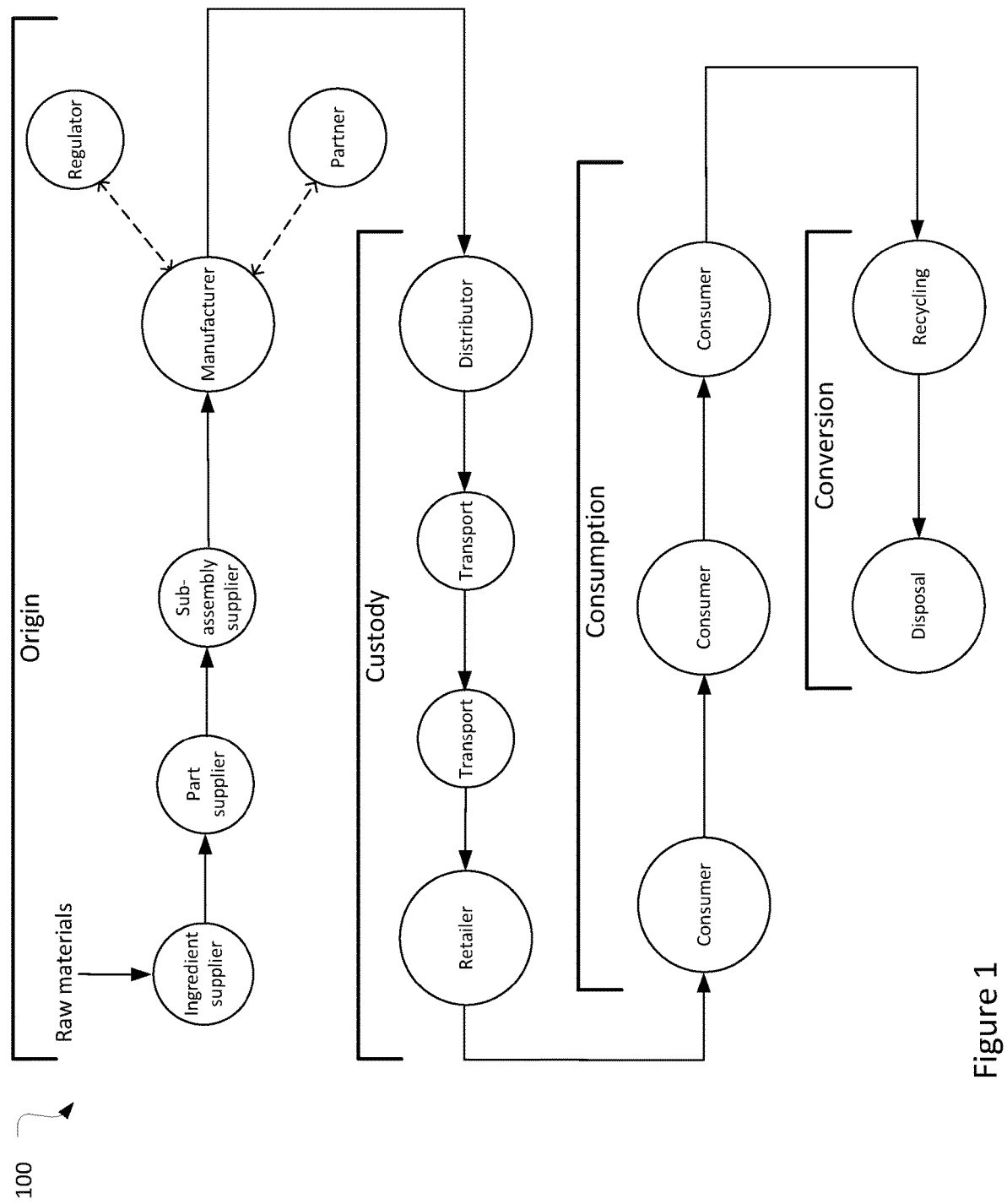
FIG. 1 illustrates actors that may be involved in a lifecycle of a product in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" and "A/B" means (A), (B), or (A and B).

Systems, methods and apparatuses for maintaining information about various subjects of a marketplace are described herein. For example, in one embodiment, information elements about facilities, companies, brands, and conditions are created by computer systems throughout the supply chain or lifecycle of a product, which may refer to a good or service. The various actors provide information about claims that they make about the people, places, and things that make up the actions performed in creating, transporting, owning, maintaining, and dispositioning a product. These claims are accompanied by evidence information that proves the validity of the claim. Claims can be made either manually by an actor using a properly authenticated computing system which is networked to the other devices in the network, or they can be created automatically by sensor endpoints that read information, create claims and evidence and send it to the network independently. These claims and evidence are aggregated and stored, either centrally or distributed in a manner that prevents the unauthorized addition, subtraction, or alteration of information within the claim and evidence objects. During the lifetime of the product, actors using computing systems can access the claims and evidence to create business intelligence on the business environment of the marketplace. The end consumer can access the claims and evidence using a computing/communication device connected to the Internet. The owners, maintainers, and those that possess or otherwise use a product can make claims about themselves, changes, maintenance, possession, or use of the product while under their control. Other related embodiments are also described and claimed.

The following is a glossary of terms that may be used in this disclosure.

Authentication manager: computing element responsible for authenticating users to an object story computing network and assigning them roles.

Automation information system: computing element that integrates sensor information into an object story.

Certification authority: computing element that provides cryptographic information for access to an object story.

Claim element: fundamental information object containing a statement that is made about a product, entity, facility, or location.

Component: A portion of a larger object. A component can include a subassembly, part, ingredient, or other sub-portions of a product; a department, team, or individual of an entity; a sub-facility (for example, emergency room) of a facility (for example, hospital); or a smaller location (for example, room) of a larger location (for example, building).

Consumer computing device: computing element of the consumer for accessing the public portions of the object story data structures.

Consumption element: portion of a product object story that contains information about the consumer(s) interaction, use, or maintenance of the product.

Conversion element: portion of a product object story that contains information about the ultimate end-of-life disposal of the product.

Custody element: portion of a product object story that maintains information about the chain-of-custody of the product as it was manufactured and distributed.

Evidence element: fundamental information object containing evidence of the veracity of a corresponding claim element.

Legacy adapter: computing element that interfaces non-object story aware legacy computing systems to the object story structures.

Manufacturer information system: computing element within the manufacturer for access to the object story management systems.

Object: a product (for example, a perishable good, a durable good, or service), a facility (for example, a place built for a particular purpose), an entity (for example, an individual, company, or group), or a location.

Object story: information about lifecycle aspects of an object. If the term "object story" is used, it can mean that the information refers to any of the objects described herein. The term "object story" will be modified when necessary to identify the type of information that is stored. For example a product object story refers to information about a product, a facility object story refers to information about a facility; and so forth.

Object story data structure: a data structure that includes or incorporates elemental aspects of an object story, the data structure or elemental aspects may be distributed across set of networked, distributed nodes.

Origin element: portion of an object story that contains information about the components that make up the object and the process by which the object is made.

Remote substory access: computing element responsible for accessing object story, or elements thereof, at other business entities.

Story manager: computing element responsible for storing object story data structure.

Today's systems do not allow a user to query or maintain information from the entire lifecycle of a product in an online fashion. Embodiments provide improvements on the present state of the art by creating a secure, distributed set of computing systems that can maintain many different information elements about each step and participant in the manufacturing, development, and lifecycle process and make that information available in a customized manner to those that desire the information to make decisions.

The object story represents the collection of information (in particular claims and evidence) about aspects of a lifecycle of an object. This information constituting an object story is embodied in an object story data structure that may be stored in one or more of a set of networked, distributed computing nodes and data structures. The object story data structure may be constructed in a distributed fashion and may be sharable between the different actors based on their authorized role in the process. The object story may represent elemental aspects over the development and functional lifetime of the object. It may also be recursive in its nature. For example, an ingredient object story may contribute information about parts, which are contained within a subassembly object story, which may be contained within a product object story. An object story for a facility may contain component object story structures specifying each of the warehouses at that site. Those object stories may contain object stories for the module, pod, or pallet rack containing products and they would contain or link to the product object stories for the products currently stored there. Information about the entities involved in the process may also be recursive. A company object story may represent claims and evidence on the operations of a company (such as its carbon footprint), but it may also contain a department object story for each department in the company, or a site object story for each site in which manufacturing occurs. The department/site object stories would contain claims and evidence information relevant to that department/site (such as an external certification of fair wage practices). This creates a rich, navigable, set of information about the components, people, and places that are associated with an object.

There are many actors involved in a lifecycle of a product and each actor has important information to contribute to the product object story. The actors are shown in FIG. 1 in accordance with some embodiments. A product may pass through four phases. The origin is the creation of the product from ingredients, smaller parts, subassemblies, and into final manufacture. A regulator or partner is shown as interacting only with the manufacturer; however, other embodiments allow interactions with these entities across all phases of the lifecycle. Various facilities and companies may supply components, which would be associated with component object stories that are associated with facility/company object stories. Once a product is manufactured it may pass through several distributors, transport services, and retailers during a custody phase. For a durable good such as a car, there may be several consumers who purchase, maintain, and resell the product throughout its life in the consumption phase. Finally the end of the product's lifecycle may be the conversion phase where it is recycled or disposed.

In some embodiments, various object stories may include elements that correspond to each of these phases. For example, a product object story may include an origin element, a custody element, a consumption element, and a conversion element. Each of these elements, which may also be referred to as stories, may include one or more other object stories or claim elements that are relevant to actors and operations of the corresponding phase.

The origin element may include claim elements and component/facility/entity/location object stories that are relevant to the origin phase of the product. In some instances, the origin element may include component object stories for the components of the product, with each component object story incorporating facility/entity/location object stories that are related to the corresponding component. Further, the claim elements within the origin element may be associated with facility/entity/location object stories that are related to assertions of the corresponding claim elements.

The custody element may include claim elements and object stories (e.g., component, facility, entity, or location object stories) that are relevant to the custody phase of the product. For example, the claim elements/object stories may be provided to track possession through the custody phase. Claim elements and facility/entity/location object stories may describe how and when distributors, transporters, and retailers had possession of the product.

The consumption element may include claim elements and object stories (e.g., component, facility, entity, or location object stories) that are relevant to the consumption phase of the product. For example, claim elements and facility/entity/location object stories may be provided to describe how and where the product is used and by whom. In some embodiments, modifications to the product may also be tracked by claim elements and appropriate object stories. For example, if a component of the product is replaced or an additional component is added, a new component object story may be added into the product object story along with the object story of the entity that manufactured or installed the replacement/added component. For another example, service, maintenance, or repair records may be added to the product object story by adding new claim elements/object stories related to the action performed, the entity performing the action, and any components added by the action.

The conversion element may include claim elements and object stories (e.g., component, facility, entity, or location object stories) that are relevant to the consumption phase of the product. For example, claim elements and facility/entity/location object stories may be provided to describe how and where the product is disposed or recycled and by whom.

The product object story represents information about the product and its ingredients throughout all of these phases and with respect to all of the actors and locations that are involved in its lifecycle. This information can be created and maintained at several different levels. For example, a durable good, such as a car may need to be tracked at the level of an individual item (a car with a specific VIN number containing an engine with a specific serial number). Products can also be tracked as batches (such as all of the goods produced on a given day). Or a single product object story can be used to represent claims that cover all of the products created by a manufacturer (containing information such as the certified organic nature of all offered products). Object stories can also be used independently of products to convey information about the facilities and companies used. For example, a company object story can be used to convey the certifications on the labor and ethical values of the company, regardless of the product delivered by that company.

Each actor in the lifecycle of the information on the product, facilities, or entities involved may have specific rights to read and write information to the object story element that is pertinent to their role in the lifecycle. Each of these actors may maintain computing information systems and data management systems in order to cooperatively build and maintain the object stories that communicate the related information.

While FIG. 1 describes incorporating object stories into lifecycle elements of a product, object stories as described herein may also be generated/utilized independently of a product. For example, facility/entity/location object stories may be generated, accessed, and maintained as described herein without being defined with reference to a particular product. So, while some embodiments describe facility/entity/location object stories being incorporated into a product story to provide information on how the facility/entity/location was involved with the product, other embodiments are not so limited. For example the facility/entity/location object stories may be independent from a product story or, in other examples, the facility/entity/location object stories may include product object stories.

Figure 2:
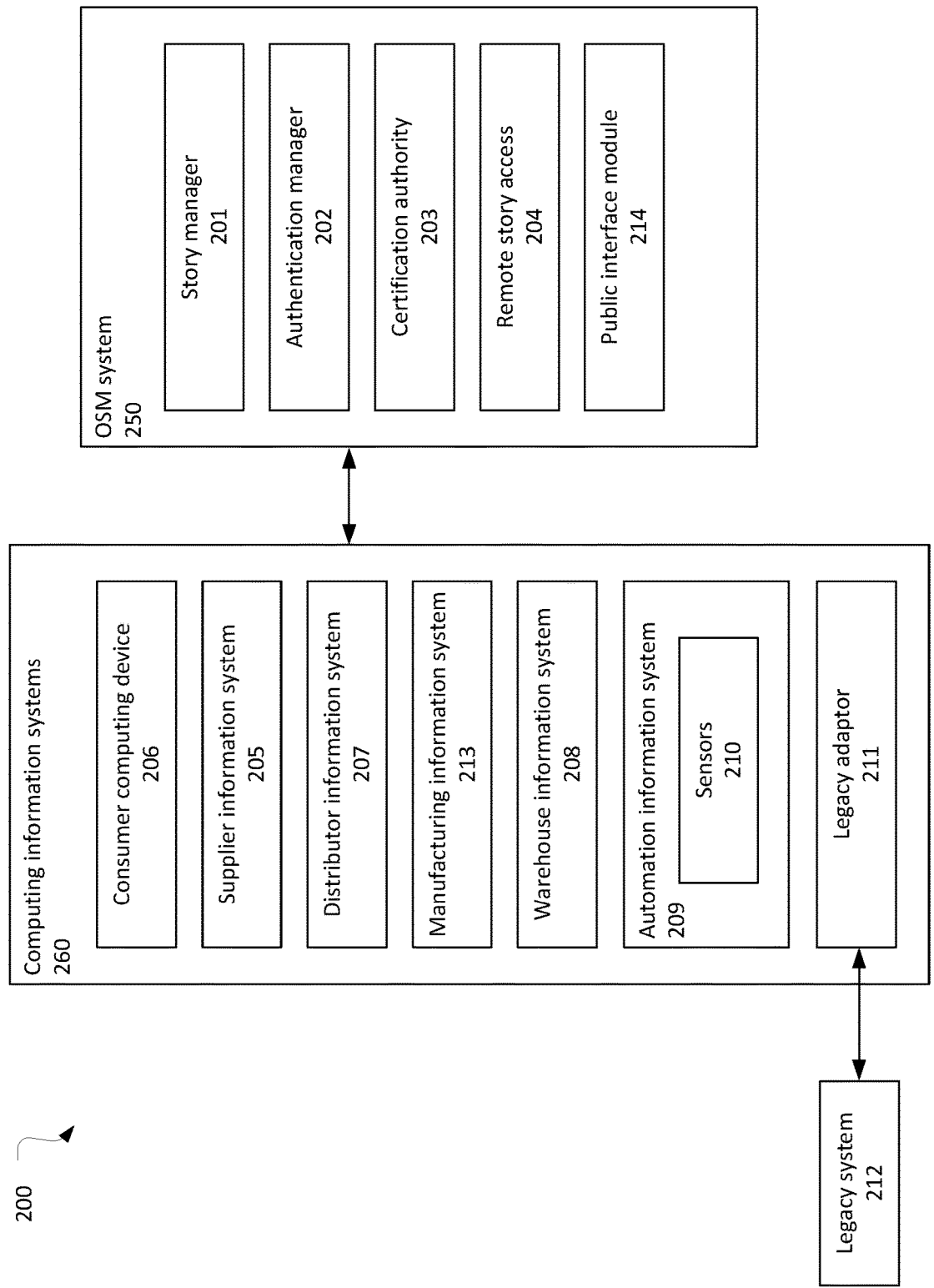
FIG. 2 illustrates computing systems involved in the creation, maintenance, and access of an object story in accordance with some embodiments.

FIG. 2 illustrates computing systems 200 involved in the creation, maintenance, and access of an object story in accordance with some embodiments.

The computing systems 200 may include an object story management (OSM) system 250 to maintain and manage the distributed data structure of the object story. The OSM system 250 may be responsible for ensuring that a complete object story can be accessed when needed, and may be responsible for ensuring that the local actors can perform those actions on the object story that are permitted by their role. Each of the actors in FIG. 1 may implement an OSM system. In another embodiment, a third party may implement these systems and the actor's systems will interact with this third party to maintain a decentralized store of object story information.

The OSM System may include a number of modules including, for example, story manager 201, authentication manager 202, certification authority module 203, remote story access module 204, and the public interface module 214. The story manager 201 may be responsible for maintaining the storage of the information about a subject of the object story and ensuring that other entities can view or alter only those portions that their role allows. The story manager 201 may store the information in a database that is centralized on a single server, replicated on multiple servers, or distributed across multiple systems sites/entities. In some embodiments, the story manager 201 uses one or more distributed ledgers to maintain the information. The remote story access module 204 may be responsible for maintaining links to those portions of the object story that are not stored locally. If the actor wishes to modify a portion of the object story that is not local, the remote story access module contacts a remote data management system, authenticates its actor and retrieves the portion of the object story that they are authorized to use. The authentication manager 202 may be responsible for identifying the entities that access the object story, verifying their identities and assigning them roles that grant them the proper access to the necessary portions of the object story. The certification authority module 203 may be responsible for enrolling entities into the object story network and providing them cryptographic identification so that they can access the information stored. The public information module 214 may be responsible for representing on the public network the object stories managed by the entity.

The computing systems 200 may further include computing information systems 260 to access or otherwise interact with object stories via the OSM system 250. Each actor may have different computing information systems depending on their role in the ecosystem—with different rights available to them. In another embodiment, a third party may implement these systems and the actor's systems will interact with this third party to maintain a decentralized store of object story information.

The computing information system 260 implement, in software and hardware, the roles of the various actors in FIG. 1, accessing (for example, reading or writing) the object story or elements thereof as necessary. A representative sample of the computing information systems 260 are shown from the basic roles defined in FIG. 1. Other embodiments may contain other systems that fulfill alternative or additional roles. A supplier information system 205 may provide object story information representing their company and object stories representing the ingredients or subassemblies they provide to a manufacturer or agricultural producer. The supplier information system 205 may provide full product object story data structures for those ingredients that the OSM system 250 makes available to the manufacturer or downstream ingredient supplier. For example, an automobile manufacturer story manager may receive full product object story data structures from their subassembly suppliers—such as the engine manufacturer—and integrate those data structures into the car's object story. This is recursive as well, so that the engine object story may contain the product object story structures of each of its constituent parts—such as the pistons. And the piston object story may contain information about the steel used in the manufacturing process. In this way, the product object story of a manufactured or processed item may contain or represent full information on an item from its basic ingredients through the chain of suppliers of those ingredients until they have been integrated into components, subassemblies, and finally the fully manufactured or processed item. The product object story may also contain information in facility object stories to define the location where it was manufactured. Each of the component object stories may contain company object stories defining claims and evidence about the manufacturer of that component.

The manufacturer information system 213 may supply the portions of the product or facility object story related to the final manufactured item and where it was created. It reads and writes information about the manufacturing facilities and the process that created the product. The distributor information system 207 may provide information to the product object story for an item that has been manufactured and is in the process of being shipped out for distribution either to the next step in the manufacturing process or to the consumer. This may include many variables stored in location object stories such as location, time, temperature, shock sensors reporting bad handling practices, etc. The warehouse information system 208 may record information about where, for how long, and under what conditions the product was stored in the manufacturer's warehouse before being sent for distribution. It may also supply information about the warehouse itself in a facility object story for the warehouse. The consumer computing device 206 may provide a public view of any type of object story so that a consumer can browse the information that is important to them in their buying decision. The automation information system 209 can be located throughout any of the actors in the process. The automation information system 209 may include various sensors 210 to report conditions of storage, manufacturer, shipment, etc. For example, the temperature in a food processing assembly line, the length of time that a subassembly remained in the warehouse before being used, or the quality control information and images that define that the item has been properly inspected. In various embodiments, the sensors 210 may be image sensors, temperature sensors, timers, barcode readers, proximity sensors, accelerometers, shock or impact sensors, etc. The automation information system 209 may take the information from the sensors 210 and write it into the appropriate portions of the product or location object story corresponding to the actor's role. The computing information system 260 may include a legacy adapter 211. Not all entities in the manufacturing process may be object-story aware. The legacy adapter 211 may interface with a legacy system 212, pull data from the legacy system 212, format it properly and include it into an object story where needed. In this way even the smallest supplier that runs primarily on email can be integrated into a larger object story network.

Figure 3:
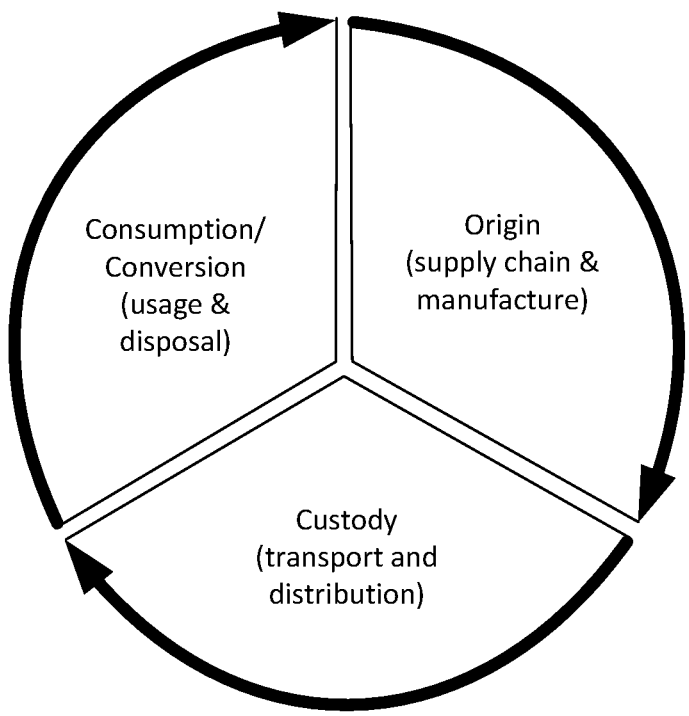
FIG. 3 illustrates a lifecycle diagram of a product in accordance with some embodiments.

FIG. 3 illustrates a lifecycle diagram 300 of a product in accordance with some embodiments. The lifecycle diagram 300 includes an origin phase (where a product is manufactured), a custody phase (where a product is sent through the distribution chain to the consumer), a consumption phase (where the product is used and maintained by one or more owners), and finally a conversion phase (where the product is recycled or disposed).

Each of these phases may generate information that is stored in claim elements or object stories. In this way, a complete history of a product including actions performed on or with respect to the product and those participants that have performed the actions is maintained.

Figure 4:
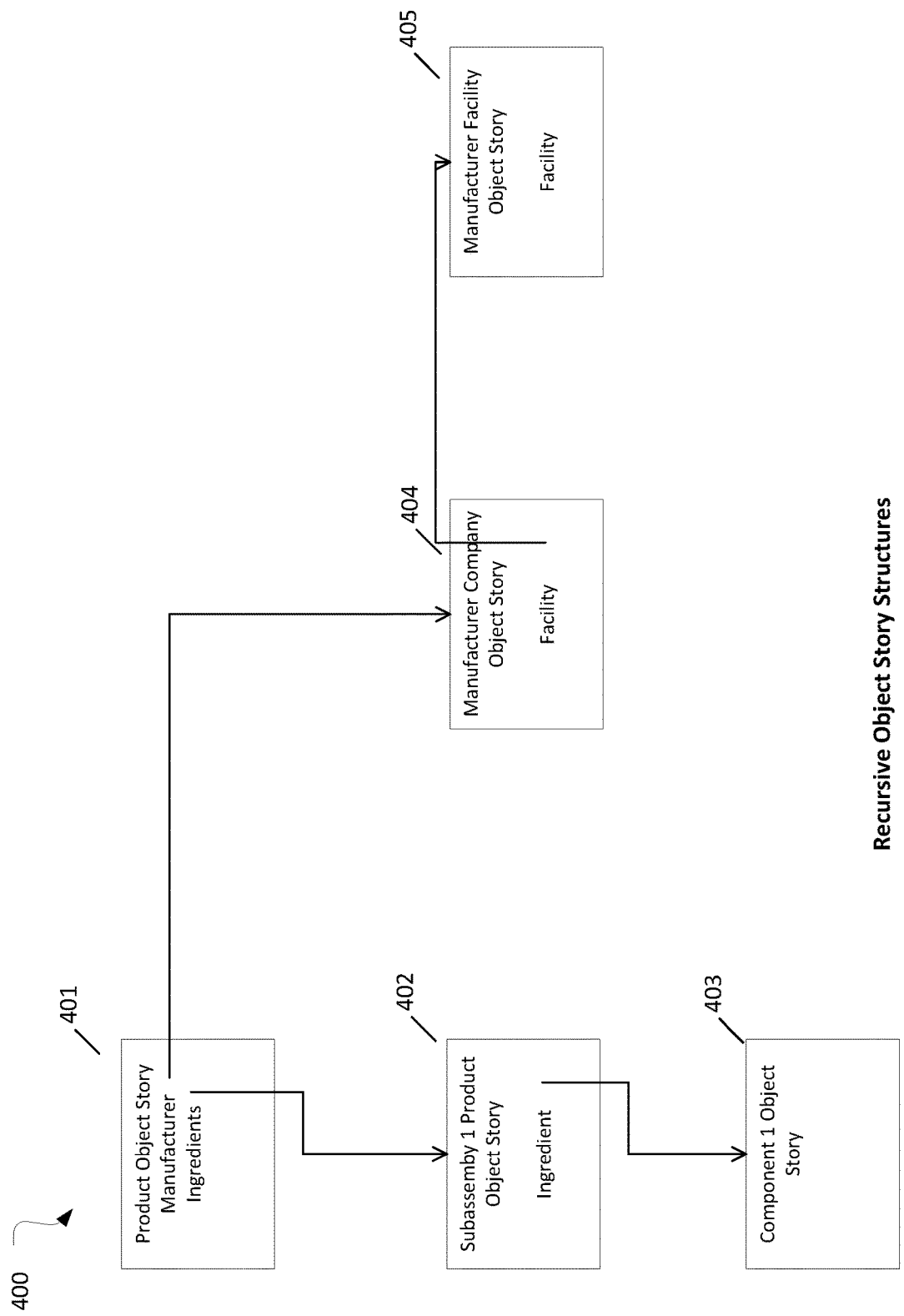
FIG. 4 illustrates a recursive object story in accordance with some embodiments.

Note that an object story, as stated above, may be fully recursive. The product object story of an item may contain within it (or maintains links to) the product object story structures for its subassemblies. The subassembly product object story structures may contain or maintain links to the object story structures for their constituent parts, object story structures for locations where they were manufactured, object story structures for entities performing the related actions, etc. An example is shown in FIG. 4

The main item's product object story 401 may contain, or contain references to, the product object story for each of a number of subsystems, for example, subassembly product object story 402. The subsystem product object story structure 402 may contain, or contain references to, its constituent part's component object story structure 403. This process continues for as long as information is available until the most basic ingredient is defined.

The product object story 401 may also contain, or contain references to a company object story 404, defining information about the manufacturer. The company object story 404 may contain, or contain references to other object stories, such as a facility object story 405 defining information about the location that created the product.

These high-level, recursive data objects may be maintained across the computing elements of the object story network of all of the participants of the supply chain for a product. The story manager at any network node may choose to copy an object story for an ingredient locally, or maintain a link to the ingredient object story at the supplier node. In other embodiments, parts of the object story may be distributed across one or more distributed ledgers or blockchains. If links are maintained, the manufacturer can contribute information to the elements, subassembly, ingredient, or parts object stories to provide the upstream supply chain manufacturers with important information about how the ingredients are related to the whole. This bi-directional communication between the elements of the supply chain may provide important business intelligence to the other members of the supply chain. For example, if a supplier finds a manufacturing defect in a part manufactured on a particular day, they can query their story manager and determine what subassemblies and manufactured goods contain the defective parts. This allows them to alert the downstream manufacturers more precisely than can be done today.

The object story structures and the network elements provide a framework within which atomic information elements may be represented. The smallest information elements are the claim and the evidence elements. A claim is any information that any entity wants to assert about a product item, a producer, a location, a facility, or entity, or the method and location of production, ingredients, usage, etc. Example claims are "This item was grown on an organic farm"; "This item was manufactured at factory number 3"; "Factory number 3 has fair wage and labor guidelines"; and "The company has been certified green by a third party organization". Each claim may also contain evidence elements that are a form of proof that the claim can be trusted. Examples of evidence are "Here are third party certifications on the organic nature of the farm that produced the ingredients"; "Here are certifications of the wage and working conditions in the factory"; and "Here are the certification results on the status of the company." Claims and evidence may be created by networked computer systems within the manufacturing process. These may be manually established by an authorized agent, or they may be automatically made by information processing elements embedded in the manufacturing and shipping process.

Figure 5:
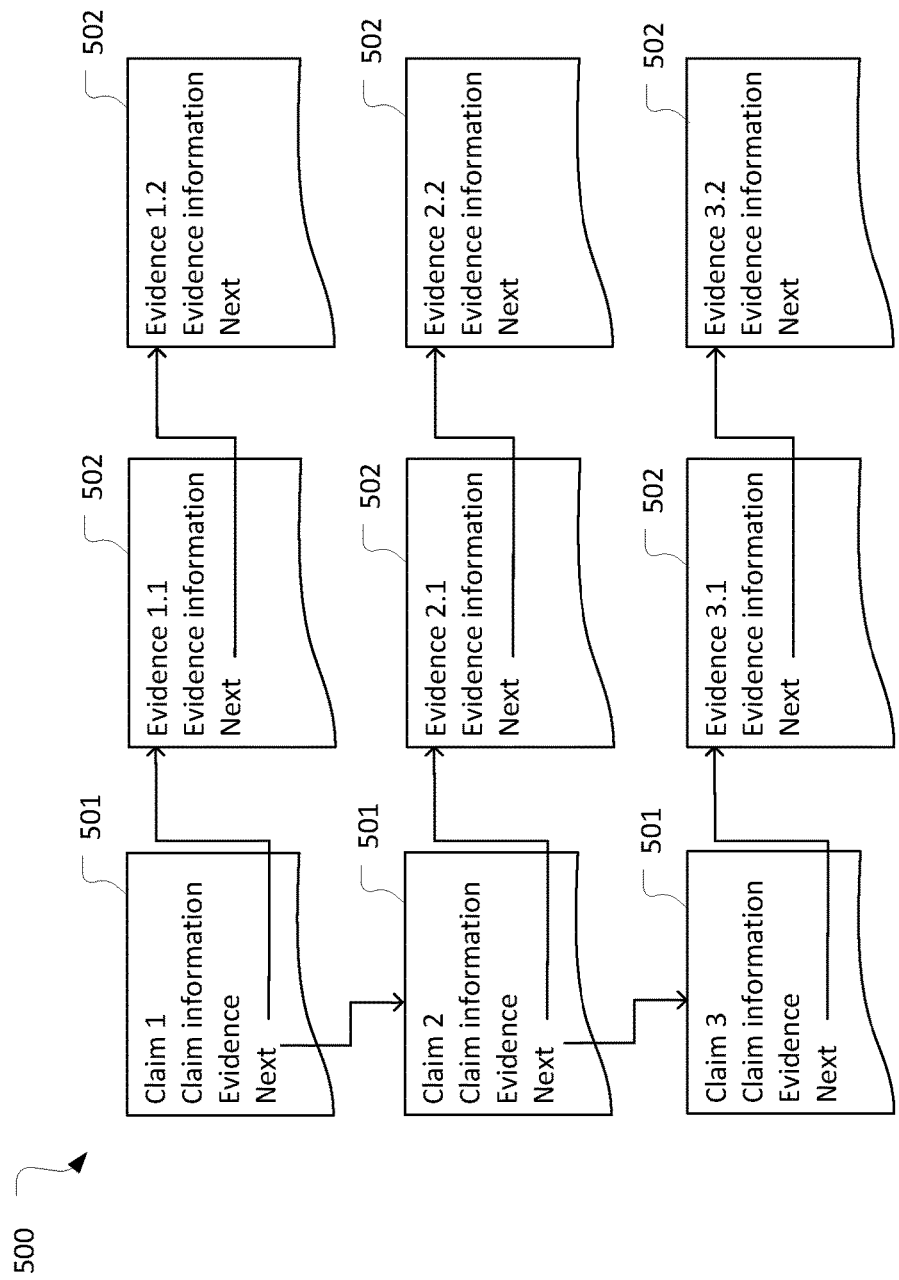
FIG. 5 illustrates a chain of claim and evidence elements in accordance with some embodiments.

Each claim may have a chain of evidence elements that provide verification of the claim being made, and the claims for a particular object story are linked together to create a chain of claims. This structure is shown in FIG. 5 in accordance with some embodiments.

Each claim element 501 contains a link to the next claim element in the chain, and they contain links to chains of evidence elements 502 that provide verification of the truth of the claim.

This structure allows for a flexible representation of evidence elements 502 providing various levels of proof of the truth of a claim. Each evidence element 502 can be judged to be at one or more levels of evidence. The rule then can be stated that the higher the level of evidence of the element, the stronger the proof of the truth of the claim. In one embodiment, there are the following levels of evidence.

1. Assertion—evidence element contains no evidence, the claim is asserted by the author of the claim. For example, a farm may state that they have organic processes.

2. Self-Certification—the evidence element contains a reference to information about a review process that the author has gone through for self-certification that allows them to make the claim. For example, a farm may state that they have organic processes and provide the data for the self-certification that they have gone through that allows them to make the claim.

3. Basic Audit—the evidence element contains a reference to information about an external audit performed on the certification of the author. For example, a farm may supply audit information from a third party that shows their compliance to organic standards.

4. Third-Party Certification—the evidence element contains information from a third-party certifying entity as to the status of the author. For example, a farm may supply a third-party organic inspection certificate that shows their status.

5. Third-Party Certification with Audit—the evidence element contains information from a third-party audit that shows that the external certification is currently up to date.

In other embodiments, additional/alternative levels of evidence may be used that are useful for a specific field.

Throughout the object story structure's lifetime, various claims and evidence may be added to it to represent information about the product, facility, location, or those who have owned or interacted with the product. One embodiment maintains claims for the ingredients, the manufacturing facility, the location, condition, and details of the manufacturing process, the distribution custody chain, and information from the consumer about usage, or maintenance, and ultimate conversion or recycling information. Claims may cover information about the process, ingredients, materials, practices, custody, facilities, and other aspects of the life of the product and those that interact with a product. Other types of claim elements can be added as needed. Any validated and authenticated user of the system can create claim and evidence elements on parts of the various object story types to which they have the proper level of assigned rights.

It is crucial that the claim elements in an object story provide truthful information. Thus, it is of paramount importance that the claim elements and the associated evidence elements are stored and linked securely in such a manner that they cannot be improperly added to, deleted, or altered after they are made. In addition, each claim and evidence element must be able to be traced back to the claimant through an unmodifiable digital identity. One embodiment of a process to secure linked evidence and claim elements is as a set of distributed blockchains or a distributed ledger secured by cryptographic hashes.

Claims and evidence may be built into an overall set of object stories as an item is manufactured, shipped, purchased, maintained, resold, and ultimately disposed. A full set of object stories for a complex item may potentially contain thousands of claims and evidence elements made by hundreds of different parties. This allows each of the parts that make up the item to be tracked securely back to their original sources.

Figure 6:
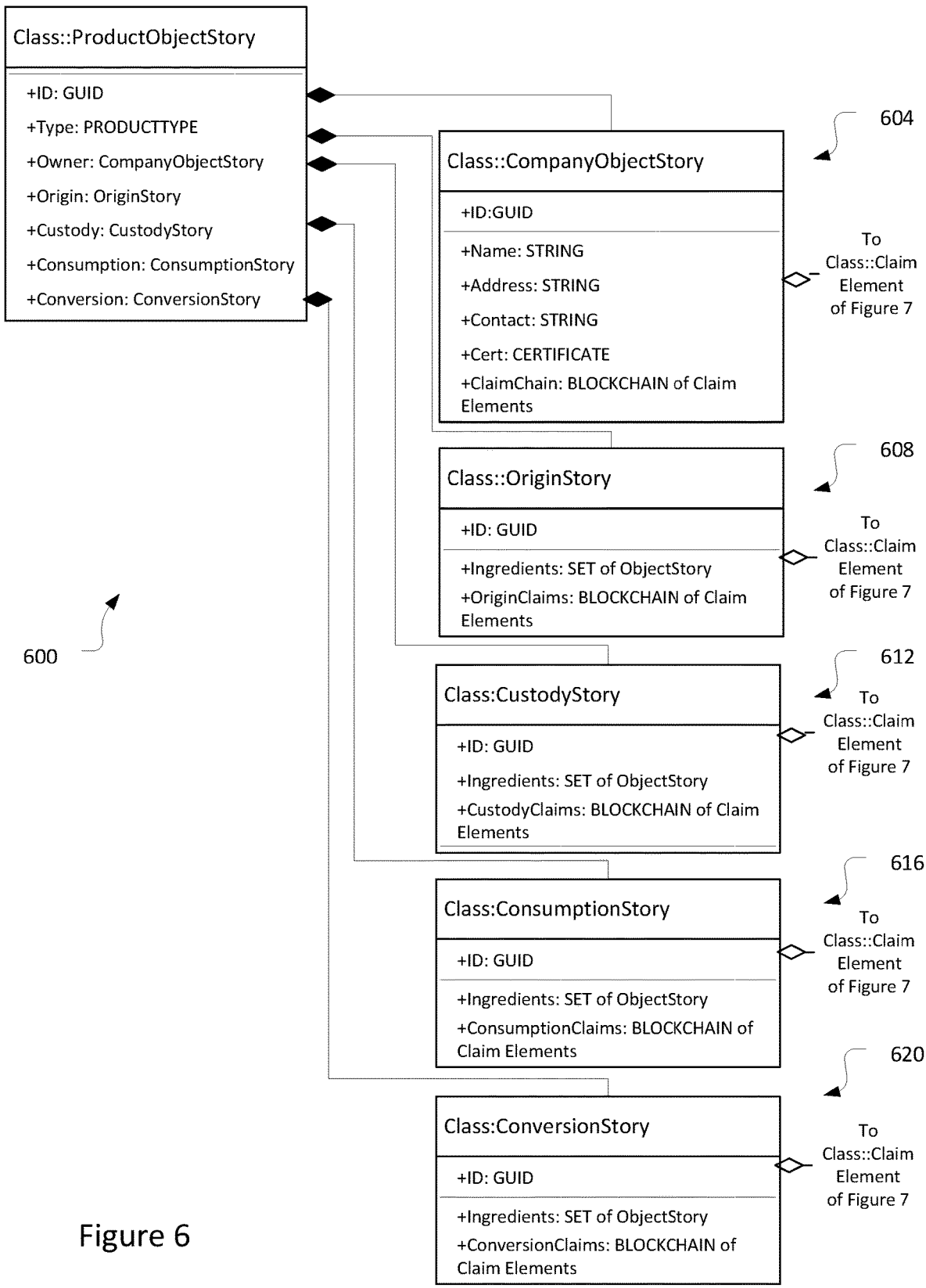
FIG. 6 illustrates portions of an object story data structure and incorporated portions in accordance with some embodiments.

FIG. 6 illustrates portions of a product object story data structure 600 and incorporated portions in accordance with some embodiments.

The product object story data structure 600 may include a globally unique identifier (GUID) that identifies the object story associated with the object story data structure 600. The object story data structure 600 may further include a type field that has a value of product type. The object story data structure 600 may further include an owner field that provides an object story data structure for an entity that owns or is otherwise responsible for the object story. The value of the owner field may be linked to a company object story data structure 604. This structure may include a GUID that identifies the entity that manufactures the product, and other fields corresponding to the entity (for example, a name field, an address field, a contact field, a certification field, etc.). The company object story data structure may further include a claims field that includes a chain of claim and evidence elements corresponding to the entity.

The object story data structure 600 may further include a plurality of element fields such as, for example, an origin field for an origin story related to the product object story, a custody field for a custody story related to the product object story, a consumption field for a consumption story related to the product object story, and a conversion field for a conversion story related to the product object story. Each of the element fields may include a pointer to respective element data structures. For example, the origin field may include a pointer to origin story data structure 608; the custody field may include a pointer to custody story data structure 612; the consumption field may include a pointer to consumption story data structure 616; and the conversion field may include a pointer to conversion story data structure 620.

The origin story data structure 608 may include a GUID; an ingredients field that includes a set of object stories for components, facilities, entities, or locations corresponding to the origin story; and an origin claims field that includes a chain of claim elements corresponding to the origin story. The claim chain may be implemented as one or more distributed ledgers or blockchains.

The custody story data structure 612 may include a GUID; an ingredients fields that includes a set of object stories for components, facilities, entities, or locations corresponding to the custody story; and a custody claims field that includes a chain of claim elements corresponding to the custody story. The claim chain may be implemented as one or more distributed ledgers or blockchains.

The consumption story data structure 616 may include a GUID; an ingredients fields that includes a set of object stories for components, facilities, entities, or locations corresponding to the consumption story; and a consumption claims field that includes a chain of claim elements corresponding to the consumption story. The claim chain may be implemented as one or more distributed ledgers or blockchains.

The conversion story data structure 620 may include a GUID; an ingredients fields that includes a set of object stories for components, facilities, entities, or locations corresponding to the conversion story; and a conversion claims field that includes a chain of claim elements corresponding to the conversion story. The claim chain may be implemented as one or more distributed ledgers or blockchains.

Figure 7:
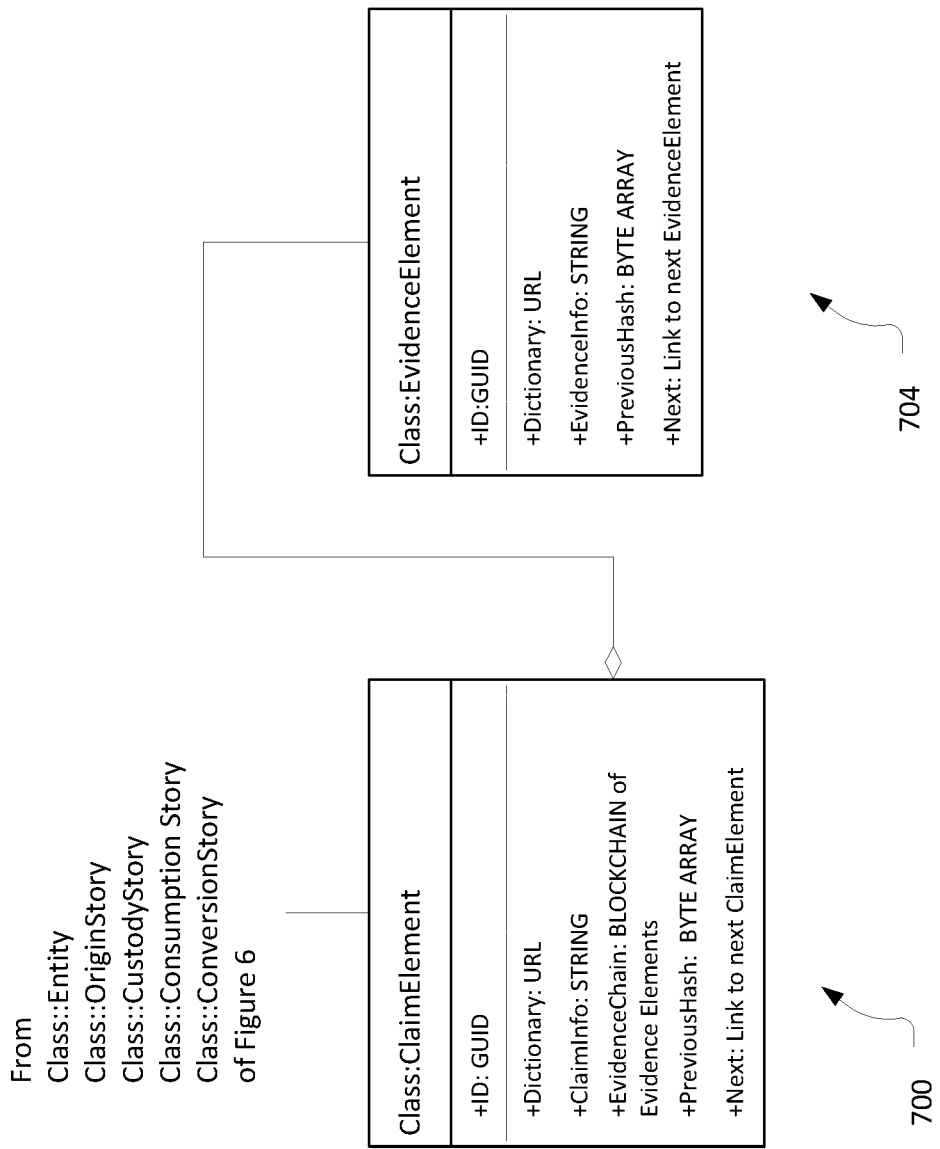
FIG. 7 illustrates a claim element and corresponding evidence element in accordance with some embodiments.

Each of the data structures 604, 608, 612, 616, and 620 may include links to respective object stories or claim elements. FIG. 7 illustrates the claim element 700 and corresponding evidence element 704 in accordance with some embodiments.

The claim element 700 may include a GUID; dictionary field that defines the syntax and semantics under which this claim element was created; a claim information field that provides a description of the claim; an evidence chain field that includes a chain of evidence elements corresponding to the claim (the evidence chain may be implemented as one or more distributed ledgers or blockchains); a previous hash field containing a cryptographic hash of the previous elements in the chain; and a link to a next claim element.

The evidence element 704 may include a GUID; a dictionary field that defines the syntax and semantics under which this evidence element was created; an evidence field that provides a description of the evidence; a previous hash field containing a cryptographic hash of the previous elements in the chain; and a link to a next evidence element.

While various elements and data structures of FIGS. 6 and 7 describe incorporating claims and evidence elements through blockchains, other embodiments may include non-blockchain techniques including, but not limited to, local storage of the relevant information.

FIGS. 8-37 illustrate various operation flow/algorithmic structures that may be implemented by various computer system/devices described herein. These flow/structures describe how actions may be performed to maintain a robust information environment around a product, facility, entity, or location.

Figure 8:
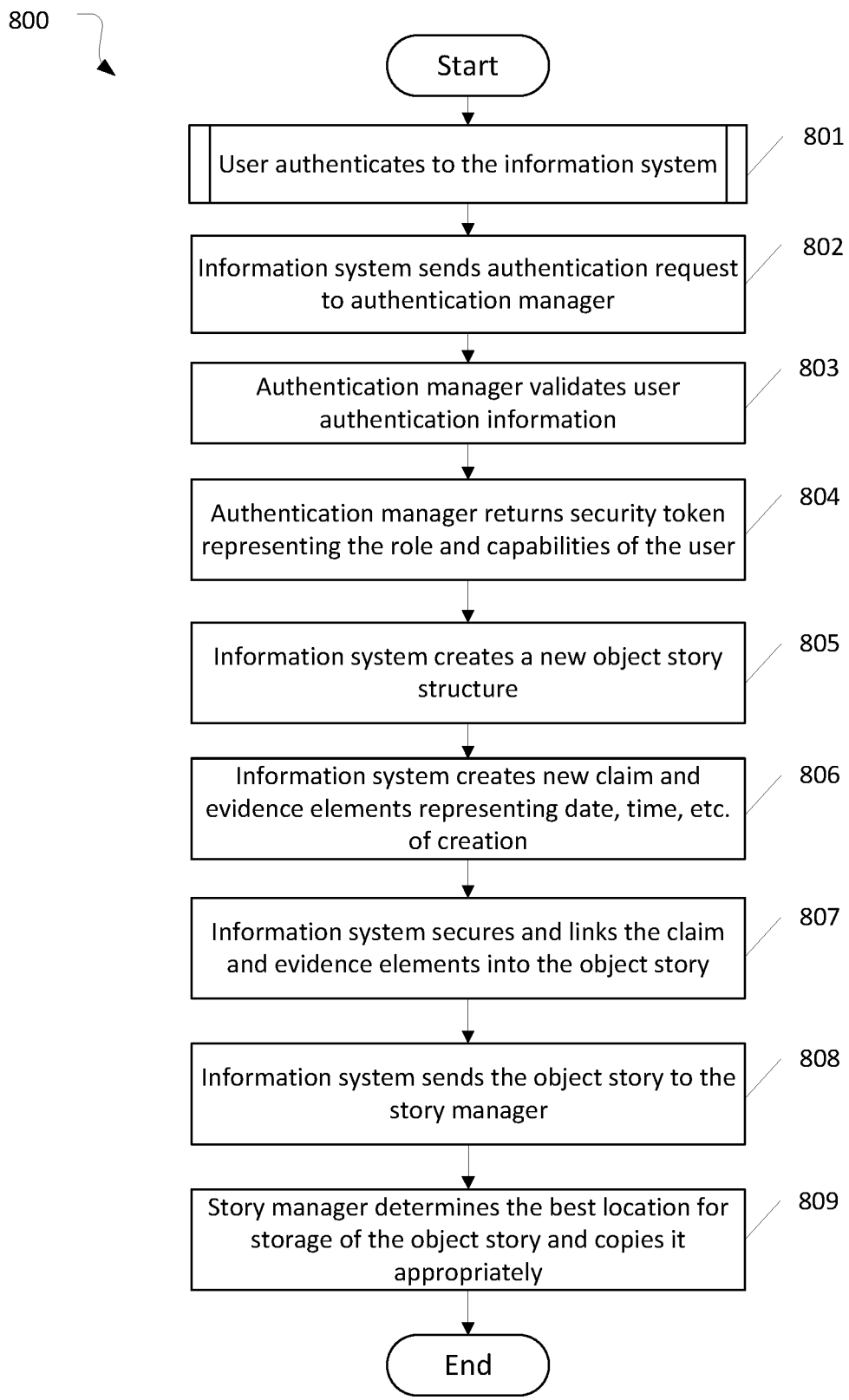
FIG. 8 illustrates an operational flow/algorithmic structure that may be used to initialize an object story in accordance with some embodiments.

FIG. 8 illustrates an operational flow/algorithmic structure 800 that may be used to initialize an object story in accordance with some embodiments.

The flow/structure 800 may initialize object story structures. The object story structure may be a product object story structure for a single manufactured or agricultural item or batch of items; or it may be facility/location/entity object story depending on the context in which the system is being used. Operations 801-804 may include authentication operations and assigning rights and roles to an end user that is accessing the object story network. A variety of authentication/assignment operations may be used for 801-804. The operation 801-804 are intended to represent basic functionality and do not constrain the embodiment that is chosen.

At 805, the flow/structure 800 may include an information system creating a new object story structure to represent the information that will be maintained about the item. At 806 and 807, the flow/structure 800 may include the information system creating basic claims and evidence elements for the object story structure—such as the creation date, time, information about the facilities used to store product, etc. It may then cryptographically link those elements into the object story structure so that they cannot be altered at a later time. Referring to FIG. 2, the information system may be a manufacturing information system 213 that uses cryptographic elements that it has received from the certification authority 203. At 808 and 809, the information system sends the initialized object story structure to the story manager for storage. The story manager determines the best architecture for storing the object story. This can be centralized in a database, distributed across multiple databases, or remotely stored depending on the embodiment.

Figure 9:
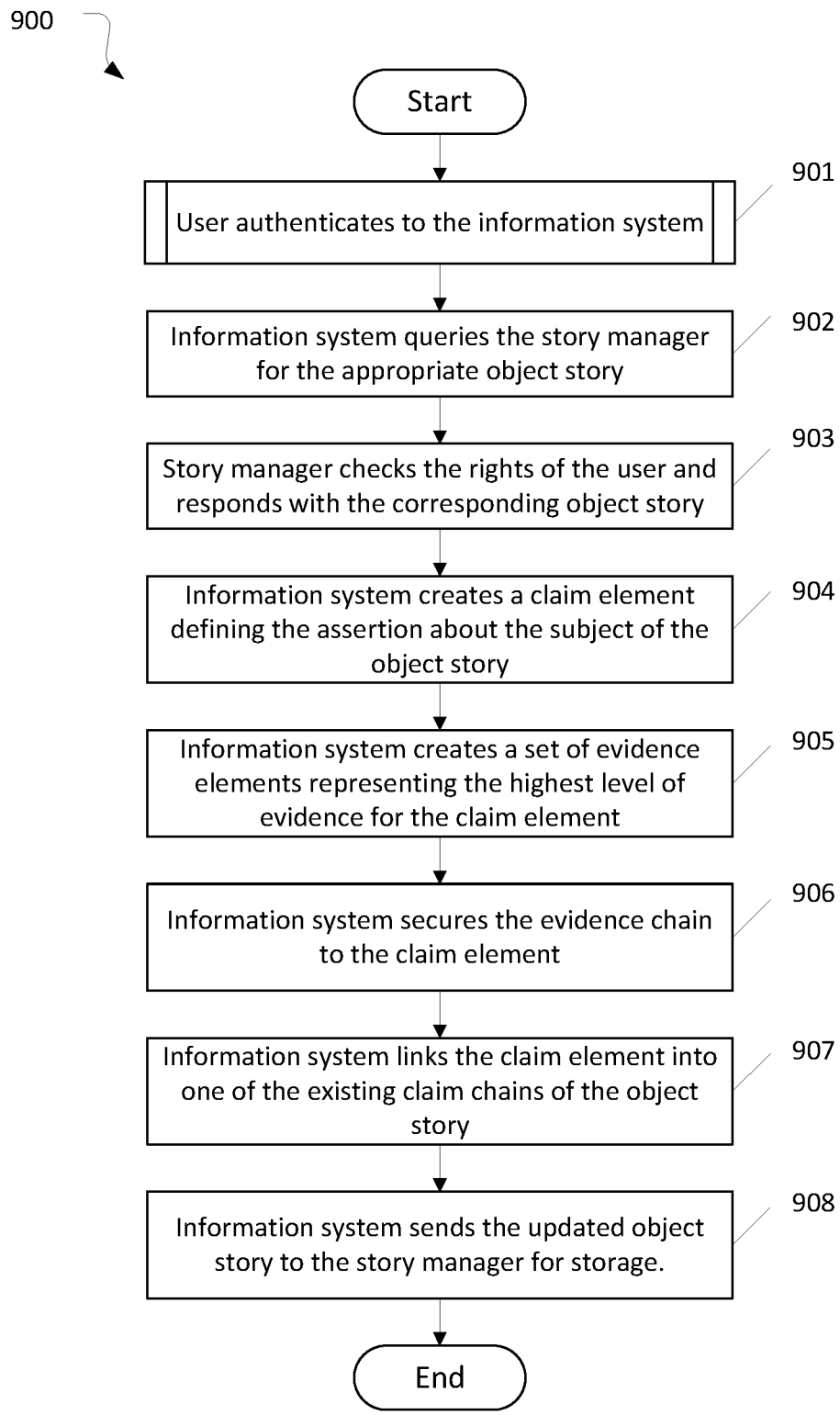
FIG. 9 illustrates an operational flow/algorithmic structure for creating a claim and variable levels of evidence in accordance with some embodiments.

FIG. 9 illustrates an operational flow/algorithmic structure 900 for creating a claim and variable levels of evidence in accordance with some embodiments. The claim and evidence created by flow/structure 900 may be inserted into the object story.

This flow/structure 900 begins at 901 with authentication of the user of an information system and obtaining rights and roles that allow the user to create claims and evidence on an object story. This process may be similar to that described in FIG. 8. Once the information system has obtained the necessary permissions, it queries the story manager for the object story of the item that it needs to add a claim and evidence element at 902 and the story manager responds with the correct structure at 903. At 904, the manufacturing information system creates a claim element stating a condition of the object that is being processed. This can be an assertion that a manufacturer wishes to express about a product—such as date, time of manufacture, condition of the processing plant. Or it can be an assertion that an entity wishes to express about a facility, location, or itself. Examples of these assertions could include a statement about the carbon footprint of the facility, the current temperature at a location, or the certifications of the company, department, or individual that is being described in the object story, The information system then obtains the highest level of evidence that it has for this claim element at 905. See the section above on the variable levels of evidence elements that are available. As an example, the information system may choose a third-party certification to show the carbon footprint of a facility. At 906, it links the evidence element to the claim element in such a way that it cannot be altered or removed without an indication of a change. At 907, the information system links the claim element (with its attached evidence element) into the appropriate claim chain within the object story in such a way that it cannot be altered or removed without an indication of a change. The information system then provides the updated object story structure back to the story manager for storage at 908. The story manager may store the information locally, distributed, or make the necessary changes at a third-party manager of the object story structure. This may include making changes across a number of distributed ledgers or blockchains.

Figure 10:
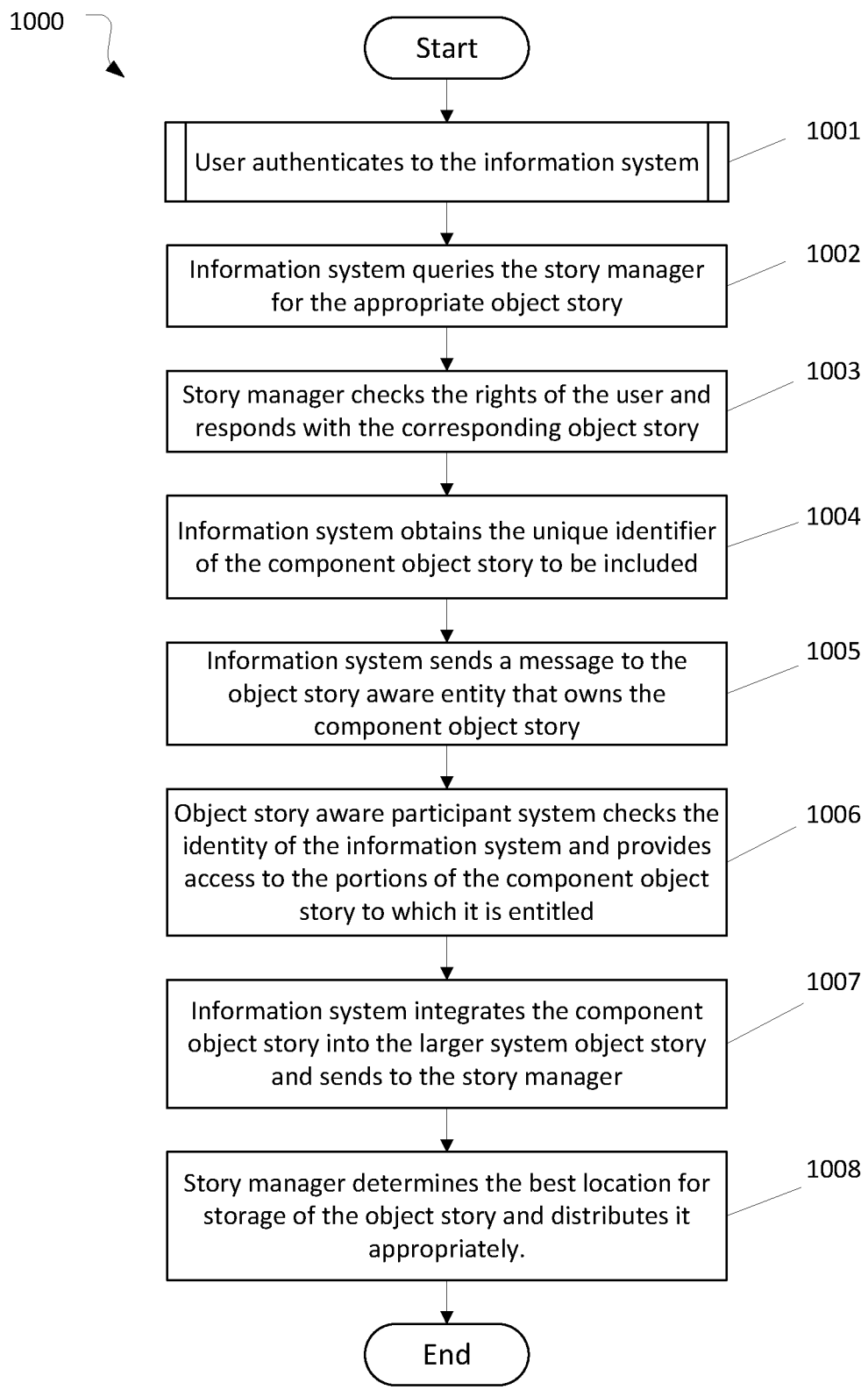
FIG. 10 illustrates an operational flow/algorithmic structure for including a first object story into a second object story accordance with some embodiments.

FIG. 10 illustrates an operational flow/algorithmic structure 1000 for including a component object story into a larger object story in accordance with some embodiments. The flow/structure 1000 may occur when a component, (for example, a sub-assembly, ingredient, department, smaller location) is included into a larger object (for example, product, company, large location). Additionally/alternatively a similar process may be used when a user wants to define information about smaller entities (for example, a department as part of a company). It shows the recursive nature of the object story structures as the object story for the component is included in the object story for the larger object.

The flow/structure 1000 begins at 1001 with authentication of the user of an information system and obtaining rights and roles that allow the user to create claims and evidence in an object story. This may be similar to that described above with respect to FIG. 8. Once the information system has obtained the necessary permissions, it queries the story manager for the object story of the item for which it needs to create a component claim and evidence at 1002 and the story manager responds with the correct structure at 1003. In order to perform this, the story manager may access local or remote storage or interact with third-party systems that maintain object story structures on behalf of a requesting party, for example, the manufacturer. The information system then determines the unique identifier of the component (e.g., ingredient, part, department) that is to be included in the larger object story at 1004. The information system then contacts the appropriate object-story aware system and requests the object story for the component at 1005. The remote object-story-aware system checks the authentication information of the requestor and creates an object story for the requested component at 1006. This object story contains only those elements that the information system is authorized to consume. At 1007, the information system links the component object story into the origin element of the larger object story in such a manner that it cannot be altered or deleted without an indication of change. The story manager may then integrate the object story back into the storage. There are many different embodiments of how this process can be carried out. The story manager may copy the component object story locally or maintain live links to the object-story aware supplier.

Figure 11:
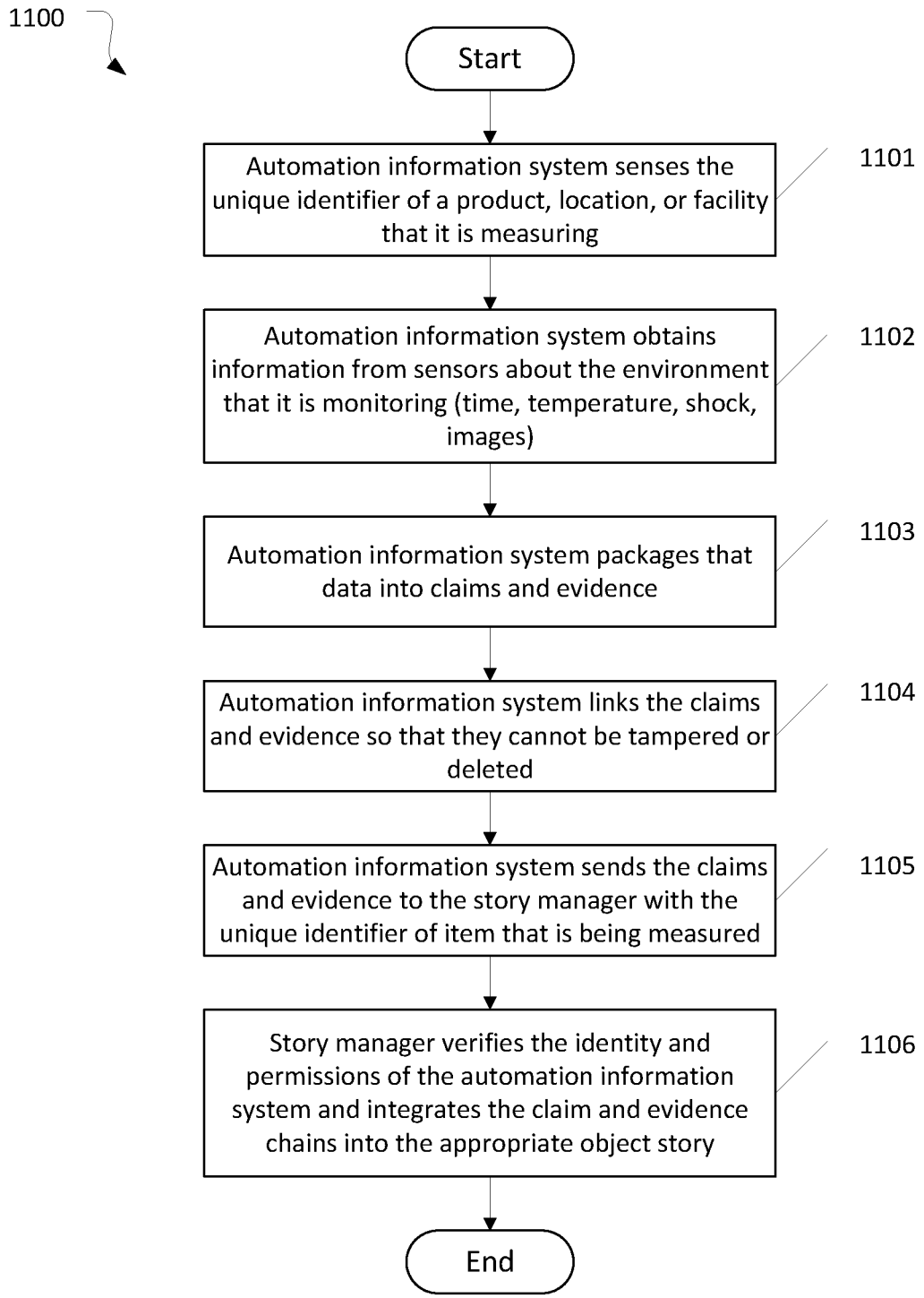
FIG. 11 illustrates an operation flow/algorithmic structure that describes an automated data integration in accordance with some embodiments.

FIG. 11 illustrates an operation flow/algorithmic structure 1100 that describes an automated sensor data integration in accordance with some embodiments. In the flow/algorithmic structure 1100, the sensor data may be automatically associated with an object story. For example, this could represent the history of temperature and humidity readings integrated into a warehouse facility object story.

At 1101, the flow/structure 1100 may include the automation information system (e.g., automation information system 209 from FIG. 2) sensing a unique identifier of an item that it is monitoring. This can be, for example, a product in the manufacturing flow or the conditions in a warehouse. The identifier may be sensed by scanning bar codes imprinted on the item, RFID chips accompanying the item through the process, visual recognition of the item using cameras, other object identification mechanisms, user input, etc. The automation information system then, at 1102, obtains information from the environment via a set of sensors (e.g., sensors 210 of FIG. 2). These sensors can consist of time, temperature, information from other equipment, or visual inspection images of the item among other items. At 1103 and 1104 the automation information system creates claim and evidence elements corresponding to the sensor readings that it has received. It secures the evidence elements to the claim so that they cannot be altered or deleted without an indication of a change. At 1105 and 1106, the automation information system sends the packaged claim and evidence chains to the story manager for integration into the particular object story and the story manager links the claim into one of the claim chains of the given object story.

Figure 12:
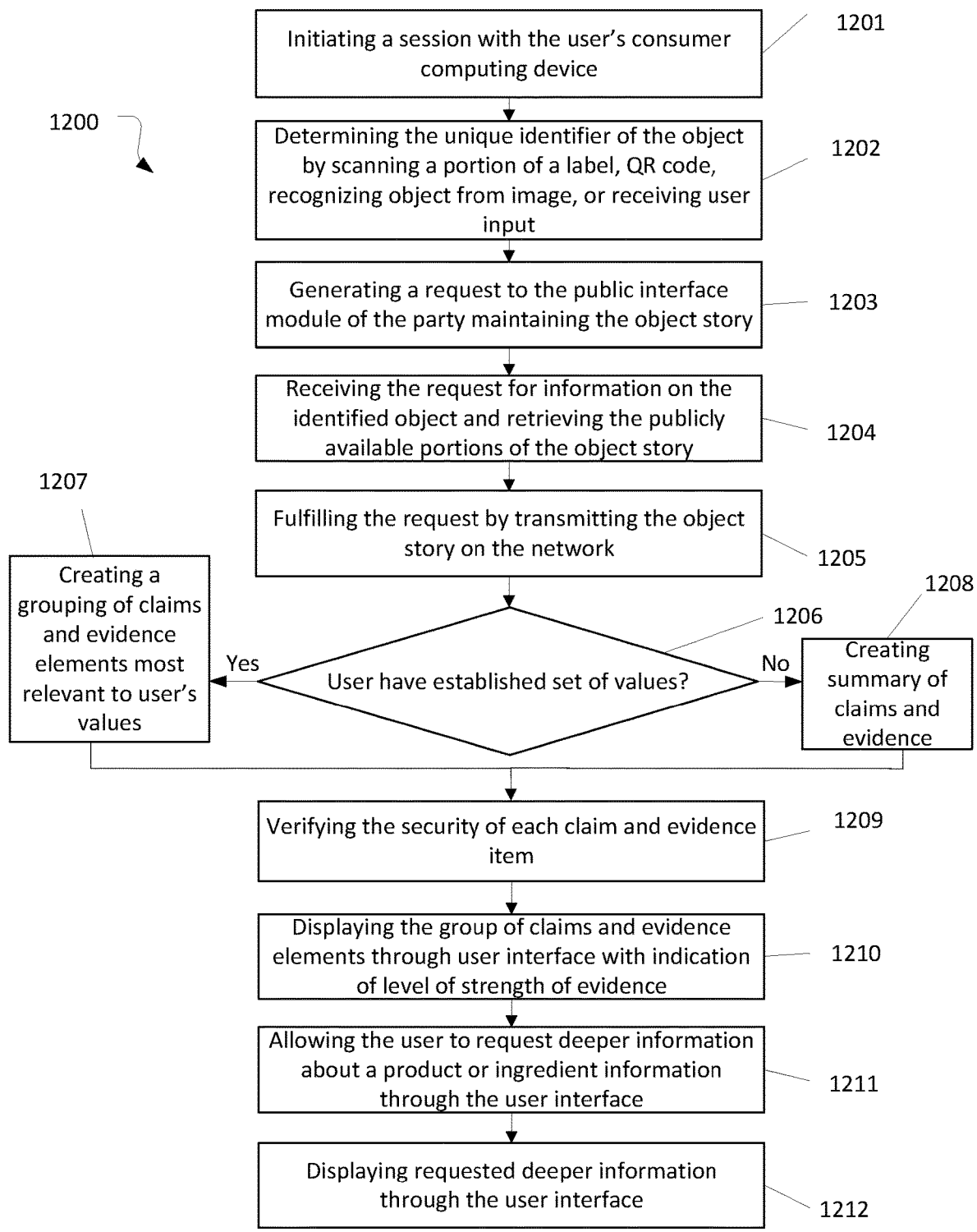
FIG. 12 illustrates an operation flow/algorithmic structure that describes presentation of public information to a consumer in accordance with some embodiments.

FIG. 12 illustrates an operation flow/algorithmic structure 1200 that describes presentation of public information to a consumer in accordance with some embodiments. Presenting the accumulated data about a product to the end consumer may be one advantage of the object story network. In the flow/algorithmic structure 1200, the consumer, may seek to retrieve information about an object, which may be a product, facility, entity, or location. In just one example, a consumer may be considering a purchase of a product and seek to retrieve more information about the product. For example, the product may be a used item and the consumer may be interested in information about the previous owners and how they have maintained the item.

At 1201, the user initiates a session with their consumer computing device (e.g., consumer computing device 206 of FIG. 2). This may consist of using software that is designed to access the object story or utilize functionality within another party's software (such as using a "more info" button within a purchase application provided by a third-party).

At 1202, the consumer computing device, is used to identify the object of interest. Among the embodiments of this action are scanning the label, querying an RFID element in the product, scanning and recognizing a QR code or e-ink display, using machine assisted visual recognition of the item that is of interest, or receiving user input of an identifier associated with the object. The consumer computing device may obtain an identifier from the item that represents a unique identification of the object. This can be the type of the product such as "Model XX Stereo," or it can be batch identification such as "Batch YYZZ of peanut butter" or it can uniquely identify the item itself, such as "Serial Number AABBCC." The identification can also be of an entity, for example, a manufacturer of a product. The consumer may be interested in determining the corporate ethics of the entity. The decision of the level of identification is up to the implementation of the object story and the information that is to be offered to the consumer.

At 1203, the user's consumer computing device makes the identification available to the public interface module (e.g., public interface module 214 of FIG. 2) of the OSM system (e.g., OSM system 250 of FIG. 2) of the party that manages the object story structures. The public interface module then assembles the public information in the requested object story and sends it back to the consumer computing device at 1204 and 1205.

At 1206, the consumer computing device determines if there is an existing "profile of values" for the user. The profile of values may be an expression of the interests and importance of particular aspects of manufacturing, governance, or operation of the user. For example, the user may be interested in organic conditions of ingredients, or they may be more interested in the carbon footprint or fair labor practices of the manufacturer. For another example, the user may be interested in diversity, equity, and inclusion practices of a corporation. There is a wide range of value types that can be expressed in any embodiment of this concept. The profile of values can be established directly by the user by using an interface to the consumer computing device, or they can be inferred from the user's past behavior on the consumer computing device, or they can be established by any combination of these methods.

In some embodiments, the computing device may solicit interests of a user. For example, the computing device may provide the user with a list of interests that are available for selection by the user. These interests may be of a general nature, or they may be tailored to specific object types (for example, product, facilities, locations, entities) or even to specific objects (for example, a specific product, facility, location, or entity). In the event the available interests are tailored to a specific object type, they may be presented to the user for selection after receiving an indication of the object of interest.

In some embodiments, in addition to obtaining one or more interests of the user, the computing device may provide the user with a weighting field that allows the user to provide a weight associated with each interest. The user may input weighting values into the weighting field to provide different levels of importance for different interests. The weighting field may allow the user to reorder the interests, control a sliding scale associated with each interest, enter a numerical or other demarcated weighting value, etc.

In some embodiments, the computing device may track the user's interaction with the system and provide recommendations based on the user's interactions. For example, the computing device may provide suggestions for new interests and associated weighting values, suggestions for modifying currently selected interests or importance levels, etc.

If a profile of values exists on or is otherwise available to the system, the consumer computing device tailors the information in the claims and evidence of the item's object story to match the user's profile of values at 1207. If there is no established profile of values the consumer computing device creates a generic interface to the claims and evidence of the item's object story at 1208.

The security of each of the claims and evidence are verified at 1209. At 1210, because of the variable levels of evidence available within the claims made in the object story, the interface to the consumer computing device can make an indication of the strength of the claims made. For example, self-certified organic status can be displayed differently than third-party verified organic status. This presents the first level of information in which the user may be interested. Because of the recursive nature of the object story the user can request deeper information about the components of the item, at 1210 and 1211. For example, the first level of information could be the packaging plant of an agricultural product. The user could choose to view the claims and evidence of the health certification of the department that performed the packaging.

Figure 13:
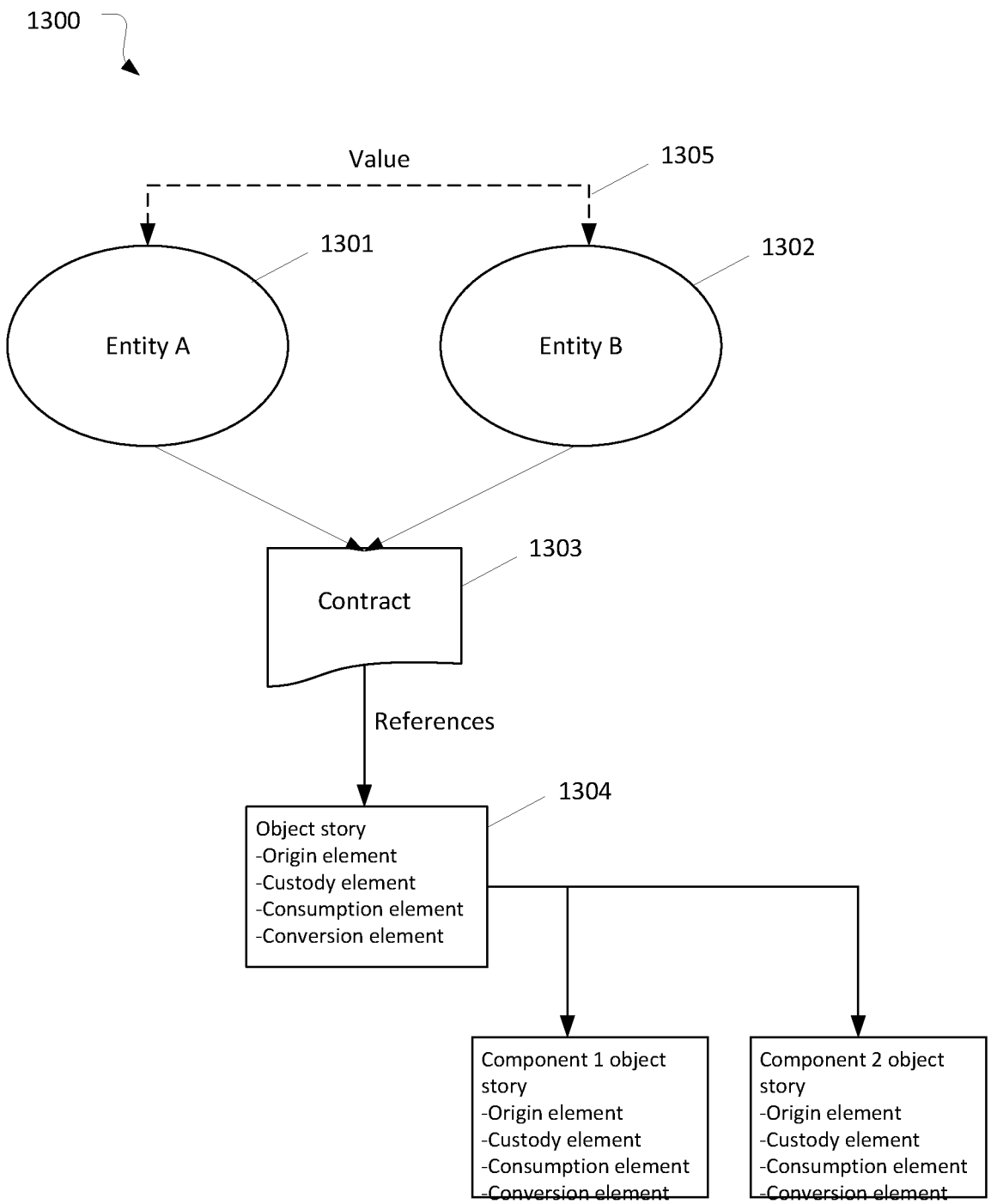
FIG. 13 illustrates a diagram that represents contract settlement through usage of claims and evidence in accordance with some embodiments.

FIG. 13 illustrates a diagram 1300 that represents contract settlement through usage of claims and evidence in accordance with some embodiments. The cryptographic strength of the claims and evidence objects can be used within terms of a contract to provide the proof needed to transfer values between entities.

Two business entities 1301 and 1302 create a contract 1303. The contract can be embodied as either a written, legal document or as an electronic contract. In either case, the contract specifies conditions within it and value to be transferred between the entities if those conditions are met 1305. The contract can be written in any embodiment such that value can flow from either party to the other party and the amount of value transferred can be conditional on other conditions specified in the contract. This value can be a fiat currency, bank transfers, or electronic value items such as a cryptocurrency. In the current embodiment, the conditions of the contract 1303 reference claims and evidence elements of various object story structures 1304. Any embodiment of a contract is allowed with any expressible stipulations and conditions provided that those conditions are tied to claims and evidence elements of an object story. With the integration of the object story, the contract conditions can express anything that can be contained within a claim element and can stipulate required levels of linked evidence elements in order to transfer variable levels of value between the entities. This allows for automated contract settlement that is a method and apparatus for monitoring the object story and automatically settling the contract when the necessary conditions are met within the object story. The process of operations on an electronic contract are described in the following operation flows/algorithmic structures.

Figure 14:
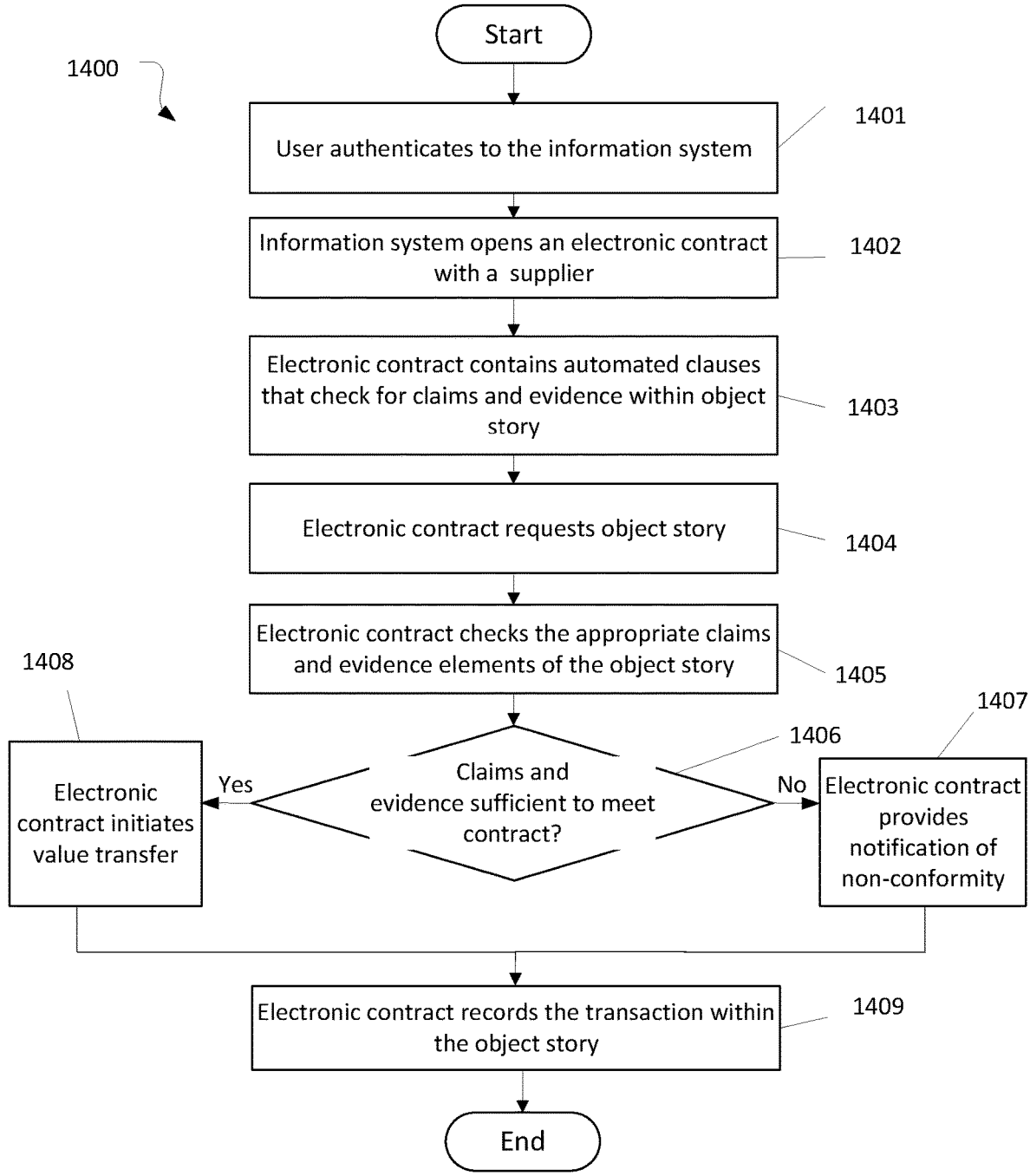
FIG. 14 illustrates an operation flow/algorithmic structure that describes operations of an electronic contract between a manufacturer and a component supplier in accordance with some embodiments.

FIG. 14 illustrates an operation flow/algorithmic structure 1400 that describes operations of an electronic contract between two entities, for example, a manufacturer and a component supplier, in accordance with some embodiments. This embodiment is shown for illustrative purposes, other embodiments are envisioned between any two entities in the business process and other physical embodiments of contracts that depend on claim and evidence elements of an object story.

The flow/structure 1400 begins at 1401 with authentication of the user of an information system, for example, a manufacturing information system, and obtaining rights and roles that allow the user to process an object story. This may be similar to that described above with respect to FIG. 8. Once the information system has obtained the necessary permissions, it opens the electronic contract. This electronic contract can be stored within an object story or it can be stored within a separate database or business information system. The information system executes the code of the electronic contract at 1403. The electronic contract requests the appropriate object story from the story manager at 1404. This can be one or more product object stories, or it can be the object story for a facility, entity, location, or component thereof. The electronic contract executes code that reads claim and evidence elements from the object story at 1405, checks the cryptographic integrity of those elements, and determines if the evidence elements meet the requirements expressed in the electronic contract. If the conditions are met at 1406, the electronic contract takes the necessary steps to transfer value to the other party at 1408. If the conditions are not met, the electronic contract notifies the other party as to the failure to fulfill the conditions of the electronic contract at 1407. The electronic contract then creates claim and evidence elements within the object story to indicate the results of the conditions at 1409 and provides it to the Story manager for permanent storage.

Figure 15:
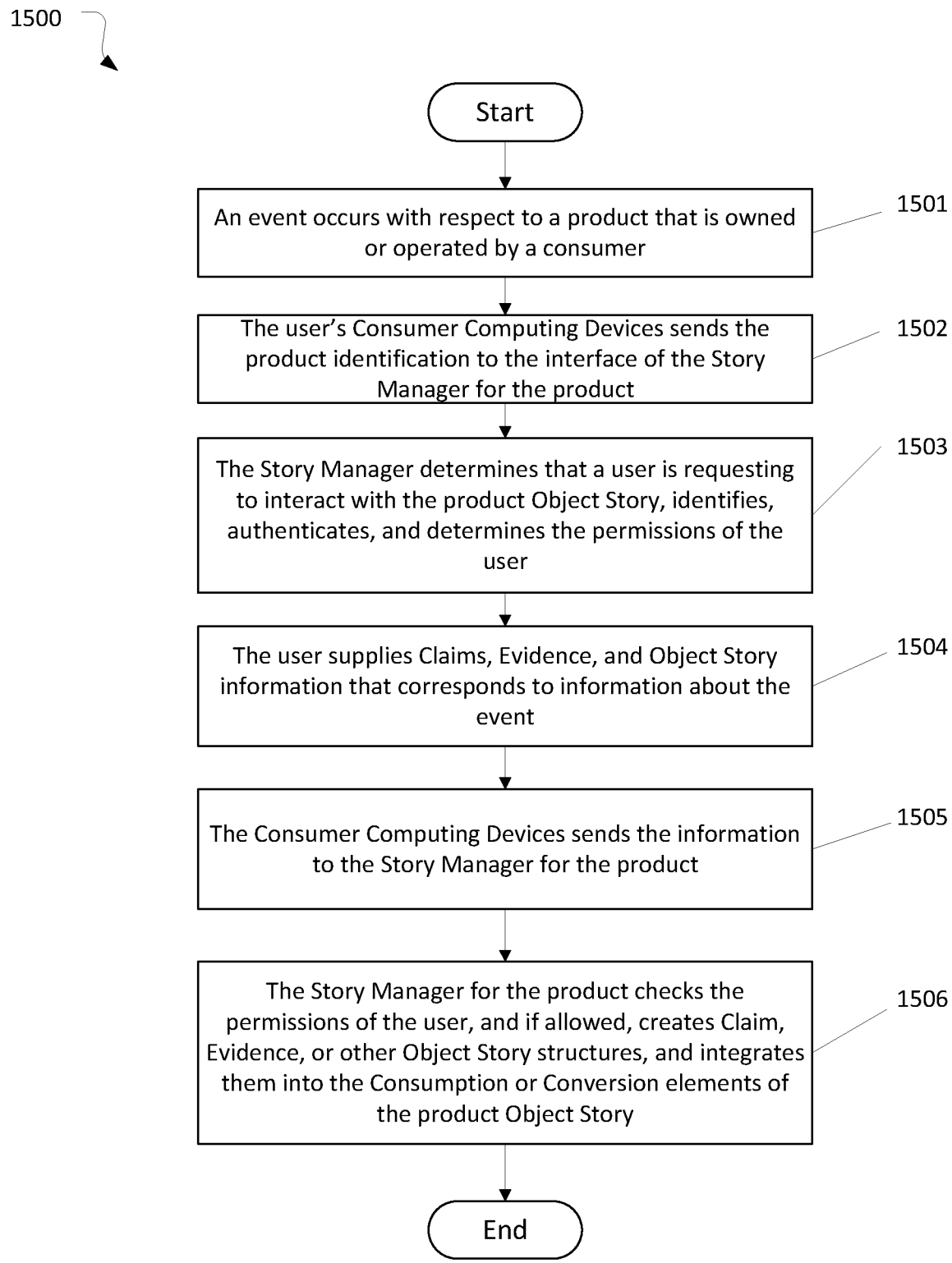
FIG. 15 illustrates an operation flow/algorithmic structure that describes consumer addition to an object story in accordance with some embodiments.

FIG. 15 illustrates an operation flow/algorithmic structure 1500 that describes consumer addition to an object story in accordance with some embodiments. In some embodiments, the object story may be delivered to an end consumer via the consumer computing device at a point of purchase. In other embodiments, the object story can be used beyond the point of purchase for an entity to communicate information about an object. For example, a rental car company may want to keep track of the maintenance performed on their vehicles through object story information. Ownership, rental and maintenance information, and other information may be stored within the product object story for the cars so that future owners can query the object story for the car they are purchasing to verify its history.

Given that the object story structures contain information across the entire lifecycle of a product, information from consumers is important to both future owners of the item as well as the manufacturer to determine the long term effects of the items that it creates. In flow/structure 1500, the user adds information to the object story for a product object story At 1501, an event occurs with respect to the product that the user wishes to record. This event could be maintenance or repair, or it could be repurposing or disposal of the product. The user interacts with their consumer computing device to identify the product at 1502. The consumer computing device identifies the product to the story manager at 1502. The story manager retrieves the appropriate object story at 1503, determines the permissions of the consumer, and receives the information that user wishes to specify at 1504 and 1505. Embodiments of this can include product ownership registration, maintenance records for the product, user reviews, or indications of the disposal or recycling of the product.

The information supplied in 1505 can be either free-form (such as an email) or it can be formatted into claim, evidence, and object story structures by the consumer computing device. For example, a transmission overhaul could be specified by the consumer computing device as a set of claims and evidence of the date and time of the work, along with a product object story for the replacement parts, a facility object story of the location where the work took place, and a company object story representing the person performing the work containing their certifications to perform the work correctly.

The story manager integrates this information into the appropriate sections of the product object story at 1506. This information can now be part of the record for the given product item.

Figure 16:
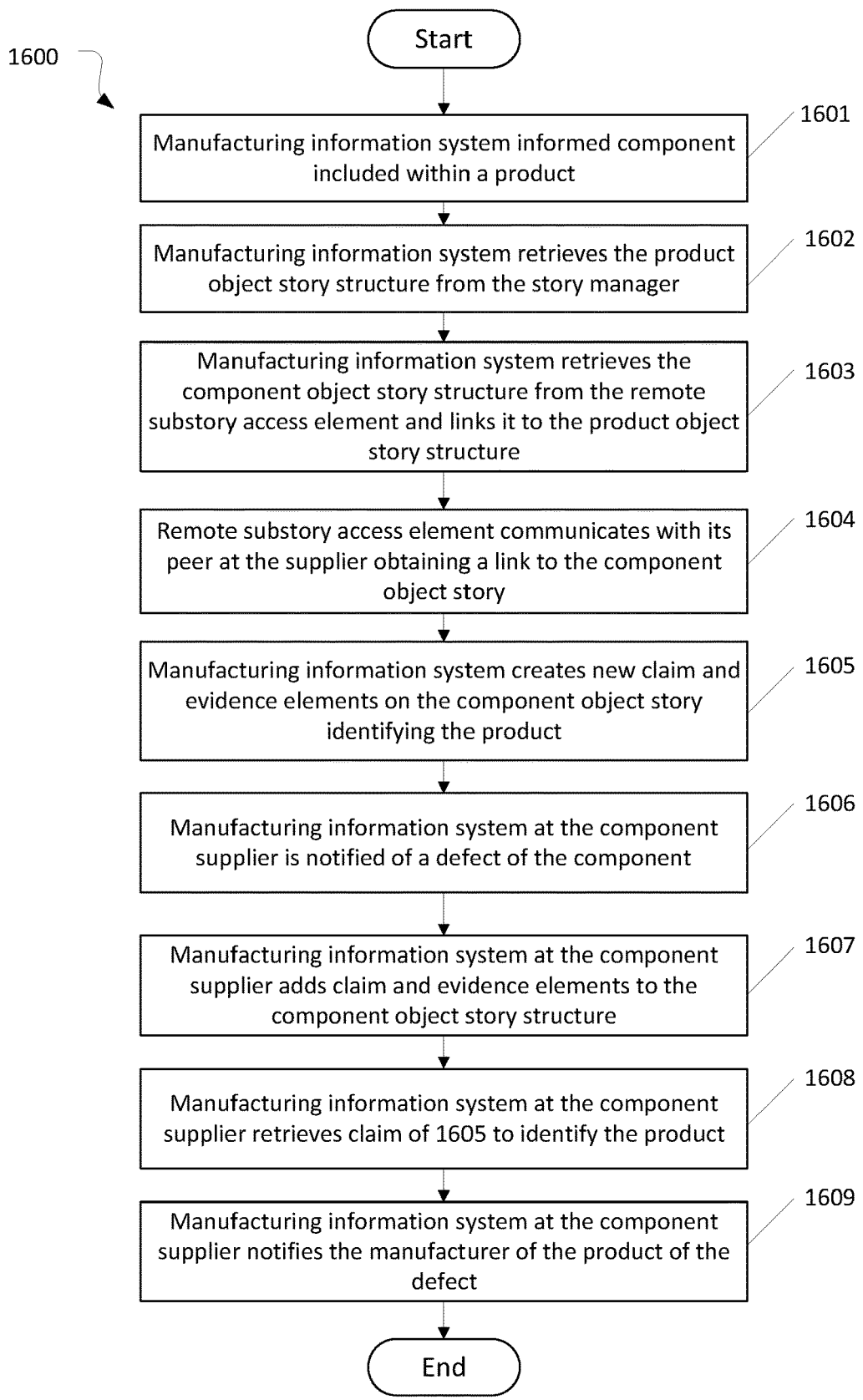
FIG. 16 illustrates an operational flow/algorithmic structure that describes bidirectional business information flow using distributed linked object stories in accordance with some embodiments.

FIG. 16 illustrates an operational flow/algorithmic structure 1600 that describes bidirectional business information flow using distributed linked object stories in accordance with some embodiments.

As stated above, the object story structures may be hierarchical and fully recursive. An object story for an item may reference the object story structures for each of its constituent components and may also reference object stories for the facilities, entities, and locations involved in the manufacture. When the computing elements that manage the object story structures (see e.g., OSM system 250 of FIG. 2) integrate the object story of an component, they can be copied locally by the story manager 201 or they can remain distributed to the component supplier and be managed through the remote substory access module 204. In the embodiment where they are distributed, the object story computing elements can maintain business-to-business intelligence and communications through use of the integrated object story structures. Information about component usage and quality can be added to the component object story by the manufacturer to be communicated to the component producer. Information about changes to the component status—such as defects or recalls—can be communicated to the manufacturer and traced at the serial number level. This flow shows this bi-directional communications path through alerts sent from the product manufacturer's object story computing elements to the component supplier's object story computing elements.

The flow/structure 1600 shows the bi-directional nature of the business information that is available in a distributed embodiment of an object story computing system. In operations 1601-1603, the manufacturing information system determines that a particular component has been included in the manufacturing process and links the component's object story into the product object story. In doing so, the remote substory access element communicates with its peer at the supplier site and retrieves a link to the component object story structures at 1604. The manufacturer's manufacturing information system then creates new claim and evidence elements into the component's object story structures to identify the product into which the component was included at 1605. Sometime later at 1606, the manufacturing information system at the component supplier is notified of a defect in the component. The manufacturing information system at the component supplier adds claims and evidence elements to the object story structure noting the fault at 1607. It then retrieves the claim and evidence elements added to the component object story by the manufacturer identifying the manufactured product in which the defective component was included at 1608. The component manufacturing information system can then notify the product manufacturer of a recall or product defect through, for example, an out-of-band mechanism at 1609.

Figure 17:
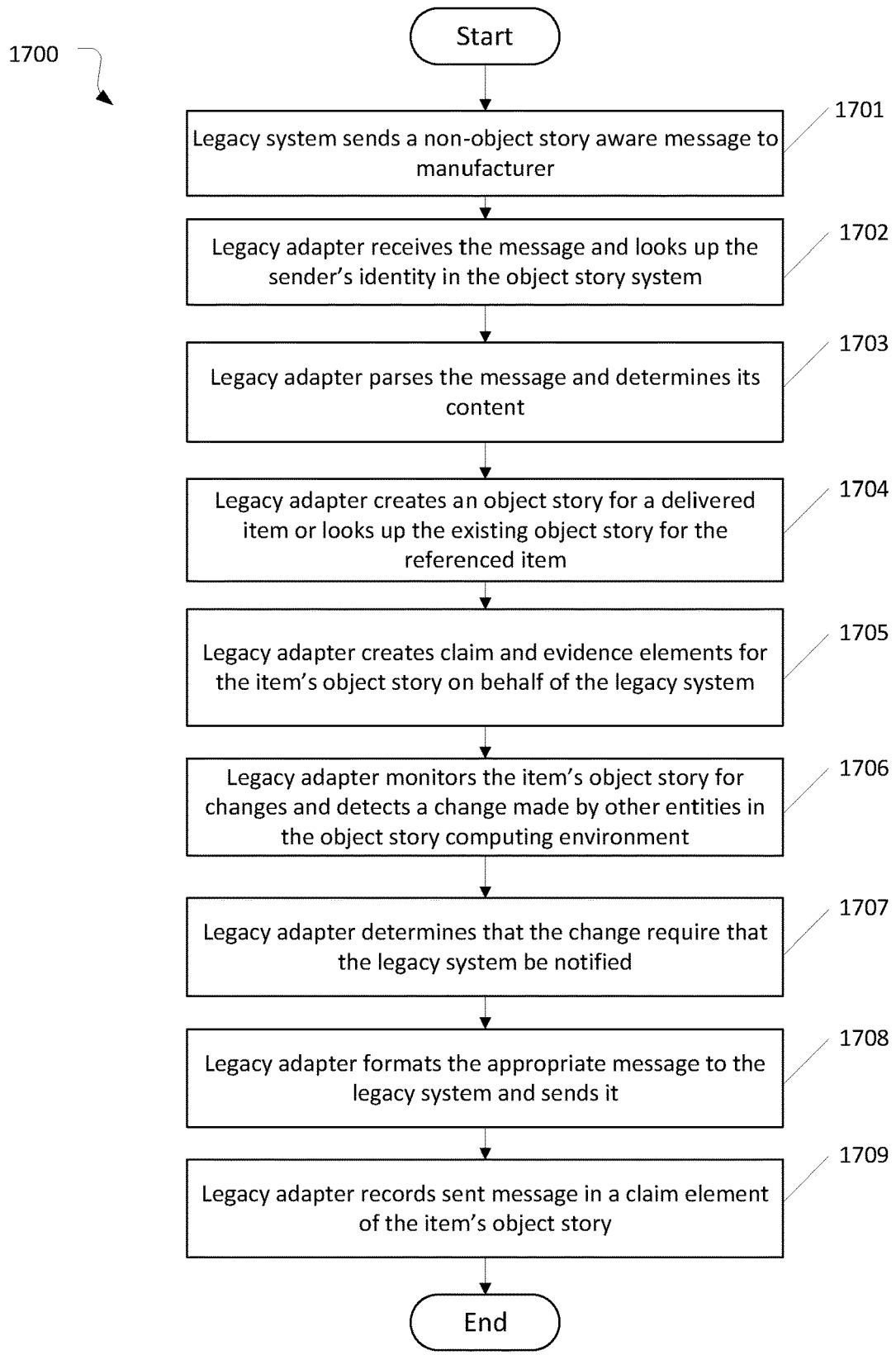
FIG. 17 illustrates an operational flow/algorithmic structure the describes legacy partner integration in accordance with some embodiments.

FIG. 17 illustrates an operational flow/algorithmic structure 1700 that describes legacy partner integration in accordance with some embodiments.

The core of the communication between the peers in the object story process is focused on the object story structures (see, for example, FIGS. 6 and 7). Some entities may not have a full object story aware infrastructure as defined in FIG. 2. These entities are considered legacy entities. They may have a wide range of business information system with varying degrees of sophistication; some may be running sophisticated business software that is not object story aware, while others may be small suppliers that are run mostly by email or paper-based transactional systems. In order to integrate those suppliers into an object story computing environment, a legacy adapter (see, for example, legacy adapter 211 of FIG. 2) is defined as a computing element that bridges between a legacy system (for example, legacy system 212 of FIG. 2) and the object story aware system.

The flow/structure 1700 describe operations of legacy adapter computing element and the legacy system to ensure that bi-directional communication is enabled between the object story aware system and a legacy entity. Other embodiments can support other configurations where the supplier may be object story aware but the manufacturer is using legacy systems. The flow/structure 1700 shows only one message flowing from the supplier to the manufacturer and one message flowing back to the legacy system. In other embodiments many different kinds of messages can be supported between these entities.

In flow/structure 1700, the process begins at 1701 where a legacy system sends a non-object aware message to the manufacturer. This message can be in a plurality of formats including machine-to-machine business messages, email, text messages, etc. The legacy adapter receives the message and, at 1702, identifies the sender from the contents of the message and looks up the identity of the sender in the object story computing system. This includes the authorization and authentication information from the authentication manager (see, for example, authentication manager 202 of FIG. 2) and the supplier's cryptographic identity from the certification manager (see, for example, certification authority module 203 of FIG. 2). At 1703, the legacy adapter parses the message. There are a wide range of embodiments comprehended in this step from determining the fields of an electronic machine-to-machine message to natural language processing on a human generated email message.

The legacy adapter determines the content of the message and identifies the changes that must take place in the object story system due to this message. For example, this could be an email message identifying shipment of an ingredient and the legacy adapter needs to create the corresponding object story structures for the ingredient, the supplier, and the transporter. It could also reference an entity which already has an object story structure representation in which case the legacy adapter looks up the necessary object story structure based on identifying information in the message at 1704. The legacy adapter then reads and writes claims and evidence elements in order to carry out the actions required by the message at 1705. This may include encapsulating the original message in an evidence element as proof that the message was received and acted upon. The legacy adapter takes these actions with the identity of and on behalf of the legacy system.

At 1706, the legacy adapter monitors select object story structures for changes that must generate information flows back to the legacy system. When the legacy adapter creates an object story at 1704, it assumes responsibility for monitoring the object story structure and proactively sending information about the item to the legacy system. When a change occurs on a monitored object story, the legacy adapter determines when a message is required to be sent to the legacy system and the necessary format of that message at 1707. The legacy adapter formats the appropriate message, gathers any necessary login information to the legacy system, authenticates itself and sends the message at 1708. This message may be in any of a number of formats, from a properly formatted machine-to-machine business information message, to a human readable email, text message, or a synthesized voice phone message. The legacy adapter then records the message as a claim and evidence element documenting the message at 1709.

Figure 18:
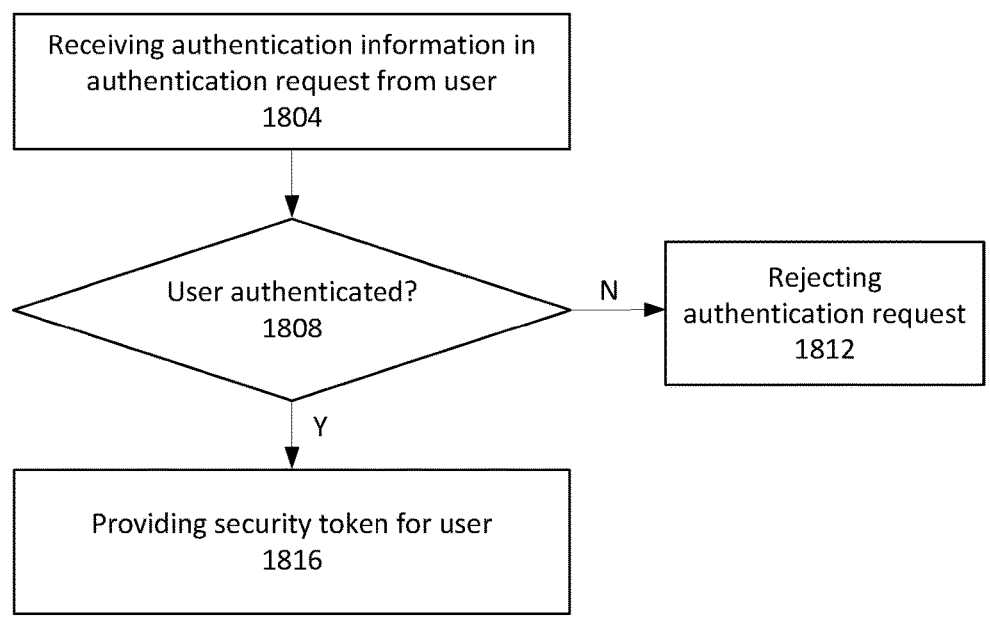
FIG. 18 illustrates an operation flow/algorithmic structure that may be used to authenticate a user's access to an object story in accordance with some embodiments.

FIG. 18 illustrates an operation flow/algorithmic structure 1800 that may be used to authenticate a user's access to an object story in accordance with some embodiments. In some embodiments, the flow/structure 1800 may be performed by the authentication manager 202 or components thereof.

The flow/structure 1800 may include, at 1804, receiving authentication information in an authentication request from a user. In some embodiments, the authentication request may be received from a user device such as consumer computing device 206 or any other user device. In some embodiments, the authentication request may be received from another entity based on a request from the user device. For example, the user device may request access to an object story, and another element of the OSM system 250 may generate and send the request to the authentication manager 202 based on the request from the user device. In some embodiments, the other element of the OSM system 250 may be, for example, the story manager 201, the certification authority 203, or the remote story access module 204 and may be from the same entity or a different entity that controls the authentication manager 202 performing the flow/structure 1800.

The flow/structure 1800 may further include, at 1808, determining whether the user is authenticated. Any of the variety of authentication mechanisms may be used for this process.

If, at 1808, it is determined that the user is not authenticated, the flow/structure 1800 may further include, rejecting the authentication request 1812. The rejection of the authentication request may include generating and sending a message to the requesting entity, for example, the user device or another entity of the OSM system 250.

If, at 1808, it is determined that the user is authenticated, the flow/structure 1800 may further include, providing a security token for the user. In some embodiments, the security token may be provided to a Manufacturing Info System (FIG. 2, 213) or another device (for example, the requesting entity).

Figure 19:
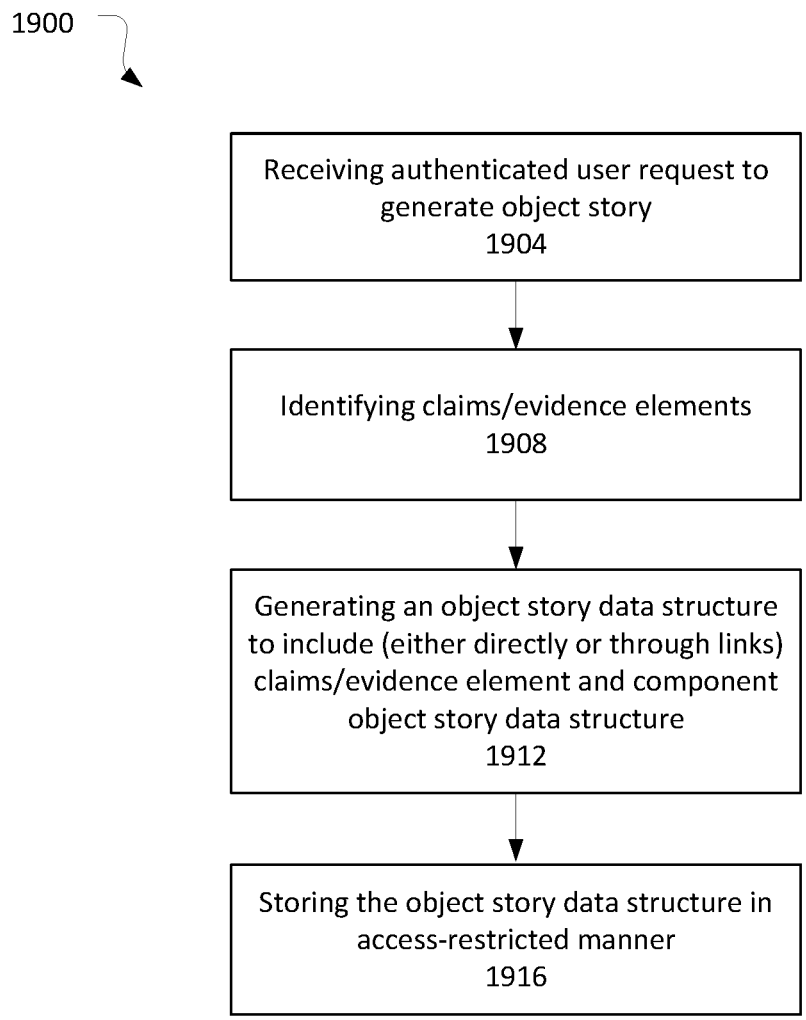
FIG. 19 illustrates an operation flow/algorithmic structure that may be used to generate an object story data structure in accordance with some embodiments.

FIG. 19 illustrates an operation flow/algorithmic structure 1900 that may be used to generate an object story data structure in accordance with some embodiments. In some embodiments, the flow/structure 1900 may be performed by the story manager 201 or components thereof.

The flow/structure 1900 may include, at 1904, receiving an authenticated user request to generate an object story. The request may have been authenticated as described elsewhere herein. The object story may correspond to a product object story, a component object story, a facility object story, a location object story, or an entity object story.

The flow/structure 1900 may further include, at 1908, identifying claims/evidence elements. The claim element may include an assertion about conditions related to the product facility, location or entity, and the evidence element may support the veracity of the assertion. In some embodiments, the claims may correspond to one or more lifecycle elements such as, for example, an origin story element, a custody story element, a consumption story element, or conversion story element. In some embodiments, one or more requests may be sent to other computing systems to identify the claims or evidence elements.

The flow/structure 1900 may further include, at 1912, generating an object story data structure to include the claim/evidence elements. In some embodiments, the inclusion of the claim/evidence elements may be done by incorporating a series of links from the object story data structure to lifecycle elements of the data structure, to claim/evidence elements or to other object story data structures as described elsewhere herein.

The flow/structure 1900 may further include, at 1916, storing the object story data structure in an access restricted manner. Portions of the object story data structure, including portions incorporated through one or more links, may be stored in a common database, a distributed database across multiple sites, or in one or more distributed ledgers. Access to parts of the object story data structure may be restricted based on entity roles.

Figure 20:
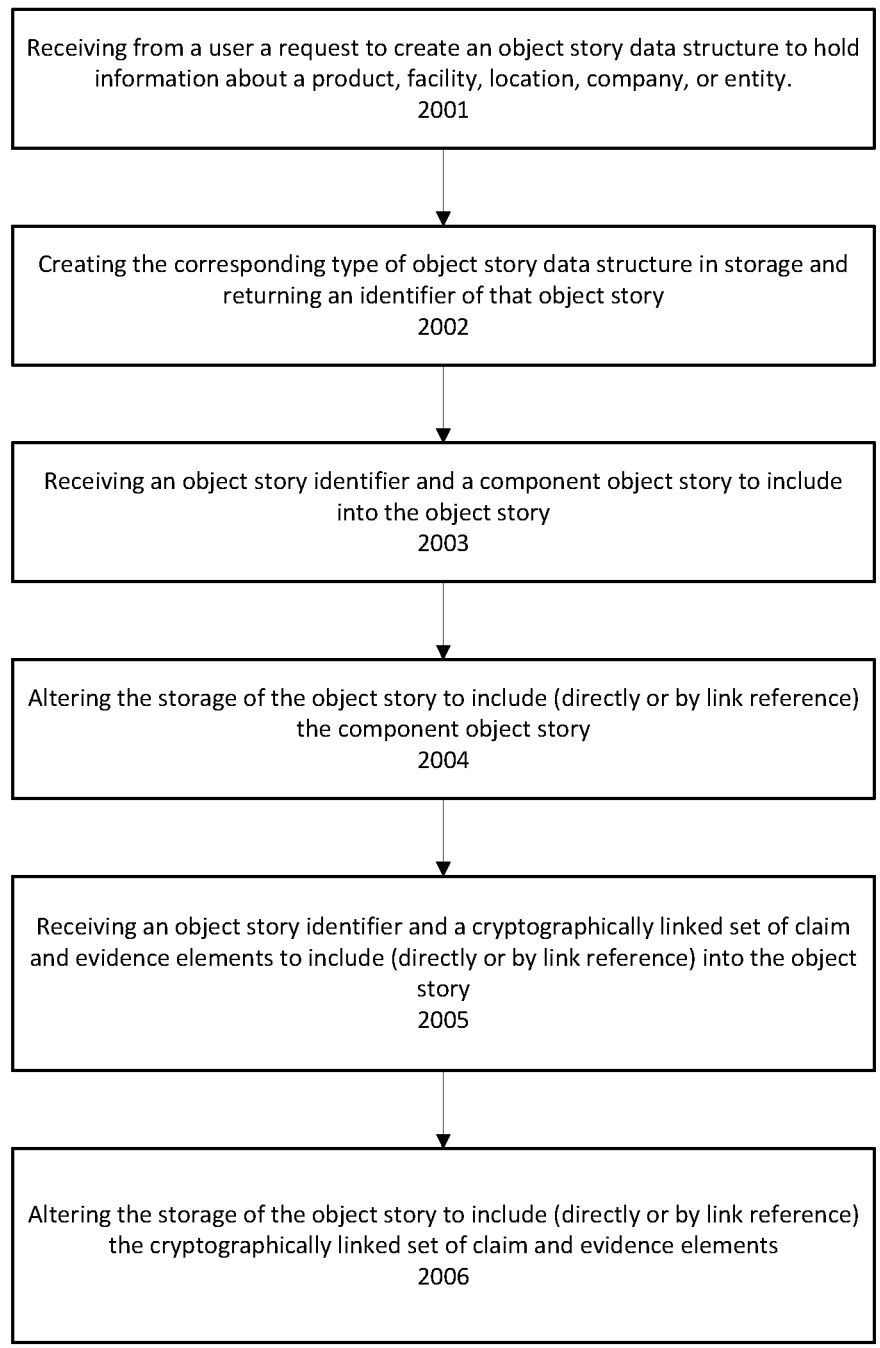
FIG. 20 illustrates an operation flow/algorithmic structure that may be used to generate/alter an object story data structure in accordance with some embodiments.

FIG. 20 illustrates an operation flow/algorithmic structure 2000 that may be used to generate/alter an object story data structure in accordance with some embodiments. In some embodiments, the flow/structure 2000 may be performed by one or more modules of an OSM system 250 or components thereof.

The flow/structure 2000 may include, at 2001, receiving, from a user, a request to create an object story data structure to hold information about a product, facility, location, company or entity.

The flow/structure 2000 may further include, at 2002, creating the object story data structure in storage and returning and identifier of the object story. The object story data structure may be any of the types of object story data structures. The identifier may be a GUID that may be used in later accesses (either read or write accesses) to the object story data structure.

The flow/structure 2000 may further include, at 2003, receiving the object story identifier (for example, the GUID) and a component object story to include into the object story data structure. The component object story may include information about a component (for example, an ingredient, a part, or subassembly) of a product or about a sub-part of a larger entity/location/facility (for example a building as a part of a facility, or a department as part of a company). The component object story may have been created by an entity different than the entity creating the main object story.

The flow/structure 2000 may further include, at 2004, altering the storage of the object story data structure to include, directly or by the linked reference, the component object story.

The flow/structure 2000 may further include, at 2005, receiving an object story identifier (e.g., the GUID) and the cryptographically linked set of claim and evidence elements to include, directly or by linked reference, into the object story.

The flow/structure 2000 may further include, at 2006, altering the storage of the object story data structure to include, directly or by the linked reference, the cryptographically linked set of claim and evidence elements.

Figure 21:
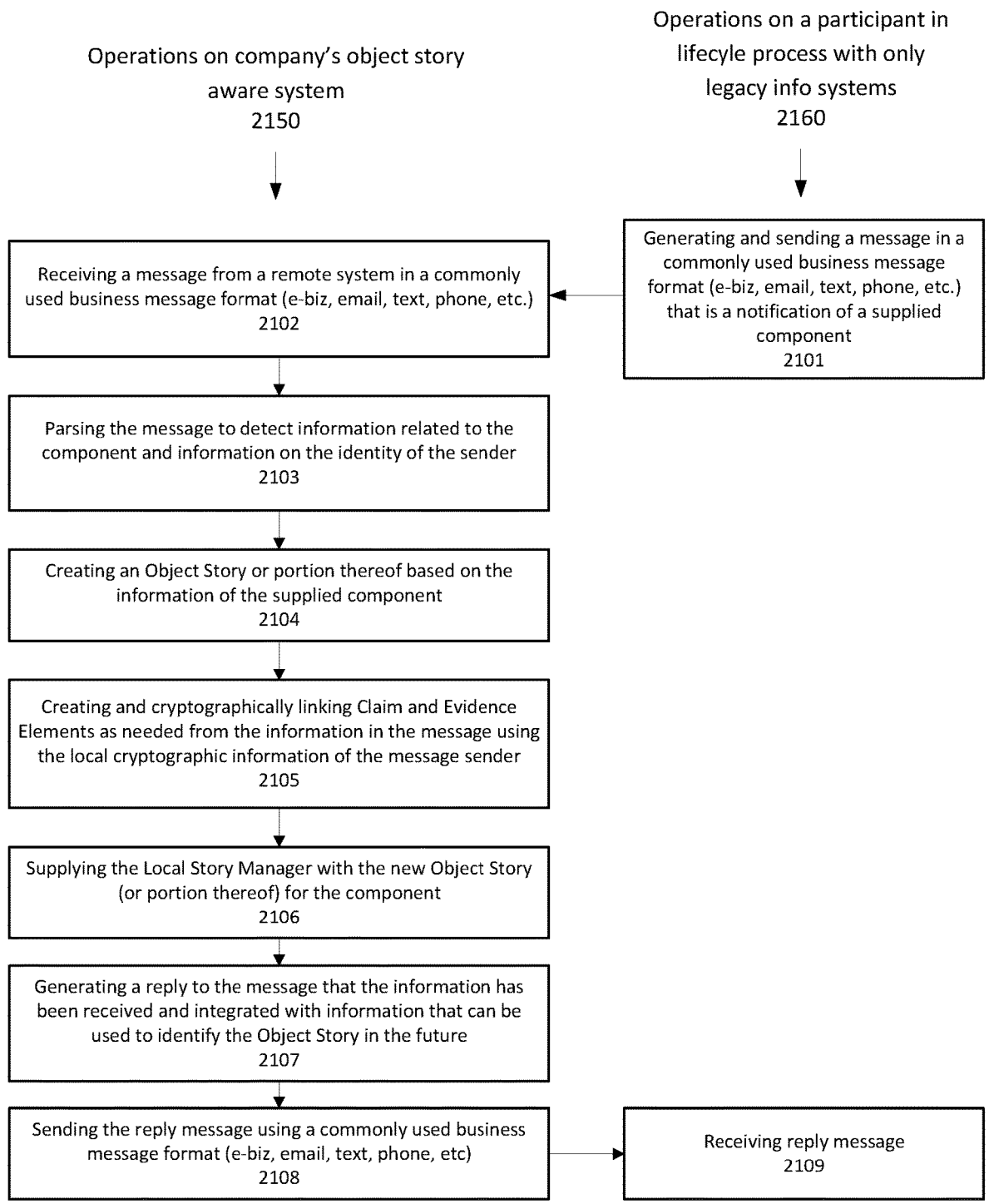
FIG. 21 illustrates operation flows/algorithmic structures that may be used to generate an object story data structure in accordance with some embodiments.

FIG. 21 illustrates operation flows/algorithmic structures 2150 and 2160 that may be used to generate an object story data structure in accordance with some embodiments. In some embodiments, the flow/structure 2150 may be performed by one or more modules of a company's object story aware system (for example, a legacy adapter) and flow/structure 2160 may be performed by a participant in the lifecycle process with only legacy information systems.

The flow/structure 2160 may include, at 2101, generating and sending a message in a commonly used business message format. The format may be E/biz, email, text, phone, etc. The message may be a notification of the supplied component (for example, part, ingredient, or subassembly)

The flow/structure 2150 may include, at 2102, receiving the message (sent at 2101) from the remote system.

The flow/structure 2150 may further include, at 2103, parsing the message to detect information related to the component and information on the identity of the sender.

The flow/structure 2150 may further include, at 2104, creating an object story or portion thereof based on the information of the supplied component.

The flow/structure 2150 may further include, at 2105, creating and cryptographically linking claim and evidence elements as needed from the information in the message using the local cryptographic information of the message sender.

The flow/structure 2150 may further include, at 2106, supplying the local story manager with a new object story (or portion thereof) for the item being referenced.

The flow/structure 2150 may further include, at 2107, generating a reply to the message that the information has been received and integrated with information that can be used to identify the object story (or portion thereof) in the future.

The flow/structure 2150 may further include, at 2108, sending the reply message using a commonly used business message format. The message format may be similar to that of the message received at 2102.

The flow/structure 2160 may further include, at 2109, receiving the reply message.

Figure 22:
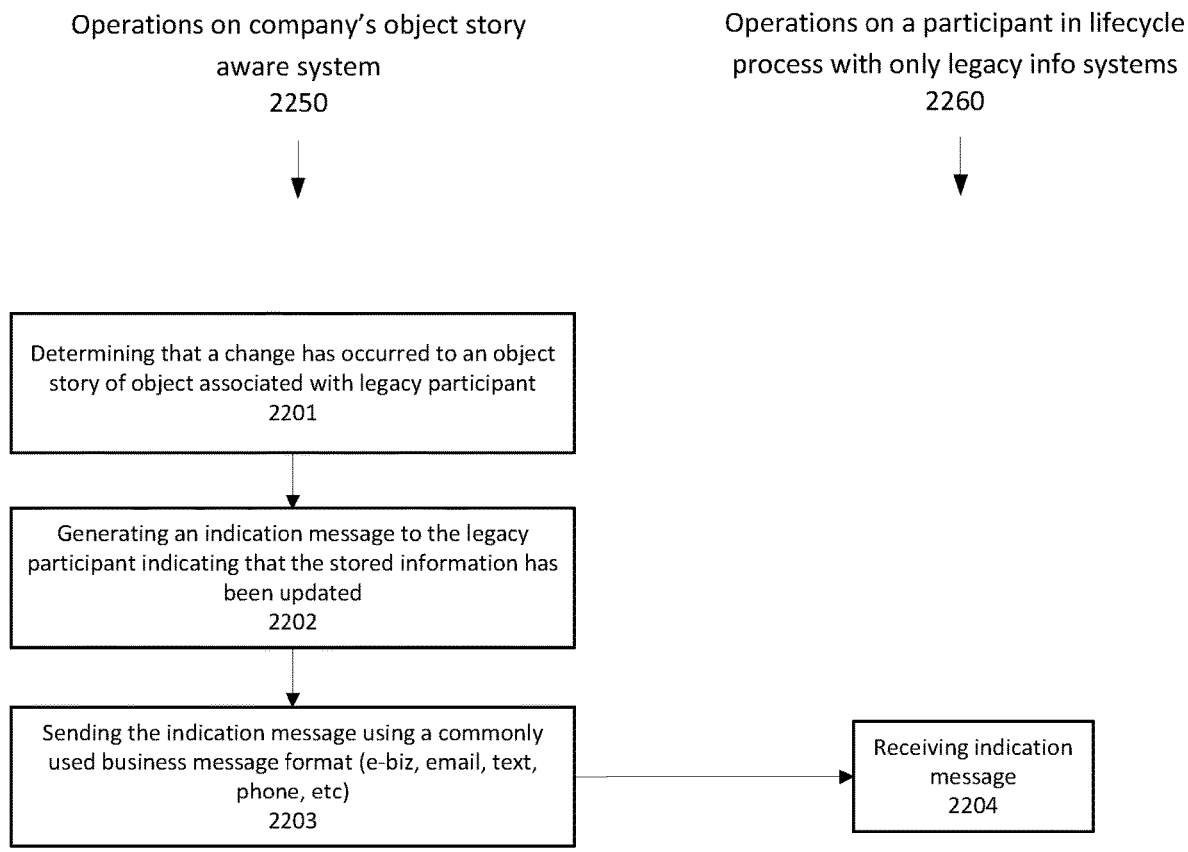
FIG. 22 illustrates operation flows/algorithmic structures that may be used to provide an indication of a change of a component object story data structure in accordance with some embodiments.

FIG. 22 illustrates operation flows/algorithmic structures 2250 and 2260 that may be used to provide an indication of a change of an object story data structure in accordance with some embodiments. In some embodiments, the flow/structure 2250 may be performed by one or more modules of a company's object story aware system (for example, a legacy adapter) and flow/structure 2260 may be performed by a participant in a lifecycle process with only legacy information systems.

The flow/structure 2250 may include, at 2201, determining the changes occurred to an object story related to an object associated with a legacy participant. The object story may correspond to a product or component that was sourced by the legacy participant. In other embodiments, the object story may be one created to represent the facility or company of the legacy participant.

The flow/structure 2250 may further include, at 2202, generating an indication message to the legacy participant indicating that the stored information has been updated.

The flow/structure 2250 may further include, at 2203, sending the indication message using a commonly used business message format.

The flow/structure 2260 may include, at 2204, receiving the indication message sent at 2203.

Figure 23:
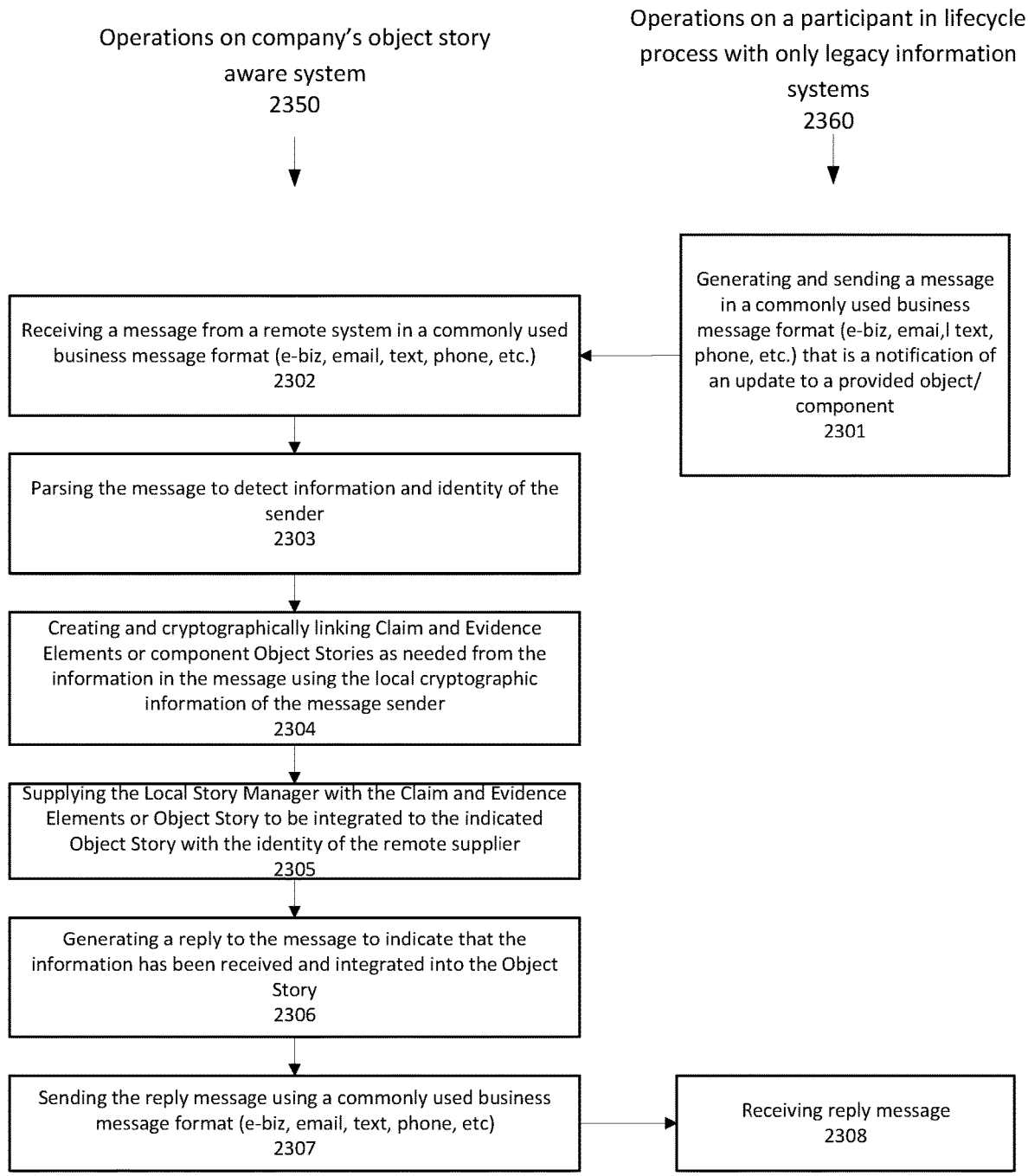
FIG. 23 illustrates operation flows/algorithmic structures that may be used to update an object story data structure in accordance with some embodiments.

FIG. 23 illustrates operation flows/algorithmic structures 2350 and 2360 that may be used to update an object story data structure in accordance with some embodiments. In some embodiments, the flow/structure 2350 may be performed by one or more modules of a company's object story aware system (for example, a legacy adapter) and flow/structure 2360 may be performed by a participant in a lifecycle process with only legacy information systems.

The flow/structure 2360 may include, at 2301, generating and sending a message in a commonly used business message format. The message may serve as a notification of an update to an object/component provided by the legacy information system.

The flow/structure 2350 may include, at 2302, receiving the message (sent at 2301) from the remote system.

The flow/structure 2350 may further include, at 2303, parsing the message to detect information identifying the updated object/component and the identity of the sender.

The flow/structure 2350 may further include, at 2304, creating and cryptographically linking claim and evidence elements or an entire object story as needed from the information in the message using the local cryptographic information of the message sender.

The flow/structure 2350 may further include, at 2305, supplying the local story manager with the claim and evidence elements or newly created object story to be integrated into an object story with the identity of the remote supplier.

The flow/structure 2350 may further include, at 2306, generating a reply to the message to indicate that the information has been received and integrated with the indicated object story.

The flow/structure 2350 may further include, at 2307, sending the reply message using a commonly used business message format. The message format may be similar to that of the message received at 2302.

The flow/structure 2360 may further include, at 2308, receiving the reply message.

Figure 24:
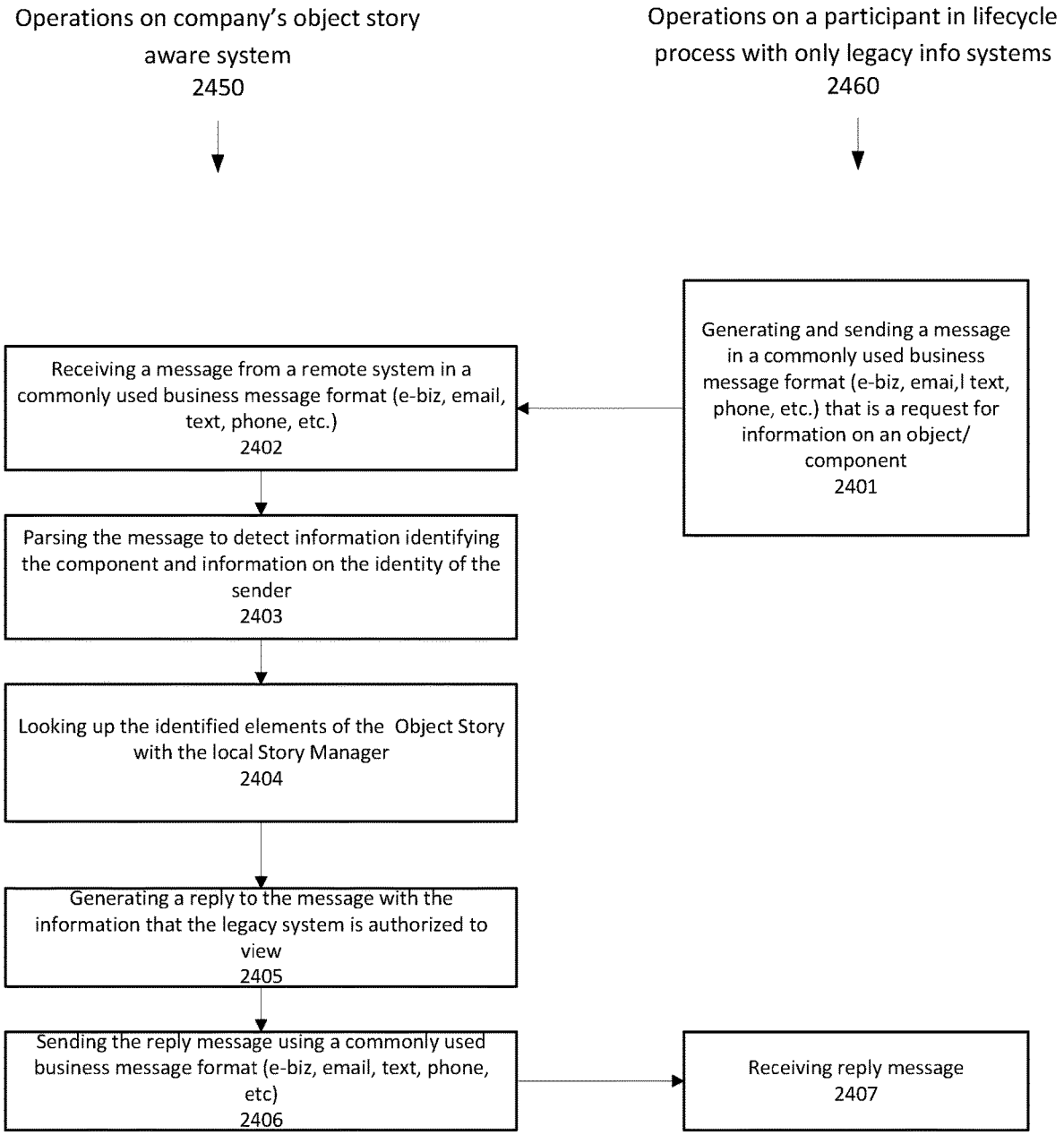
FIG. 24 illustrates operation flows/algorithmic structures that may be used to access information of an object story data structure in accordance with some embodiments.

FIG. 24 illustrates operation flows/algorithmic structures 2450 and 2460 that may be used to access information of an object story data structure in accordance with some embodiments. In some embodiments, the flow/structure 2450 may be performed by one or more modules of a company's object story aware system (for example, a legacy adapter) and flow/structure 2460 may be performed by a participant in a lifecycle process with only legacy information systems.

The flow/structure 2460 may include, at 2401, generating and sending a message in a commonly used business message format. The message may serve as a request for information on an object or component.

The flow/structure 2450 may include, at 2402, receiving the message (sent at 2401) from the remote system.

The flow/structure 2450 may further include, at 2403, parsing the message to detect information identifying the object/component and information on the identity of the sender.

The flow/structure 2450 may further include, at 2404, looking up information on the identified object/component in a corresponding object story with the local story manager.

The flow/structure 2450 may further include, at 2405, generating a reply to the message with the information that the legacy system is authorized to view.

The flow/structure 2450 may further include, at 2406, sending the reply message using a commonly used business message format. The message format may be similar to that of the message received at 2402.

The flow/structure 2460 may further include, at 2407, receiving the reply message.

Figure 25:
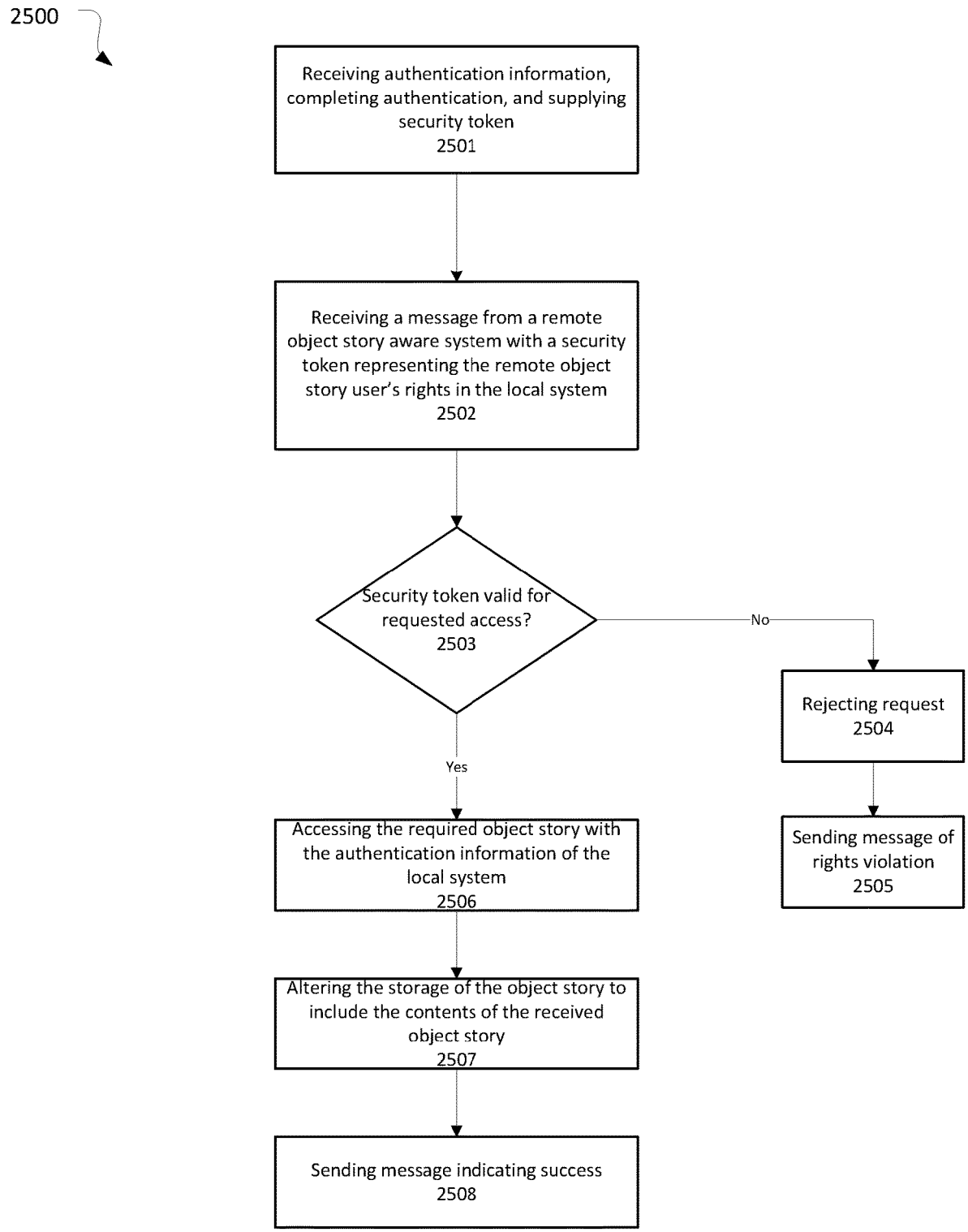
FIG. 25 illustrates an operation flow/algorithmic structure that may be used to provide secured access to an object story data structure in accordance with some embodiments.

FIG. 25 illustrates an operation flow/algorithmic structure 2500 that may be used to provide secured access to an object story data structure in accordance with some embodiments. In some embodiments, the flow/structure 2500 may be performed by one or more modules of the computing system 200, which may be a company's object story aware system.

The flow/structure 2500 may include, at 2501, receiving authentication information, completing the authentication, and supplying a security token. The authentication information may be received in an authentication request from a component supplier object story aware system. This may be done consistent with the description of FIG. 18.

The flow/structure 2500 may further include, at 2502, receiving a message from a remote object story aware system with a security token representing the remote object story user's rights in the local system. The security token may be the same previously provided at 2501.

The flow/structure 2500 may further include, at 2503, determining whether the security token is valid for the requested access.

If it is determined, at 2503, that the security token is not valid for the requested access, the flow/structure 2500 may include rejecting the request at 2504, and sending a message of rights violation at 2505.

If it is determined, at 2503, that the security token is valid for the requested access, the flow/structure 2500 may include accessing the required object story with the authentication information of the local system at 2506.

Following 2506, the flow/structure 2500 may include, 2507, altering the storage of the object story to include the contents of the received object story. In other embodiments, other access operations may be performed including maintaining portions of the object story as links to other entities.

The flow/structure 2500 may further include, at 2508, sending a message indicating success.

Figure 26:
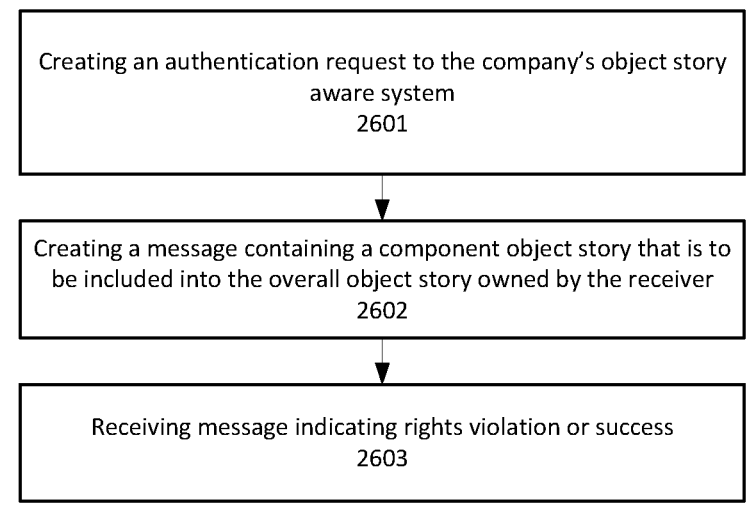
FIG. 26 illustrates an operation flow/algorithmic structure that may be used to access an object story data structure in accordance with some embodiments.

FIG. 26 illustrates an operation flow/algorithmic structure 2600 that may be used to access an object story data structure in accordance with some embodiments. In some embodiments, the flow/structure 2600 may be performed by one or more modules of the computing system 200, which may be any participant's object story aware system.

The flow/structure 2600 may include, at 2601, creating an authentication request. The authentication request may be sent to a company's object story aware system. The authentication request may include authentication information to authenticate a user of the remote object story aware system.

The flow/structure 2600 may further include, at 2602, creating a message containing a component object story that is to be included into a larger object story owned by the receiver of the message.

The flow/structure 2600 may further include, at 2603, receiving a message indicating either a rights violation or successful incorporation of the component object story into the object story.

Figure 27:
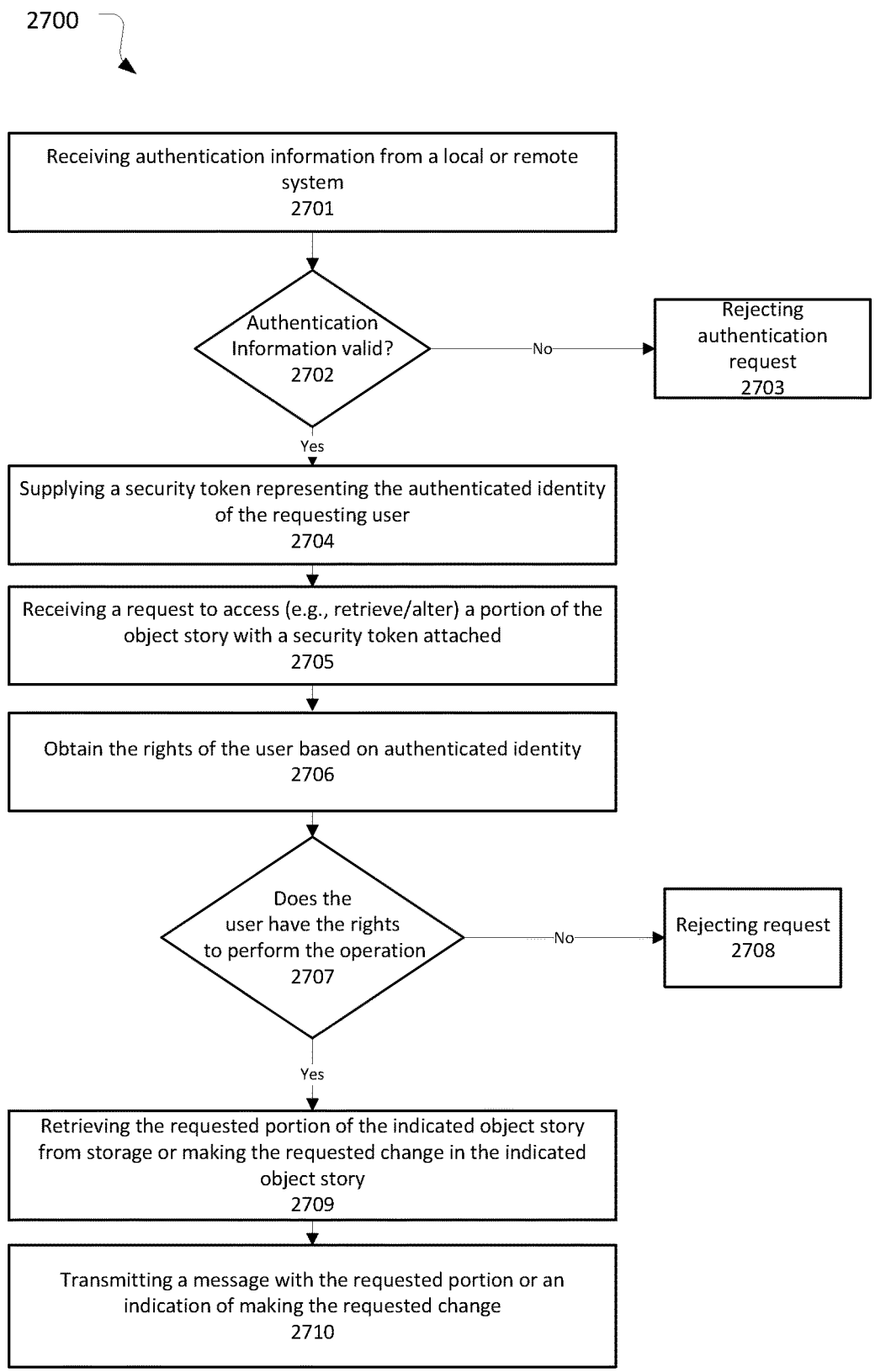
FIG. 27 illustrates an operation flow/algorithmic structure that may be used to provide secured access to an object story data structure in accordance with some embodiments.

FIG. 27 illustrates an operation flow/algorithmic structure 2700 that may be used to provide secured access to an object story data structure in accordance with some embodiments. In some embodiments, the flow/structure 2700 may be performed by one or more modules of the computing system 200.

The flow/structure 2700 may include, at 2701, receiving authentication information from a local or remote system.

The flow/structure 2700 may further include, at 2702, determining whether the authentication information is valid.

If it is determined that the authentication information is not valid at 2702, the flow/structure 2700 may further include, at 2703, rejecting the authentication request. The rejecting of the authentication request may include sending a message to the entity providing the authentication information or the related request.

If it is determined that the authentication information is valid at 2702, the flow/structure 2700 may further include, at 2704, supplying a security token representing the validated authentication of the requesting entity. The supplying may be done by transmitting a message to the system requesting authentication or to another entity.

The flow/structure 2700 may further include, at 2705, receiving a request to access a portion of an object story with a security token attached. The security token may be the same provided at 2704, or may be derived therefrom. The request to access may be a request to retrieve a portion of the object story or may be a request to alter a portion of the object story. As used herein, alter could include any modification including supplementing, amending, appending, etc.

At 2706, a module may obtain the access rights of the user based on the authenticated identity. In some embodiments, the access rights may be locally stored, or may be stored by a remote entity, in which case, a request may be sent to the remote entity for the access rights. The access rights may provide different levels of access to different portions of an object story based on roles that an entity plays with respect to a particular object story At 2707, the operation may include determining whether the user has sufficient rights to perform the requested operation.

If it is determined that the user does not have sufficient rights for the requested access at 2707, the flow/structure 2700 may advance to rejecting the request at 2708. The rejecting of the request may include sending a message to the entity requesting the access.

It is determined that the user has sufficient rights for the requested access at 2707, the flow/structure 2700 may further include performing the requested access. Performing the requested access may include retrieving the requested portion of the indicated object story from storage or making the requested alteration on the portion of the indicated object story. In some embodiments the output may be tailored to include only those portions to which the requester has rights. For example, if the request is for a product object story, but the user only has rights to access one of the component object stories within the product object story, the output may only include the component object story. The output may also provide an indication that the request for other parts of the product object story has been rejected The flow/structure 2700 may further include, at 2710, transmitting a message with the requested portion or an indication of making the requested change.

Figure 28:
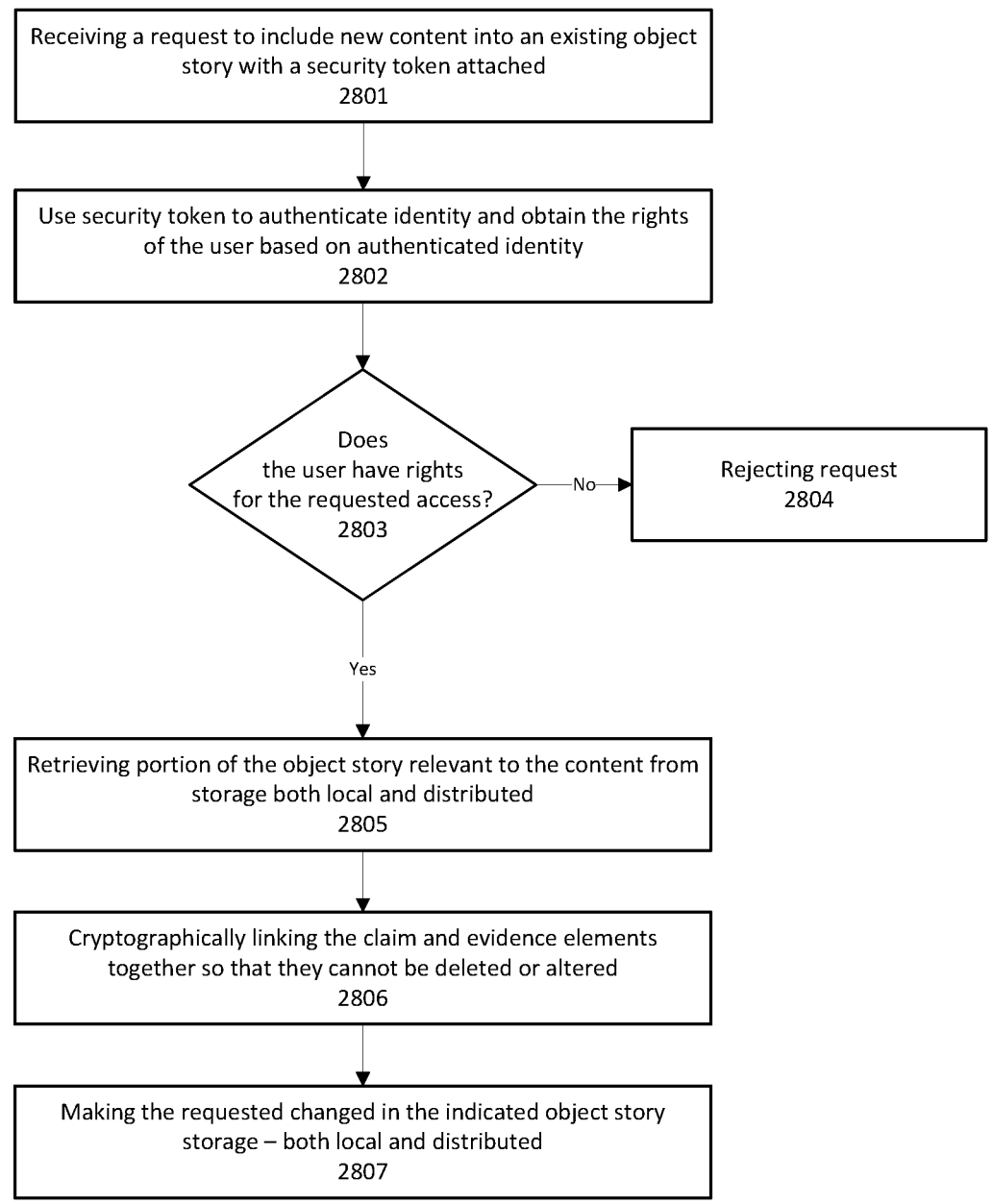
FIG. 28 illustrates an operation flow/algorithmic structure that may be used to change an object story data structure in accordance with some embodiments.

FIG. 28 illustrates an operation flow/algorithmic structure 2800 that may be used to change an object story data structure in accordance with some embodiments. In some embodiments, the flow/structure 2800 may be performed by one or more modules of the computing system 200.

The flow/structure 2800 may include, at 2801, receiving a request to include new content into an existing object story with the security token attached. The content may be claim/evidence elements or other object stories.

The flow/structure 2800 may further include, at 2802, using the security token to authenticate identity of the user and obtain access rights of the user based on the authenticated identity. This may be done similar to that discussed above with respect to FIG. 27.

If it is determined that the rights are not sufficient for the requested access at 2803, the flow/structure 2800 may include rejecting the request at 2804. The rejecting of the request may include sending a message to the entity requesting the access.

If it is determined that the rights are sufficient for the requested access at 2803, the flow/structure 2800 may further include receiving the portion of the object story relevant to the content from storage both local and distributed at 2805.

In the event the content includes claim/evidence elements, the flow/structure 2800 may further include, at 2806, cryptographically linking the claim/evidence elements together so they cannot be deleted or altered.

The flow/structure 2800 may further include, at 2807, making the requested change in the indicated object story as stored in both local and distributed storage.

In some embodiments, the flow/structure 2800 may not include a physical receipt of the distributed storage instances at 2805. Instead, the requested changes made at 2807 may be accomplished by sending messages to one or more remote entities that managed the distributed storage instances.

Figure 29:
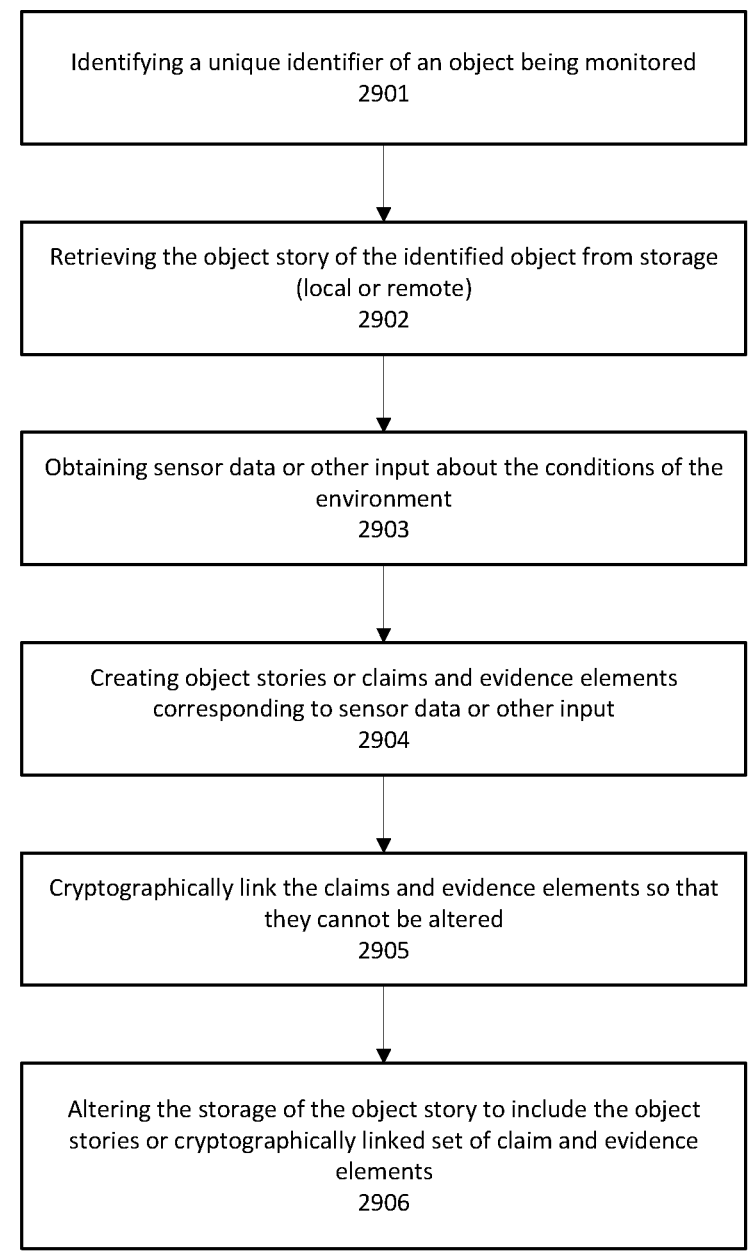
FIG. 29 illustrates an operation flow/algorithmic structure that may be used to generate claims/elements in an object story data structure in accordance with some embodiments.

FIG. 29 illustrates an operation flow/algorithmic structure 2900 that may be used to generate claims/elements in an object story data structure in accordance with some embodiments. In some embodiments, the flow/structure 2900 may be performed by one or more modules of the computing system 200.

The flow/structure 2900 may include, at 2901, identifying a unique identifier of an object (for example, product, component, facility, entity, or location) being monitored. Identification may be based on a sensor input, user input, or input from information monitoring systems.

The flow/structure 2900 may further include, at 2902, retrieving the object story of the identified object from storage. In some embodiments, the object story may be retrieved from local or remote storage.

The flow/structure 2900 may further include, at 2903, obtaining sensor data or other input about conditions of the environment. The sensor data/other input may be automatically generated or user initiated.

The flow/structure 2900 may further include, at 2904, creating claims/evidence elements or object stories corresponding to the sensor data or other input.

In the event the claims and evidence elements are created at 2904, the flow/structure 2900 may further include, at 2905, cryptographically linking the claims and evidence elements so that they cannot be altered.

The flow/structure 2900 may further include, at 2906, altering the storage of the object story for the monitored object to include the object stories or cryptographically linked set of claim/evidence elements.

Figure 30:
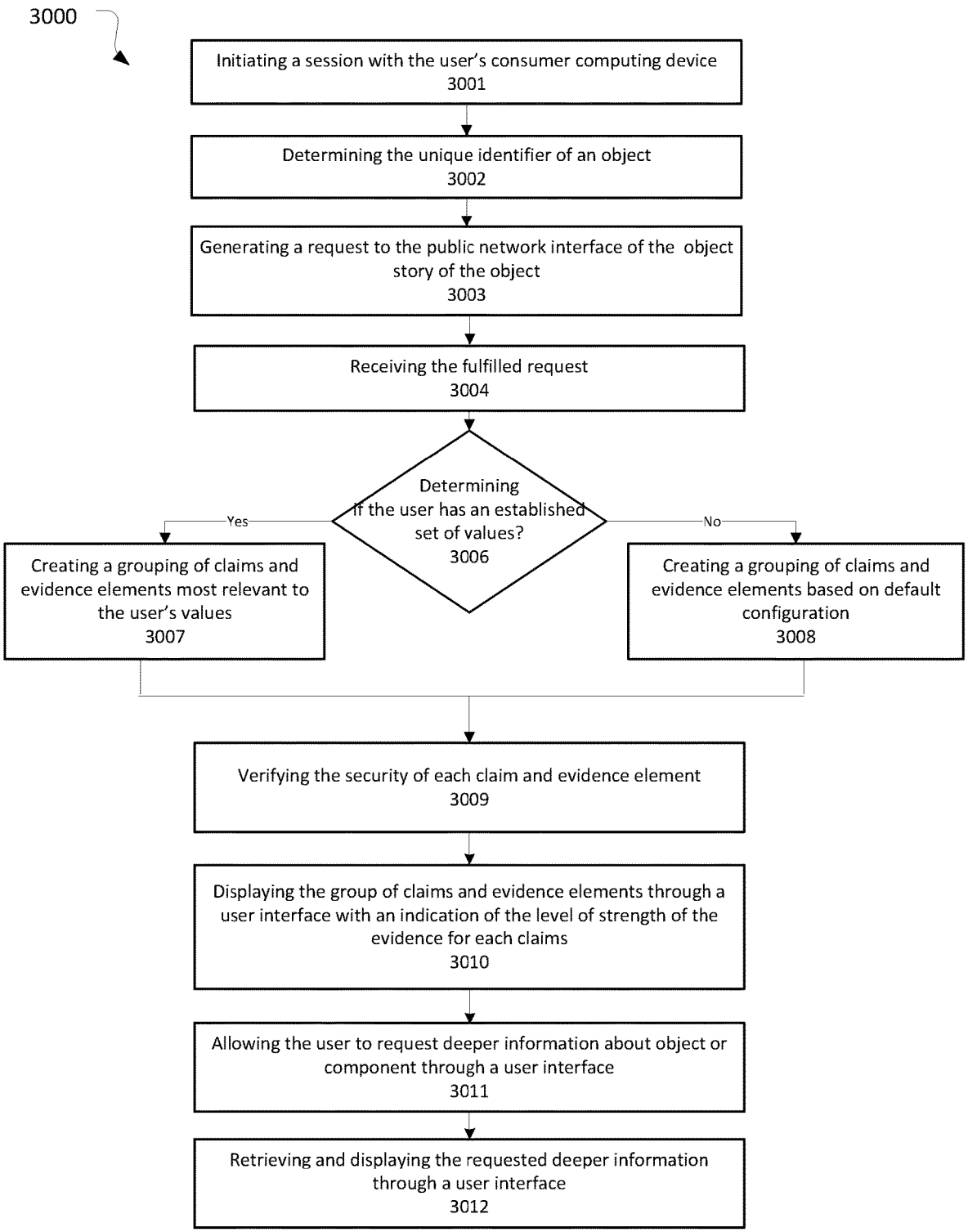
FIG. 30 illustrates an operation flow/algorithmic structure that may be used to manage an object story data structure in accordance with some embodiments.

FIG. 30 illustrates an operation flow/algorithmic structure 3000 that may be used to manage an object story data structure in accordance with some embodiments. In some embodiments, the flow/structure 3000 may be performed by one or more modules of the computing system 200 (for example, a user's consumer computing device).

The flow/structure 3000 may include, at 3001, initiating a session with a user's consumer computing device.

The flow/structure 3000 may further include, at 3002, determining a unique identifier of an object, for example, a product, a component, a facility, a location, or an entity. This may be done by scanning a portion of the label, a QR code, recognizing the information from an image, or some other sensor/user input.

The flow/structure 3000 may further include, at 3003, generating a request to the public interface module (FIG. 2 214) of the owner of an object story of the object. The request may be for some or all of the object story.

The flow/structure 3000 may further include, at 3004, receiving a fulfilled request. The fulfilled request may include some or all of the object story requested at 3003.

The flow/structure 3000 may further include, at 3006, determining whether the user has an established set of values.

If it is determined, at 3006, that the user has an established set of values, the flow/structure 3000 may further include, at 3007, creating a grouping of claims and evidence elements most relevant to the user's values.

If it is determined, at 3006, that the user does not have an established set of values, the flow/structure 3000 may further include, at 3008, creating a grouping of claims and evidence elements grouped according to a default configuration. The default configuration may be a grouping of information that is commonly requested.

The flow/structure 3000 may further include, at 3009, verifying the security of each claim and evidence element.

The flow/structure 3000 may further include, at 3010, displaying the group of claims and evidence elements through a user interface with an indication of the level of strength of the evidence for each of the claims.

The flow/structure 3000 may further include, at 3011, allowing the user to request deeper information about the object, or component thereof, through a user interface.

The flow/structure 3000 may further include, at 3012, retrieving and displaying the requested deeper information through the user interface.

While aspects flow/structure 3000 are described as being performed by a consumer computing device, in other embodiments, some or all of these operations may be performed by another entity. For example, some or all of the operations may be performed by the manufacturer's object story aware system. In these embodiments, the manufacturer's object story aware system may retrieve the established set of values for a particular user directly from the user or from a database storing such information.

The flow/structure 3000 shows the user interacting with a single entity for information on the object story of interest. Because of the nature of the object story structure to contain links to other object stories stored by other entities, this action may require consulting a number of other entity's object story aware systems, and performing the flow/structure 3000 with those systems.

Figure 31:
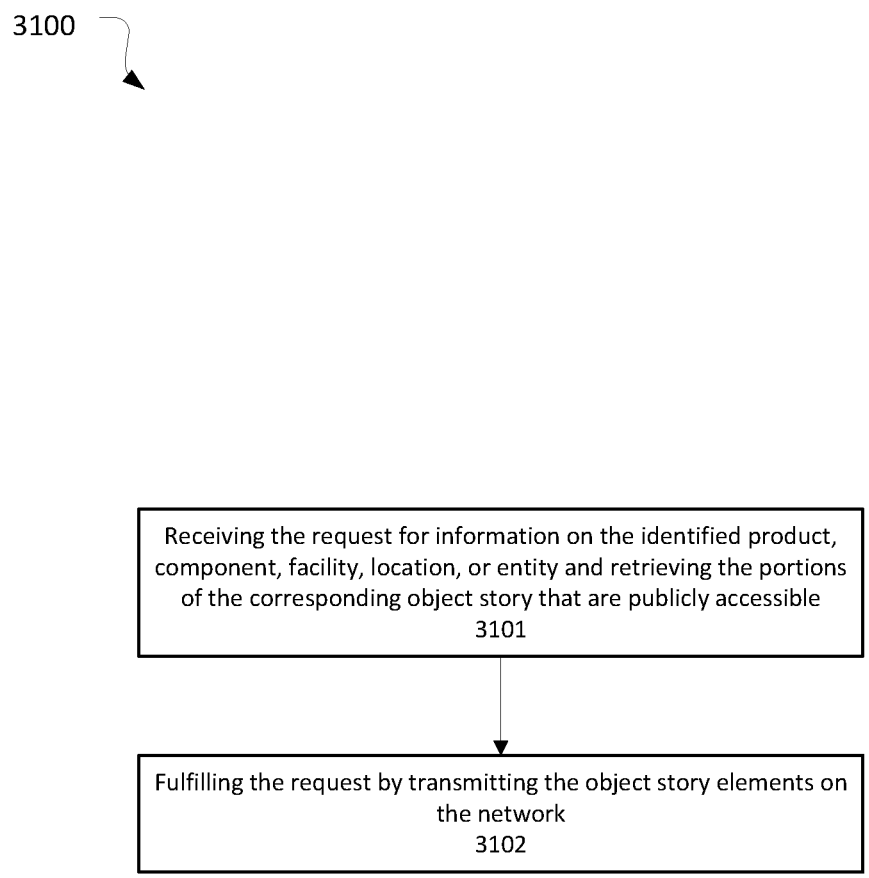
FIG. 31 illustrates an operation flow/algorithmic structure that may be used to provide requested information related to an object story data structure in accordance with some embodiments.

FIG. 31 illustrates an operation flow/algorithmic structure 3100 that may be used to provide requested information related to an object story data structure in accordance with some embodiments. In some embodiments, the flow/structure 3100 may be performed by one or more modules of the computing system 200, which may be a company's object story aware system.

The flow/structure 3100 may include, at 3101, receiving a request for information on an identified object (for example, product, component, facility, location, or entity) and retrieving the portions of the corresponding object story that are accessible. The request may be sent by a user's consumer computing device. In some embodiments, this request may include authentication information from the user, for example, a security token.

The flow/structure 3100 may further include, at 3102, fulfilling the request by transmitting the Object Story elements on the network.

In some embodiments, the flow/structure 3100 may further include determining that the user has the proper security credentials for accessing the portion of the object story prior to fulfilling the request. In some embodiments, the request at 3101 may not include any authentication information. In such cases, the portions of the object story that are provided at 3102 may be restricted to publicly-available portions. Thus, some object stories may provide a baseline of information that may be accessed (likely in a read-only manner) even without user authentication and rights verification.

This flow may occur at the manufacturer's systems or it may be implemented by a third-party which is a decentralized store of the object story information across multiple manufacturers.

Figure 32:
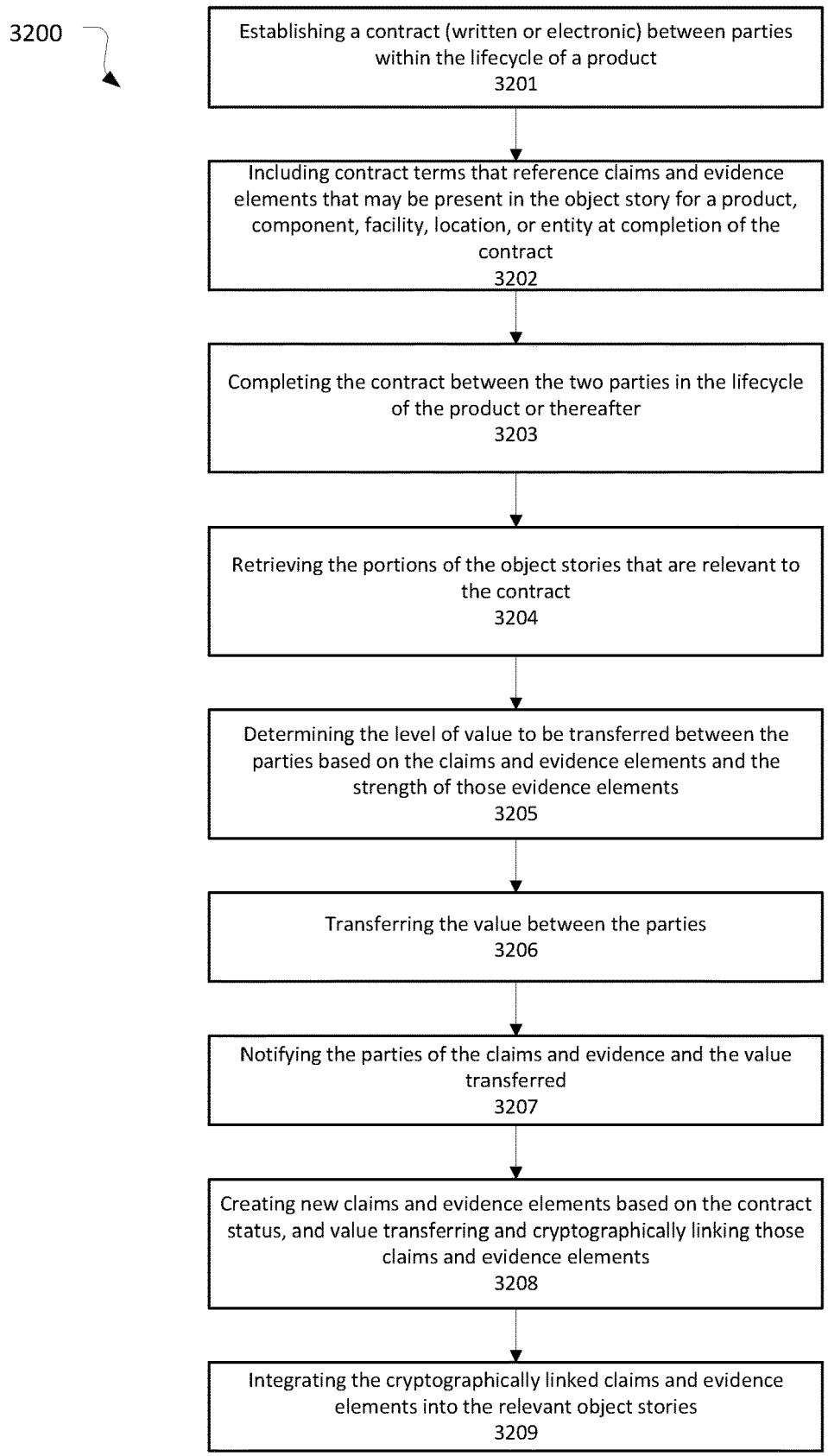
FIG. 32 illustrates an operation flow/algorithmic structure that may be used to provide requested information related to an object story data structure in accordance with some embodiments.

FIG. 32 illustrates an operation flow/algorithmic structure 3200 that may be used to define and execute a contract with terms related to an object story data structure in accordance with some embodiments. In some embodiments, the flow/structure 3200 may be performed by one or more modules of the computing system 200.

The flow/structure 3200 may include, at 3201, establishing a contract between parties within a lifecycle of a product. The contract may be written or electronic.

The flow/structure 3200 may further include, at 3202, including contract terms that reference claims and evidence elements that may be present in the various object stories for the product, component, facility, location, or entity referenced in the contract.

The flow/structure 3200 may further include, at 3203, completing the contract between the two parties in the lifecycle of the product or thereafter.

The flow/structure 3200 may further include, at 3204, retrieving the portions of the object stories that are relevant to the contract.

The flow/structure 3200 may further include, at 3205, determining the level of value to be transferred between the parties based on the claims and evidence elements in the strength of those evidence elements.

The flow/structure 3200 may further include, at 3206, transferring the value between the parties.

The flow/structure 3200 may further include, at 3207, notifying the parties of the claims and evidence and the value transferred.

The flow/structure 3200 may further include, at 3208, creating new claims and evidence elements based on the contract status and value transferred and cryptographically linking those claims and evidence elements.

The flow/structure 3200 may further include, at 3209, integrating the cryptographically linked claims and evidence elements into the relevant object stories.

Figure 33:
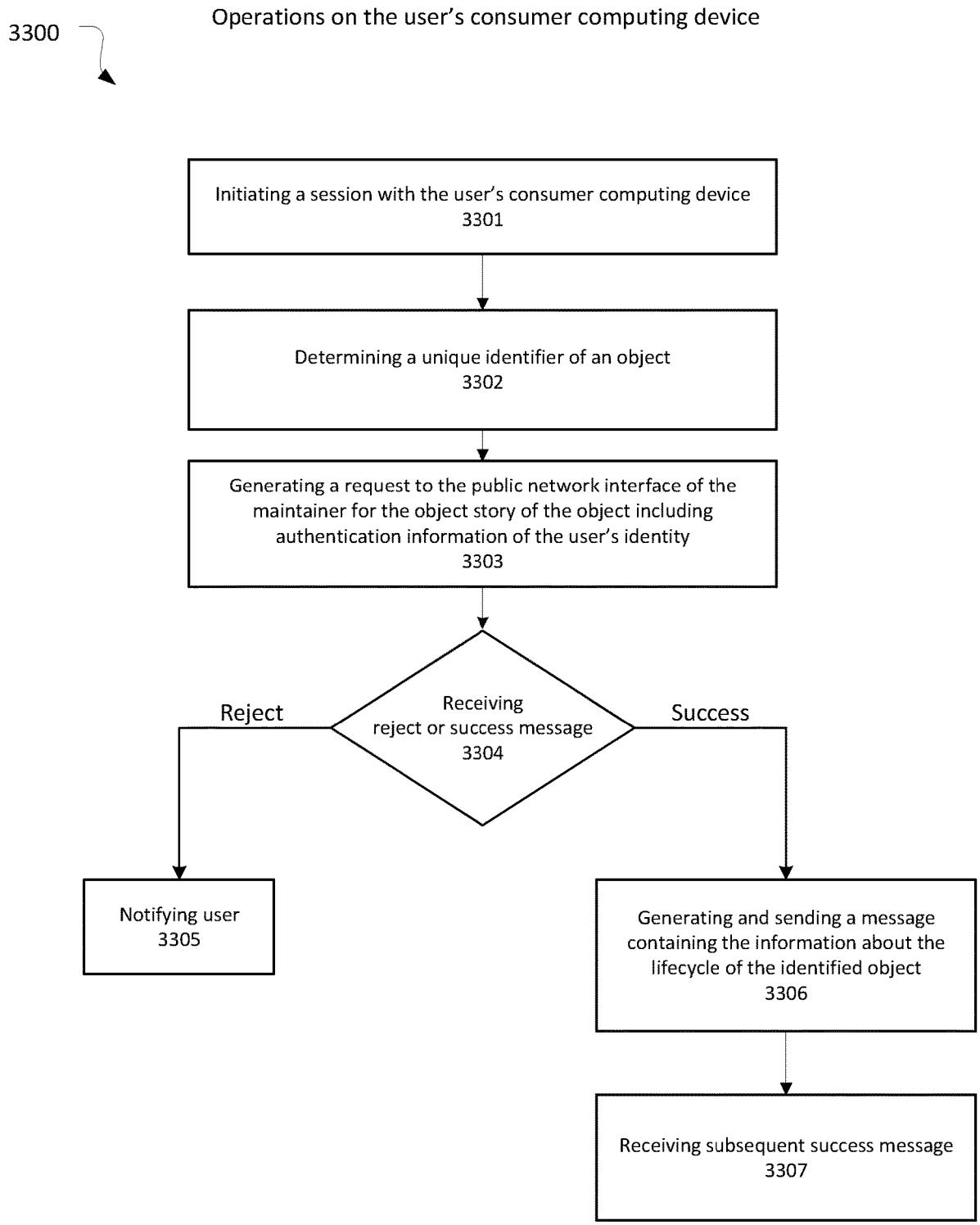
FIG. 33 illustrates an operation flow/algorithmic structure that may be used to add information to an object story data structure in accordance with some embodiments.

FIG. 33 illustrates an operation flow/algorithmic structure 3300 that may be used to add information to an object story data structure in accordance with some embodiments. In some embodiments, the flow/structure 3300 may be performed by one or more modules of the OSM system 250 (for example, consumer computing device or any system present in the lifecycle for an object that is object story aware).

The flow/structure 3300 may include, at 3301, initiating a session with the user's consumer computing device. This may consist of using software that is designed to access the object story or utilize functionality within another party's software (such as using a "provided feedback" button within an application provided by a third-party).

The flow/structure 3300 may further include, at 3302, determining a unique identifier of an object. This may be done by scanning a portion of a label, a QR code, recognizing a product or company from an image, or some other user/sensor input.

The flow/structure 3300 may further include, at 3303, generating a request to a public network interface of the owner of the object story of the object to add information to the object story for the product. This may be at the manufacturer of a product, the current owner, or a third-party service which is a decentralized store of object story information for many products. The request may also include the user's identity and authentication information corresponding to the user.

The flow/structure 3300 may further include, at 3304, receiving a reject message or a success message. The reject/success message may be received from the object story aware system.

If the reject message is received, the flow/structure 3300 may further include notifying the user of the rejection at 3305.

If the success message is received, the flow/structure 3300 may further include, at 3306, generating and sending a message containing the information about the lifecycle of the identified object.

The flow/structure 3300 may further include, at 3307, receiving a subsequent success message to indicate the information has been incorporated into the object story of the product.

Figure 34:
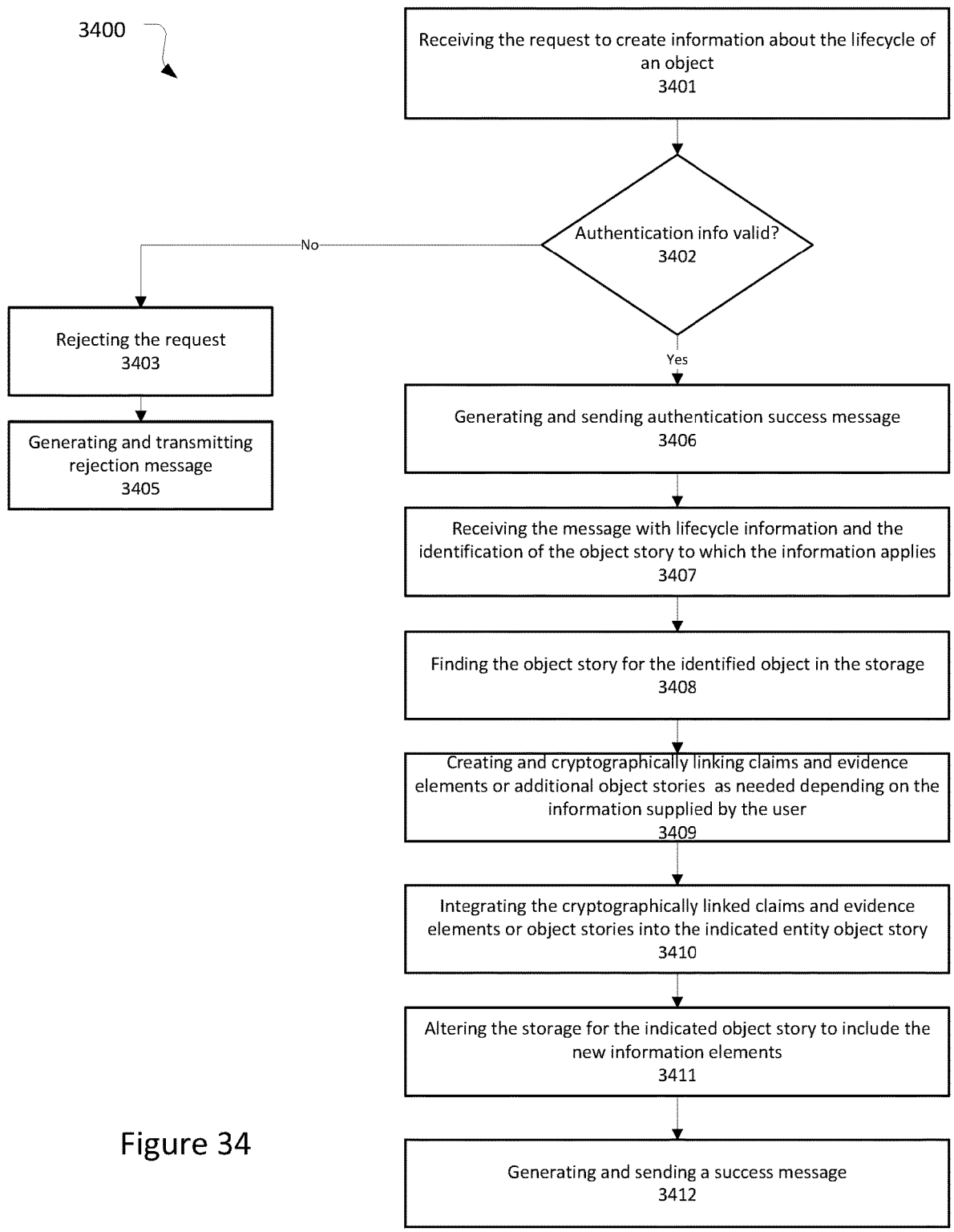
FIG. 34 illustrates an operation flow/algorithmic structure that may be used to add information to an object story data structure in accordance with some embodiments.

FIG. 34 illustrates an operation flow/algorithmic structure 3400 that may be used to add information to an object story data structure in accordance with some embodiments. In some embodiments, the flow/structure 3400 may be performed by one or more modules of the OSM system 250, which may be a manufacturer's or owner's object story aware system or the systems present at a third-party decentralized store of object information that supports multiple products.

The flow/structure 3400 may include, at 3401, receiving a request to create information about a lifecycle of an object. The request may be received from a user's consumer computing device.

The flow/structure 3400 may further include, at 3402, determining whether the authentication information in the request is valid.

If it is determined that the authentication information in the request is not valid, the flow/structure 3400 may include, at 3403, rejecting the request and, at 3405, generating and transmitting a rejection message to the user's consumer computing device.

If it is determined that the authentication information in the request is valid, the flow/structure 3400 may include, at 3406, generating and sending an authentication success message. The authentication success message may indicate that the authentication is valid and may request lifecycle information. In other embodiments, the lifecycle information may be initially transmitted in the request received at 3401.

The flow/structure 3400 may further include, at 3407, receiving the message with the lifecycle information and the object identification. In other embodiments, the identifier may be an identifier of an object story.

The flow/structure 3400 may further include, at 3408, finding an object story for the identified object in storage. The storage may be remote or local.

The flow/structure 3400 may further include, at 3409, creating and cryptographically linking claims and evidence elements or further object stories as needed depending on the information supplied by the user. For example, the user may be notifying a system that manages the object story for a car that they have taken ownership. The user may supply a claim and evidence of ownership along with an object story representing information about themselves. In some embodiments, if the user has its own OSM, management of the car's object story may also be passed to the user's OSM once the new ownership is verified.

The flow/structure 3400 may further include, at 3410, integrating the cryptographically linked claims and evidence elements or object stories into the object story of the object.

The flow/structure 3400 may further include, at 3411, altering the storage for the indicated object story to include the new claims and evidence elements or object stories.

The flow/structure 3400 may further include, at 3412, generating and sending a success message to the user. This may indicate that the lifecycle information has been included in the object story.

Figure 35:
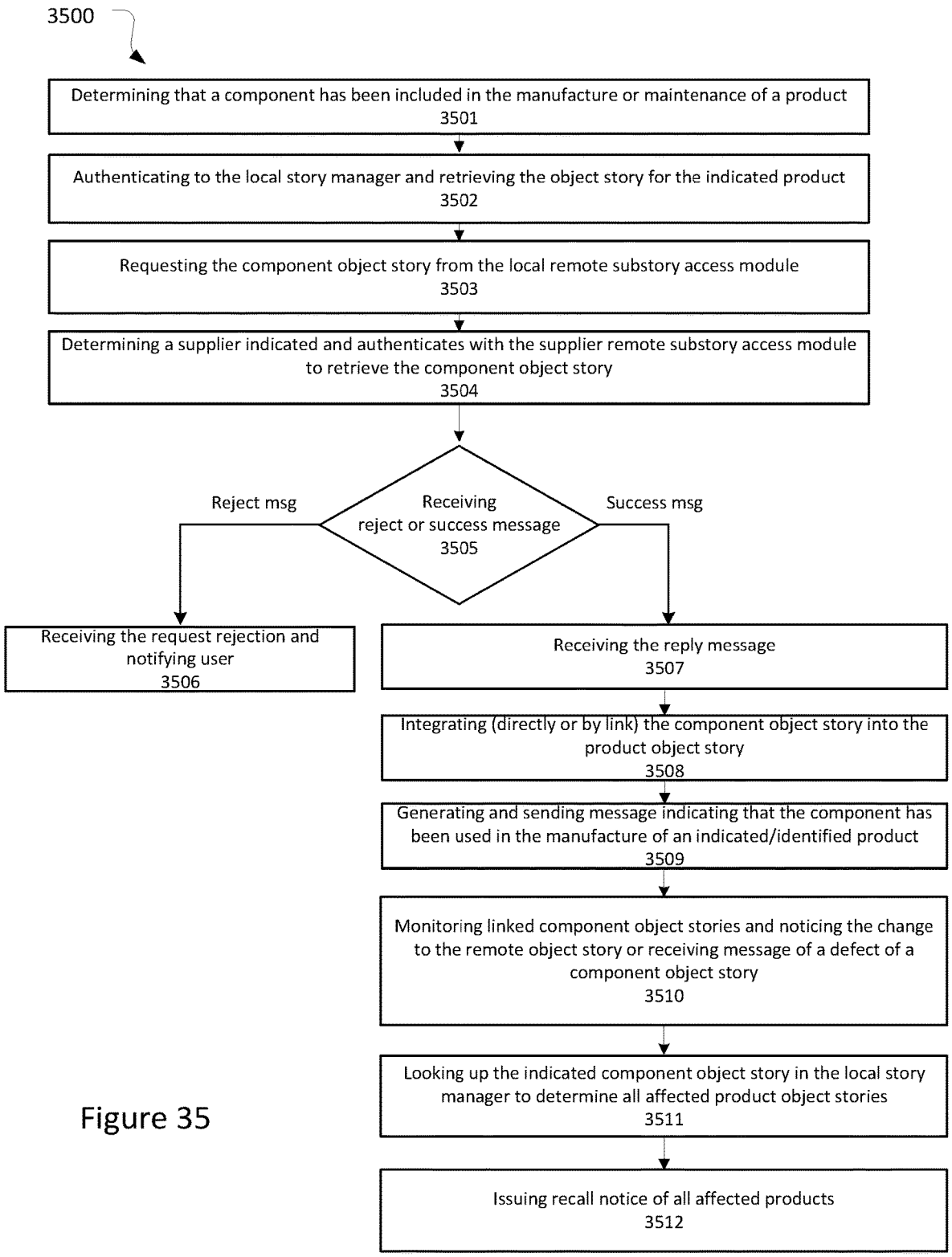
FIG. 35 illustrates an operation flow/algorithmic structure that may be used to manage an object story in accordance with some embodiments.

FIG. 35 illustrates an operation flow/algorithmic structure 3500 that may be used to manage an object story in accordance with some embodiments. In some embodiments, the flow/structure 3500 may be performed by one or more modules of the OSM system 250, which may be a company's object story aware system.

The flow/structure 3500 may include, at 3501, determining that a component has been included in manufacture or maintenance of a product. The component may be included in the maintenance of the product by replacing an existing component or by adding an additional component.

The flow/structure 3500 may further include, at 3502, authenticating to the local story manager and retrieving the object story for the indicated product.

The flow/structure 3500 may further include, at 3503, requesting the component object story from a local remote sub story access module.

The flow/structure 3500 may further include, at 3504, determining, by the remote substory access module, that a supplier is indicated and authenticating with the supplier's remote substory access module to retrieve the component object story.

The flow/structure 3500 may further include, at 3505, receiving a reject or success message from the supplier remote substory access module.

If the reject message is received, the flow/structure 3500 may further include receiving the request rejection and notifying the user at 3506.

If the success message is received, the flow/structure 3500 may further include receiving the reply message at 3507. The reply message may include the component object story or portions thereof.

The flow/structure 3500 may further include, at 3508, integrating the component object story into the product object story. The integration may be by directly including the component object story or by linking the component object story into the product object story. This integration may also include the object stories for facilities, location, or entities that performed the integration.

The flow/structure 3500 may further include, at 3509, generating and sending a message indicating that the component has been used in the manufacture of an indicated/identified product. The message may be sent to the supplier of the component.

The flow/structure 3500 may further include, at 3510, monitoring link component object stories and noticing a change to a remote object story or receiving a message of a change (e.g., a defect) of a component object story.

The flow/structure 3500 may further include, at 3511, looking up the indicated component object story in the local story manager to determine all affected product object stories.

The flow/structure 3500 may further include, at 3512, issuing a notice (for example, a recall notice) of all affected products.

Figure 36:
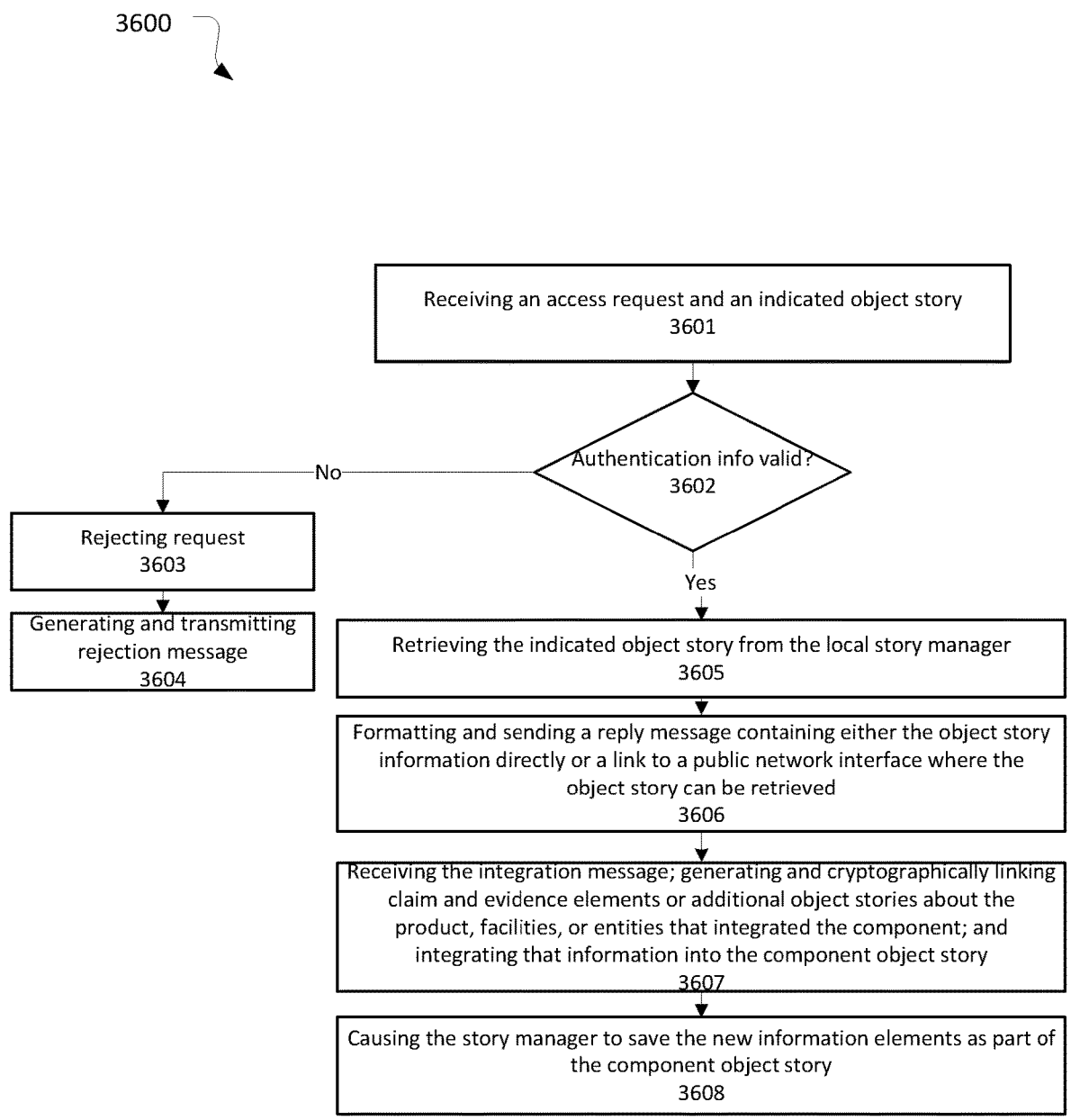
FIG. 36 illustrates an operation flow/algorithmic structure that may be used to update an object story data structure in accordance with some embodiments.

FIG. 36 illustrates an operation flow/algorithmic structure 3600 that may be used to update an object story data structure in accordance with some embodiments. In some embodiments, the flow/structure 3600 may be performed by one or more modules of the OSM system 250, which may be a component supplier's object story aware system. In some embodiments, one or more of the operations of the flow/structure 3600 may be performed by a remote sub story access module.

The flow/structure 3600 may include, at 3601, receiving an access request and an indicated object story. The request may be received from a manufacturer's object story aware system.

The flow/structure 3600 may further include, at 3602, determining whether the authentication information in the request is valid.

If the authentication information in the request is not valid, the flow/structure 3600 may include rejecting the request at 3603 and generating and transmitting a rejection message at 3604. The rejection message may be transmitted to the manufacturer's object story aware system.

If the authentication information in the request is valid, the flow/structure 3600 may include retrieving the indicated object story from the local story manager at 3605.

The flow/structure 3600 may include, at 3606, formatting and sending a reply message containing either the object story information directly or link to a public network interface where the object story may be retrieved.

The flow/structure 3600 may include, at 3607, receiving an integration message. The integration message may indicate the component has been incorporated into an indicated/identified object). The flow/structure 3600 may further include, at generating and cryptographically linking claim and evidence elements about the object into the component Object Story. This information may include additional object stories for the facilities or entities that incorporated the component.

The flow/structure 3600 may include, at 3608, causing the story manager to save the new information elements as part of the component object story.

Figure 37:
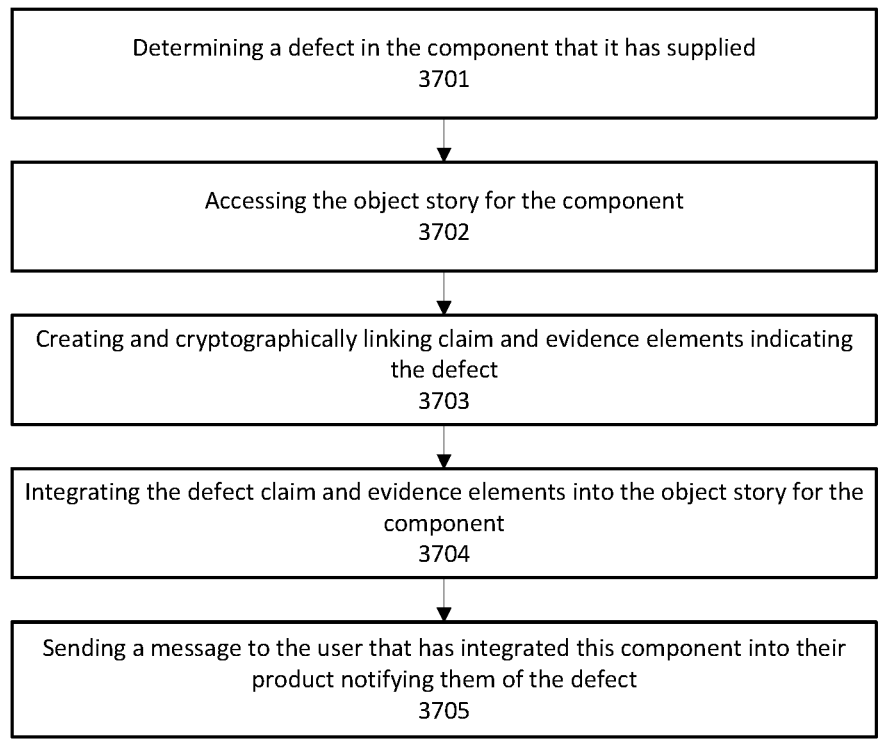
FIG. 37 illustrates an operation flow/algorithmic structure that may be used to notify an entity of a defect in accordance with some embodiments.

FIG. 37 illustrates an operation flow/algorithmic structure 3700 that may be used to notify an entity of a defect in accordance with some embodiments. In some embodiments, the flow/structure 3700 may be performed by one or more modules of the OSM system 250, which may be a component supplier's object story aware system. In some embodiments, one or more of the operations of the flow/structure 3700 may be performed by a supplier information system.

The flow/structure 3700 may include, at 3701, determining a defect in a component. The component may be one that was provided by the supplier.

The flow/structure 3700 may include, at 3702, accessing the object story for the component. The object story may be accessed from local or remote storage.

The flow/structure 3700 may include, at 3703, creating and cryptographically linking claim and evidence elements indicating the defect.

The flow/structure 3700 may include, at 3704, integrating the defect claim and evidence elements into the component object story.

Figure 38:
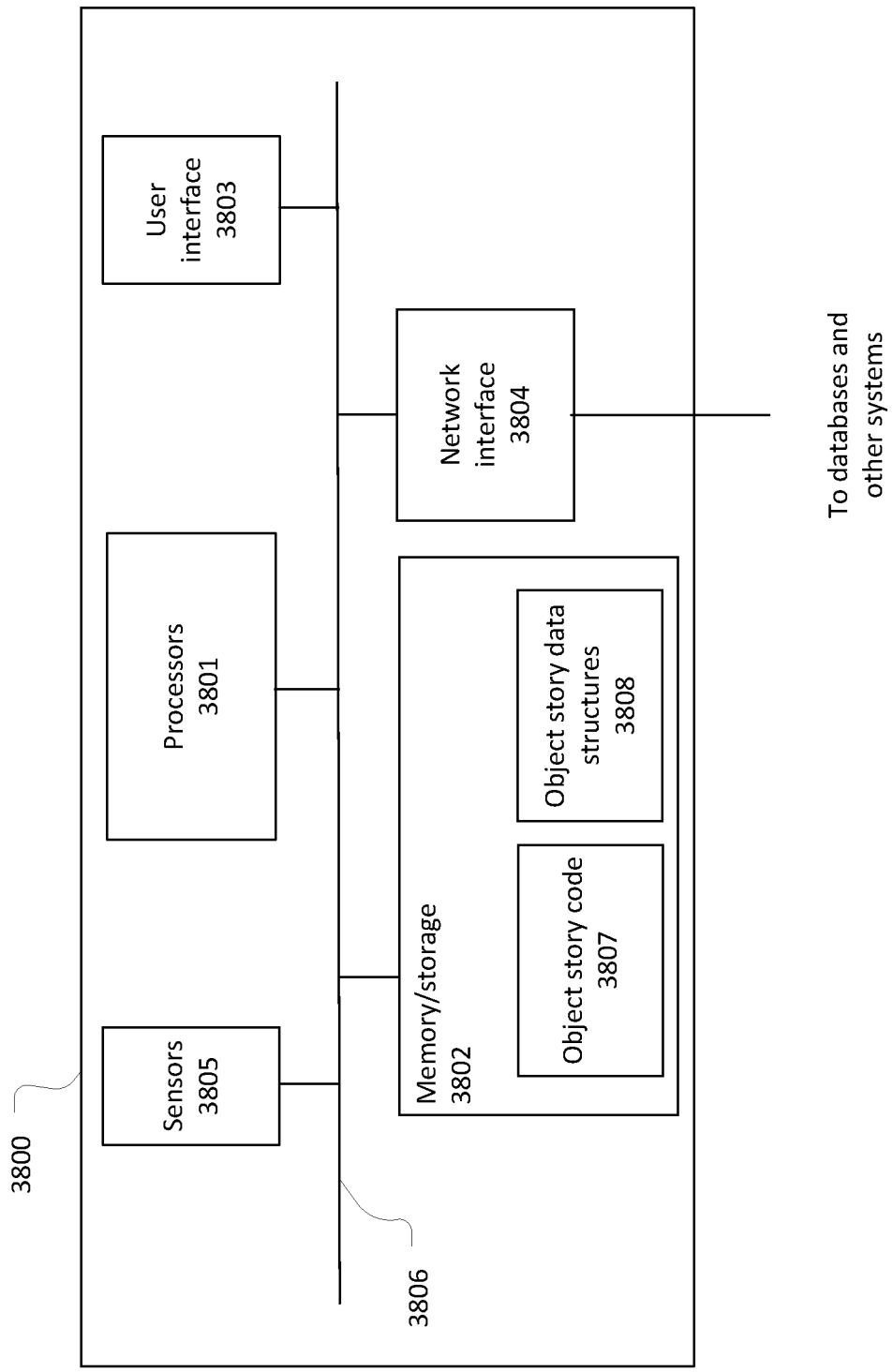
FIG. 38 illustrates a device in accordance with some embodiments.

The flow/structure 3700 may include, at 3705, sending a message to a user associated with the component notifying them of the defect. The user may have incorporated the component into their product FIG. 38 illustrates a device 3800 in accordance with some embodiments. The device 3800 may implement one or more of the computing information systems 260 or OSM system 250.

The device 3800 may include processors 3801, memory/storage circuitry 3802, a user interface 3803, a network interface 3804, and sensors 3805. The components of the device 3800 may be implemented as integrated circuits (ICs), portions thereof, discrete electronic devices, or other modules, logic, hardware, software, firmware, or a combination thereof. The block diagram of FIG. 38 is intended to show a high-level view of some of the components of the device 3800. However, some of the components shown may be omitted, additional components may be present, and different arrangement of the components shown may occur in other implementations.

The components of the device 3800 may be coupled with various other components over one or more interconnects 3806, which may represent any type of interface, input/output, bus (local, system, or expansion), transmission line, trace, optical connection, etc. that allows various circuit components (on common or different chips or chipsets) to interact with one another.

The processors 3801 may include processor circuitry that executes or otherwise operates computer-executable instructions, such as program code, software modules, or functional processes from memory/storage 3802 to cause the device 3800 to perform operations as described herein. For example, in some embodiments, the processors 3801 may access object story code 3807 stored in the memory/storage 3802. Upon executing the object story code 3807 the device 3800 may manage (including generating, accessing, storing, etc.) object story data structures 3808 as described herein.

The memory/storage 3802 may include any type of volatile or non-volatile memory that may be distributed throughout the device 3800. In some embodiments, some of the memory/storage 3802 may be located on the processors 3801 themselves (for example, L1 and L2 cache), while other memory/storage 3802 is external to the processors 3801 but accessible thereto via a memory interface, which may be part of I/O interface 3804. The memory/storage 3802 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The user interface 3803 includes various input/output (I/O) devices designed to enable user interaction with the device 3800. The user interface 3803 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the device 3800.

The sensors 3805 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The network interface 3804 may be any type of wired/wireless network interface capable of facilitating communication with databases and other systems (including other computing information systems, OSM systems, or legacy systems).

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

EXAMPLES

Some non-limiting examples are provided below.

Example 1 includes a method of generating, based on a user request, an object story data structure for an object, wherein the object is a facility, entity, or a location; identifying a claim element that includes an assertion about the object; identifying an evidence element corresponding to the claim element, the evidence element to support veracity of the assertion; and incorporating the claim element and evidence element into the object story data structure.

Example 2 includes the method of example 1 or some other example herein, wherein the object story data structure is a first object story data structure and the method further comprises: generating a second object story data structure for a product; and incorporating the first object story data structure into the second object story data structure.

Example 3 includes the method of example 2 or some other example herein, further comprising: incorporating the first object story data structure into: an origin element of the second object story data structure, wherein the claim element includes an assertion about a role of the object in a manufacturing process of the product; a custody element of the second object story data structure, wherein the claim element includes an assertion about a role of the object with respect to chain-of-custody of the product as it was manufactured, transported, or stored before delivery to a customer; a consumption element of the second object story data structure, wherein the claim element includes an assertion about the role of the object in a life of the product after delivery to a customer; or a conversion element of the second object story data structure, wherein the claim element includes an assertion about the role of the object with respect to recycling or disposal of the product.

Example 4 includes the method of example 1 or some other example herein, wherein the evidence element includes an indication to indicate a level of evidence of the evidence element, wherein the level of evidence is one of a plurality of levels of evidence on a scale of proof to support veracity of the assertion.

Example 5 includes the method of example 4 some other example herein, wherein the level of evidence comprises: a sole assertion level, a self-certification level, a basic audit level, a third-party certification level, or a third-party certification with audit level.

Example 6 includes the method of example 1 or some other example herein, wherein incorporating the claim element and evidence element into the object story data structure comprises: adding, within the object story data structure, a link to the claim element or the evidence element, wherein the claim element or evidence element is stored remotely or in a distributed ledger; or adding, within the object story data structure, the claim element or the evidence element.

Example 7 includes the method of example 1 or some other example herein, further comprising: identifying a component object story data structure that includes information about a component of the object; and
incorporating the component object story data structure into the object story data structure.

Example 8 includes the method of example 7 or some other example herein, wherein incorporating the component object story data structure into the object story data structure comprises: adding a link to the component object story data structure within the object story data structure, wherein the component object story data structure is stored remotely or in a distributed ledger; or adding the component object story data structure within the object story data structure.

Example 9 includes the method of example 7 or some other example herein, wherein the object is a facility and the component is a sub-facility; the object is an entity and the component is an individual, company, or group; the object is a first location and the component is a second location that is within the first location.

Example 10 includes a method comprising: storing an object story data structure that includes a claim element that includes an assertion about an object and an evidence element corresponding to the claim element, wherein the evidence element is to support veracity of the assertion and the object is a facility, entity, or a location; receiving, in a message from a user, a request to access the object story data structure and information related to the user; determining access rights based on the information related to the user; performing an operation on the object story data structure based on the request and the access rights; and providing, in a response message, an indication of performance of the operation to the entity.

Example 11 includes the method of example 10 or some other example herein, wherein the information related to the entity comprises a security token and the method further comprises: authenticating an identity of the user based on the security token; and obtaining the access rights of the user based on authentication of the identity.

Example 12 includes the method of example 11 or some other example herein, wherein the access rights include a first level of access to a first portion of the object story data structure and a second level of access to a second portion of the object story data structure.

Example 13 includes the method of example 11 or some other example herein, further comprising: transmitting, to a remote entity, a request for the access rights based on authentication of the identity; and obtaining the access rights in response to the request for the access rights.

Example 14 includes the method of example 10 or some other example herein, wherein the request to access comprises a request to retrieve a plurality of portions and the method further comprises: determining the user has rights to retrieve a first portion of the plurality of portions of the object story data structure; determining the user does not have rights to retrieve a second portion of the plurality of portions of the object story data structure; and providing the indication by including the first portion of the object story data structure in the response message and rejecting the access to the second portion.

Example 15 includes the method of example 10 or some other example herein, wherein the object story data structure is a first object story data structure and performing the operation comprises: receiving a second object story data structure from an object story aware entity; and incorporating the second object story data structure into the first object story data structure.

Example 16 includes the method of example 10 or some other example herein, further comprising: receiving the claim element and the evidence element from the entity; and performing the operation by incorporating the claim element and the evidence element into the object story data structure.

Example 17 includes the method of example 10 or some other example herein, wherein the request to access is a request to incorporate a component object story data structure into the object data story structure, and the method further comprises: adding the component object story data structure or a link to the component object story data structure into the object story data structure.

Example 18 includes a method of example 10 or some other example herein, wherein the request to access is a request to incorporate a component object story data structure into the object data story structure, and the method further comprises: obtaining a unique identifier associated with the component object story; sending a message to a remote substory access module to request the component object story data structure; receiving a response from the remote substory access module that includes the component object story data structure; and incorporating the component object story data structure into the object story data structure.

Example 19 includes the method of example 18 or some other example herein, further comprising: receiving, from the remote substory access module, an indication of a change to the component object story data structure; and updating the object story data structure based on the indication of the change.

Example 20 includes the method of example 19 or some other example herein, wherein the entity is a first entity, the object story data structure is a first object story data structure, and the method further comprises: determining that the component object story data structure is incorporated into a second object story data structure; and transmitting, to a second entity associated with the second object story data structure, a message with the indication of the change to the component object story.

Example 21 includes a method comprising: receiving an authentication request with user authentication information; authenticating an identity of a user based on the user authentication information; and providing a security token based on authenticating the user, wherein the security token is to represent an authentication of the identity of the user and the identity is associated with access rights to access one or more portions of an object story data structure for an object, wherein the object is a facility, an entity, or a location.

Example 22 includes the method of example 21 or some other example herein, wherein the rights of the user comprise read or write access to claim elements or evidence elements of the one or more portions.

Example 23 includes the method of example 21 or some other example herein, wherein the one or more portions include at least one component object story data structure incorporated into the object story data structure.

Example 24 includes the method of example 21 or some other example herein, further comprising: receiving the authentication request from a computing device and providing the security token to the computing device, wherein the computing device is a user device associated with the user or a device that controls access to the object story data structure.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a computer program comprising instructions, wherein execution of the program by a processing element is to cause the processing element to carry out the method, techniques, or process as described in or related to any of examples 1-24, or portions thereof.

The invention claimed is:

1. A system comprising:
a network interface to communicate with remote devices over a communication network; and
processing circuitry coupled with the network interface, the processing circuitry to:
manage storage of an object story data structure that includes a claim element with an assertion about an object and a first evidence element corresponding to the claim element, wherein the first evidence element is to support veracity of the assertion with a first level of evidence, the claim element and the first evidence element are cryptographically linked with one another, and the object is a facility or a location;

receive, in a message from a user, authentication information related to the user and a request to access the object story data structure;

determine access rights upon receiving the authentication information related to the user;

perform an operation on the object story data structure upon receiving the request and the access rights, wherein: the operation is to add a second evidence element to support veracity of the assertion with a second level of evidence that is different from the first level of evidence and add a link in the first evidence element to the second evidence element to provide a chain of evidence elements; the second evidence element includes a cryptographic hash of one or more previous evidence elements in the chain of evidence elements; the one or more previous evidence elements include the first evidence element; each of the first level of evidence and the second level of evidence corresponds to a level of proof of truth of each claim; the first level of evidence is a first one of an assertion level, a self-certification level, a basic-audit level, a third-party certification level, or a third-party certification with audit; and the second of level of evidence is a second one of an assertion level, a self-certification level, a basic-audit level, a third-party certification level, or a third-party certification with audit; and provide, in a response message, an indication of performance of the operation to the user.

2. The system of claim 1, wherein the authentication information related to the entity comprises a security token and the processing circuitry is further to:
   authenticate an identity of the user based on the security token; and
   obtain the access rights of the user based on authentication of the identity.

3. The system of claim 2, wherein the access rights include a first level of access to a first portion of the object story data structure and a second level of access to a second portion of the object story data structure.

4. The system of claim 2, wherein the processing circuitry is further to:
   transmit, to a remote entity, a request for the access rights based on authentication of the identity; and
   obtain the access rights in response to the request for the access rights.

5. The system of claim 1, wherein the request to access comprises a request to retrieve a plurality of portions and the processing circuitry is further to:
   determine the user has rights to retrieve a first portion of the plurality of portions of the object story data structure;
   determine the user does not have rights to retrieve a second portion of the plurality of portions of the object story data structure; and
   provide the indication by including the first portion of the object story data structure in the response message and rejecting the access to the second portion.

6. The system of claim 1, wherein the object story data structure is a first object story data structure, the operation is a first operation, and the processing circuitry is to further perform a second operation that includes:

receive a second object story data structure from an object story aware entity; and
incorporate the second object story data structure into the first object story data structure.

7. The system of claim 1, wherein the request is a first request and the processing circuitry is further to:
   receive a second request to incorporate a component object story data structure into the object data story structure; and
   add the component object story data structure or a link to the component object story data structure into the object story data structure,
   wherein: the component object story data structure is associated with a component; and the object is a facility and the component is a sub-facility or the object is a first location and the component is a second location within the first location.

8. The system of claim 7, wherein the processing circuitry is further to:
   obtain a unique identifier associated with the component object story data structure;
   send a message, which includes the unique identifier, to a remote substory access module to request the component object story data structure;
   receive a response from the remote substory access module that includes the component object story data structure; and
   incorporate the component object story data structure into the object story data structure based on receipt of the response.

9. The system of claim 8, wherein the processing circuitry is further to:
   receive, from the remote substory access module after incorporation of the component object story data structure into the object story data structure, an indication of a change to the component object story data structure; and
   update the object story data structure based on the indication of the change.

10. The system of claim 9, wherein the object story data structure is a first object story data structure, and the processing circuitry is further to:
    determine that the component object story data structure is incorporated into a second object story data structure; and
    transmit, to an entity associated with the second object story data structure, a message with the indication of the change to the component object story.

11. A method comprising:
    managing storage of an object story data structure that includes a claim element with an assertion about an object and a first evidence element corresponding to the claim element, wherein the first evidence element is to support veracity of the assertion with a first level of evidence, the claim element and the first evidence element are cryptographically linked with one another, and the object is a facility or a location;
    receiving, in a message from a user, authentication information related to the user and a request to access the object story data structure;
    determining access rights upon receiving the authentication information related to the user;
    performing an operation on the object story data structure upon receiving the request and the access rights, wherein: the operation is to add a second evidence element to support veracity of the assertion with a second level of evidence that is different from the first level of evidence; the second evidence element includes a cryptographic hash of one or more previous evidence elements in a chain of evidence elements; the one or more previous evidence elements include the first evidence element; each of the first level of evidence and the second level of evidence corresponds to a level of proof of truth of each claim; the first level of evidence is a first one of an assertion level, a self-certification level, a basic-audit level, a third-party certification level, or a third-party certification with audit; and the second of level of evidence is a second one of an assertion level, a self-certification level, a basic-audit level, a third-party certification level, or a third-party certification with audit; and providing, in a response message, an indication of performance of the operation to the user.

12. The method of claim 11, wherein the authentication information related to the entity comprises a security token and the method further comprises:

authenticating an identity of the user based on the security token; and obtaining the access rights of the user based on authentication of the identity.

13. The method of claim 12, wherein the access rights include a first level of access to a first portion of the object story data structure and a second level of access to a second portion of the object story data structure.

14. The method of claim 12, further comprising:

transmitting, to a remote entity, a request for the access rights based on authentication of the identity; and obtaining the access rights in response to the request for the access rights.

15. The method of claim 11, wherein the request to access comprises a request to retrieve a plurality of portions and the method further comprises:

determining the user has rights to retrieve a first portion of the plurality of portions of the object story data structure;

determining the user does not have rights to retrieve a second portion of the plurality of portions of the object story data structure; and providing the indication by including the first portion of the object story data structure in the response message and rejecting the access to the second portion.

16. The method of claim 11, wherein the object story data structure is a first object story data structure, the operation is a first operation, and the method further comprises performing a second operation that includes:

receiving a second object story data structure from an object story aware entity; and incorporating the second object story data structure into the first object story data structure.

17. The method of claim 11, wherein the request is a first request and the method further comprises:

receiving a second request to incorporate a component object story data structure into the object data story structure; and adding the component object story data structure or a link to the component object story data structure into the object story data structure, wherein: the component object story data structure is associated with a component; and the object is a facility and the component is a sub-facility or the object is a first location and the component is a second location within the first location.

18. The method of claim 17, further comprising:

obtaining a unique identifier associated with the component object story data structure;

sending a message, which includes the unique identifier, to a remote substory access module to request the component object story data structure;

receiving a response from the remote substory access module that includes the component object story data structure; and incorporating the component object story data structure into the object story data structure based on receipt of the response.

19. The method of claim 18, further comprising:

receiving, from the remote substory access module after incorporation of the component object story data structure into the object story data structure, an indication of a change to the component object story data structure; and updating the object story data structure based on the indication of the change.

20. The method of claim 19, wherein the object story data structure is a first object story data structure, and the method further comprises:

determining that the component object story data structure is incorporated into a second object story data structure; and transmitting, to an entity associated with the second object story data structure, a message with the indication of the change to the component object story.

* * * * *